United States Patent
Atlas et al.

(10) Patent No.: US 10,976,804 B1
(45) Date of Patent: Apr. 13, 2021

(54) POINTER-BASED INTERACTION WITH A VIRTUAL SURFACE USING A PERIPHERAL DEVICE IN ARTIFICIAL REALITY ENVIRONMENTS

(71) Applicant: Facebook Technologies, LLC, Menlo Park, CA (US)

(72) Inventors: Charlene Mary Atlas, Redmond, WA (US); Chad Austin Bramwell, Sammamish, WA (US); Mark Terrano, Redmond, WA (US); Caryn Vainio, Hobart, WA (US); Xiaoyu Liu, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/506,183

(22) Filed: Jul. 9, 2019

(51) Int. Cl.
*G06F 3/01* (2006.01)
*G02B 27/01* (2006.01)
*G06T 19/00* (2011.01)
*G06F 3/0481* (2013.01)

(52) U.S. Cl.
CPC ............ *G06F 3/011* (2013.01); *G02B 27/017* (2013.01); *G06F 3/017* (2013.01); *G06F 3/04815* (2013.01); *G06T 19/006* (2013.01)

(58) Field of Classification Search
CPC ........ G06T 19/006; G06F 3/005; G06F 3/011; G06F 3/014; G06F 3/017; G06F 3/04815; G02B 27/017
See application file for complete search history.

(56) References Cited

U.S. PATENT DOCUMENTS

| | | |
|---|---|---|
| 2013/0249942 A1 | 9/2013 | Green et al. |
| 2013/0257751 A1 | 10/2013 | Stafford |
| 2013/0293580 A1* | 11/2013 | Spivack ............ G06K 9/00671 345/633 |
| 2014/0078043 A1 | 3/2014 | Kim et al. |
| 2014/0078176 A1 | 3/2014 | Kim et al. |

(Continued)

OTHER PUBLICATIONS

Tosas, Martin "AR-Pinboard: An Augmented Reality (AR) Virtual Pinboard" Kickstarter, available at https://www.kickstarter.com/projects/1477538513/ar-pinboard-an-augmented-reality-ar-virtual-pinboa (last accessed Oct. 15, 2019), Oct. 16, 2014, 32 pp.

(Continued)

*Primary Examiner* — Jeffery A Brier
(74) *Attorney, Agent, or Firm* — Shumaker & Sieffert, P.A.

(57) ABSTRACT

In some examples, a method comprises: obtaining, by an artificial reality system including a head mounted display (HMD), image data via an image capture device, the HMD configured to output artificial reality content; detecting, by the artificial reality system, a physical peripheral device from the image data; detecting, by the artificial reality system, a pose of the peripheral device; generating, by the artificial reality system, based on the pose of the peripheral device, a virtual pointer along at least a portion of a line between the peripheral device and a virtual surface, the virtual pointer pointing at a location of the virtual surface; performing, by the artificial reality system, one or more actions based on the location of the virtual surface; and rendering, by the artificial reality system, the virtual pointer and the virtual surface for display at the HMD.

20 Claims, 36 Drawing Sheets

(56) References Cited

U.S. PATENT DOCUMENTS

| | | | |
|---|---|---|---|
| 2014/0248950 A1* | 9/2014 | Tosas Bautista | G06F 1/1694 463/31 |
| 2015/0258432 A1 | 9/2015 | Stafford et al. | |
| 2016/0093105 A1 | 3/2016 | Rimon et al. | |
| 2016/0196692 A1* | 7/2016 | Kjallstrom | G06F 3/04815 345/633 |
| 2017/0160815 A1* | 6/2017 | Glazier | G06F 3/04815 |
| 2017/0228922 A1* | 8/2017 | Kaeser | A63F 13/5255 |
| 2017/0364144 A1 | 12/2017 | Petrov et al. | |
| 2018/0158250 A1* | 6/2018 | Yamamoto | G06F 3/011 |
| 2019/0004622 A1 | 1/2019 | O'Brien et al. | |
| 2019/0034076 A1* | 1/2019 | Vinayak | G06F 3/017 |
| 2019/0340821 A1* | 11/2019 | Chen | G06F 3/017 |

OTHER PUBLICATIONS

U.S. Appl. No. 16/506,158 filed Jul. 9, 2019, Facebook Technologies, LLC (inventors: Atlas et al.) entitled "Virtual Pinboard Interaction Using a Peripheral Device in Artificial Reality Environments".

U.S. Appl. No. 16/506,172 filed Jul. 9, 2019, Facebook Technologies, LLC (inventors: Atlas et al.) entitled "Virtual Drawing Surface Interaction Using a Peripheral Device in Artificial Reality Environments".

U.S. Appl. No. 16/506,618 filed Jul. 9, 2019, Facebook Technologies, LLC (inventors: Atlas et al.) entitled "Virtual User Interface Using a Peripheral Device in Artificial Reality Environments".

Office Action from U.S. Appl. No. 16/506,158, dated May 29, 2020, 24 pp.

Office Action from U.S. Appl. No. 16/506,172, dated Jun. 10, 2020, 22 pp.

Response filed Aug. 31, 2020 to the Office Action from U.S. Appl. No. 16/506,158, dated May 29, 2020, 18 pp.

Response to Office Action dated Jun. 10, 2020, from U.S. Appl. No. 16/506,172, filed Sep. 10, 2020, 16 pp.

Office Action from U.S. Appl. No. 16/506,618, dated Sep. 3, 2020, 23 pp.

Notice of Allowance from U.S. Appl. No. 16/506,158 dated Oct. 21, 2020, 9 pp.

Notice of Allowance from U.S. Appl. No. 16/506,172 dated Oct. 26, 2020, 9 pp.

Response to Office Action dated Sep. 3, 2020 from U.S. Appl. No. 16/506,618, filed Dec. 3, 2020, 13 pp.

\* cited by examiner

# POINTER-BASED INTERACTION WITH A VIRTUAL SURFACE USING A PERIPHERAL DEVICE IN ARTIFICIAL REALITY ENVIRONMENTS

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to interact with virtual reality content in an artificial reality environment.

SUMMARY

In general, the disclosure describes artificial reality (AR) systems and techniques for generating and presenting virtual surfaces within an artificial reality environment and for facilitating user interaction with the virtual surfaces using a physical peripheral device. For example, AR systems are described that generate and render virtual surfaces, such as a virtual pinboard or a virtual drawing surface (e.g., a virtual canvas) in an artificial reality environment, for display to a user. The AR systems enable the user to interact with the virtual surfaces using a physical peripheral device, which may be manipulated and otherwise interacted with by the user to provide input to an AR system through pose tracking of the peripheral device and/or via one or more input devices of the peripheral device, such as a presence-sensitive surface.

In some examples, the virtual surface presented by the AR system may be a virtual pinboard with which a user may interact, to perform actions with respect to virtual content items, by interacting with the peripheral device. Virtual content items may include, e.g., GIFs, images, photos, applications, live-streams, videos, text, a web-browser, drawings, animations, 3D models, representations of data files (including two-dimensional and three-dimensional datasets), or any other visible media, and a user can "pin" the virtual content items to the virtual pinboard using the peripheral device. In some examples, the AR system presents peripheral device-locked virtual content items to the user, for example using a carousel or other selection interface, and the AR system enables the user to virtually pin a selected virtual content item to the virtual pinboard through touch or hand gestures, such as a button press of a rendered virtual button or a throwing or flicking gesture of the desired virtual content item toward the virtual pinboard, for instance. Once a virtual content item has been virtually pinned, the AR system enables the user to perform gestures with respect to the peripheral device to perform various manipulations with respect to the virtual content items on the virtual pinboard. For example, in response to the user moving the peripheral device away from a physical position corresponding to the virtual pinboard, the AR system may scale (e.g., resize) a virtual content item, with an effect similar to projection. In another example, in response to the user translating or rotating the peripheral device in physical space or performing a translation or rotation gesture on a surface of the peripheral device, the AR system may perform corresponding transformations of the virtual content item on the virtual pinboard. In some cases, the user may use the peripheral device to annotate a pinned virtual content item, which the AR system may display on the virtual pinboard in proximity to the virtual content item.

In some examples, the virtual surface presented by the AR system may be a virtual drawing surface in the artificial reality environment, with which users may interact using the physical peripheral device. For example, the AR system may enable a user to draw or write on a surface of the peripheral device and may simultaneously, i.e., along with the user inputs, render virtual markings corresponding to the user inputs on a virtual drawing surface locked to the surface of the peripheral device and/or on another virtual drawing surface. In some cases, the AR system enables the user to transfer the virtual markings rendered on the surface of the peripheral device (e.g., a virtual drawing) to another virtual drawing surface (e.g., to a planar or other surface in the artificial reality environment). For example, the AR system may enable the user to transfer the virtual markings from the peripheral device to a virtual drawing surface through a "stamping" gesture performed by the user with the peripheral device toward the virtual drawing surface or through a button press of a virtual button rendered on or near the peripheral device. Once the virtual markings are rendered on the virtual drawing surface, the AR system may enable the user to perform gestures with respect to the peripheral device to perform various manipulations with respect to the virtual markings on the virtual drawing surface. For example, in response to the user moving the peripheral device away from a physical position corresponding to the virtual drawing surface, the AR system may scale (e.g., resize) the virtual markings, with an effect similar to projection. In another example, in response to the user translating or rotating the peripheral device in physical space or performing a translation or rotation gesture on a surface of the peripheral device, the AR system may perform corresponding transformations of the virtual markings on the virtual drawing surface. In some cases, the user may use the peripheral device to annotate the virtual markings, which the AR system may display on the virtual drawing surface in proximity to the virtual markings.

In some examples, the AR system generates and renders a virtual surface in the artificial reality environment, which users may interact with using the physical peripheral device. For example, the AR system may track the peripheral device and render a visible, virtual pointer originating from the peripheral device and pointing out within the virtual environment (e.g., a virtual laser or beam). By performing gestures with respect to the peripheral device, the user causes the AR system to move the virtual pointer that is visible to the user in the virtual environment in accordance with the gestures performed by the user, in effect enabling the user to move the virtual pointer along the virtual surface and perform virtual pointer functions, including drawing functions, moving functions, rotating functions, scaling functions, selecting functions, annotating functions, storing functions, etc. In some examples, the virtual pointer functions may be enabled or modified by the user by performing a gesture with respect to the peripheral device, e.g., by pressing a virtual button or selecting from a virtual menu, which may be locked to the peripheral device or rendered elsewhere in the virtual environment.

The techniques may provide one or more technical improvements that provide at least one practical application. For example, the techniques can enable the user to provide fine-grained user inputs with respect to user interface elements rendered virtually on a physical peripheral device that provides haptic feedback, in contrast to free-floating virtual user interfaces in the artificial reality environment. This can simplify and improve the precision of gesture detection and provide a more pleasing user experience. In addition, the peripheral device may not display the user interface elements at its own display and may not even include a display. The techniques may therefore additionally reduce power consumption and simplify AR applications by eliminating a separate interface that would otherwise need to be generated and displayed, at a presence-sensitive display of a smartphone or tablet for instance, for receiving precision inputs from a user.

In one or more example aspects, an artificial reality system includes an image capture device configured to capture image data; a head-mounted display (HMD) configured to output artificial reality content; a virtual surface application configured to detect a physical peripheral device from the image data, wherein the virtual surface application is configured to generate a user interface comprising a first virtual content item; a rendering engine configured to render, at a user interface position locked relative to a position of the peripheral device, the user interface for display at the HMD; a gesture detector configured to detect a peripheral device gesture performed by a user with respect to the peripheral device, wherein the virtual surface application is configured to generate, in response to the peripheral device gesture, a virtual pinboard comprising a second virtual content item corresponding to the first virtual content item, wherein the rendering engine is configured to render the virtual pinboard comprising the second virtual content item for display at the HMD. In one or more aspects, the gesture detector is configured to detect the peripheral device is in a virtual pinboard active orientation, wherein the virtual surface application is configured to generate, when the peripheral device is in the virtual pinboard active orientation, the user interface. In one or more aspects, the gesture detector is configured to detect the peripheral device is not in a virtual pinboard active orientation, and the virtual surface application is configured to generate, when the peripheral device is not in the virtual pinboard active orientation, a virtual prompt of the user interface to prompt the user to orient the peripheral device to the virtual pinboard active orientation. In one or more aspects, a pose tracker configured to detect the HMD is proximate to a physical position corresponding to a virtual position of the virtual pinboard, wherein the gesture detector is configured to detect the peripheral device is in a virtual pinboard active orientation, wherein the virtual surface application is configured to generate, when the HMD is proximate to the physical position corresponding to the virtual position of the virtual pinboard and when the peripheral device is in the virtual pinboard active orientation, the user interface. In one or more aspects, the user interface comprises a first plurality of scrollable virtual content items, including the first virtual content item, arranged along a dimension of the user interface, the user interface comprises a selection indicator that indicates the first virtual content item can be selected using a virtual content item selection gesture, and the virtual surface application is configured to add, to the virtual pinboard, in response to the peripheral device gesture being the virtual content item selection gesture, the second virtual content item corresponding to the first virtual content item to the virtual pinboard. In one or more aspects, the virtual content item selection gesture comprises a flicking gesture of a hand of the user toward a physical position corresponding to a virtual position of the virtual pinboard. In one or more aspects, the peripheral device gesture comprises a gesture detected at a position on a presence-sensitive surface of the peripheral device or a gesture detected from the image data. In one or more aspects, the peripheral device gesture comprises a virtual content item transformation gesture comprising a translation or rotation movement of the peripheral device in physical space, and the virtual surface application is configured to, in response to the virtual content item transformation gesture, scale, rotate, or translate the second virtual content item, relative to the virtual pinboard, commensurate with the translation or rotation movement of the peripheral device in physical space. In one or more aspects, the virtual surface application is configured to, in response to determining a status of the second virtual content item is active, generate the virtual pinboard to scale, rotate, or translate the second virtual content item. In one or more aspects, the gesture detector is configured to detect a pin gesture, and the virtual surface application is configured to, in response to the pin gesture, set the status of second virtual content item to inactive. In one or more aspects, the peripheral device gesture comprises a virtual content item transformation gesture comprising a vertical or horizontal translation movement of the peripheral device in physical space, the virtual surface application is configured to, in response to the virtual content item transformation gesture, translate the second virtual content item relative to the virtual pinboard. In one or more aspects, the peripheral device gesture comprises a virtual content item transformation gesture comprising a translation movement of the peripheral device toward or away from a plane in physical space corresponding to a virtual plane of the virtual pinboard, and the virtual surface application is configured to, in response to the virtual content item transformation gesture, scale the second virtual content item relative to the virtual pinboard. In one or more aspects, the peripheral device gesture comprises a virtual content item transformation gesture comprising a rotation movement of the peripheral device, and the virtual surface application is configured to, in response to the virtual content item transformation gesture, rotate the second virtual content item relative to the virtual pinboard. In one or more aspects, the peripheral device gesture comprises an annotation gesture, and the virtual surface application is configured to, in response to the annotation gesture, generate the virtual pinboard to annotate the second virtual content item using the peripheral device. In one or more aspects, the virtual pinboard comprises a third virtual content item, the gesture detector is configured to detect a virtual content item store gesture, and the virtual surface application is configured to, in response to the virtual content item store gesture, store the third virtual content item to storage associated with the user. In one or more aspects, the artificial reality system further includes the peripheral device, wherein the peripheral device comprises a presence-sensitive surface that detects user inputs, and wherein the gesture detector is configured to detect the peripheral device gesture by processing the user inputs. In one or more aspects, the gesture detector is configured to detect a rotation gesture of the peripheral device that transitions the peripheral device from a virtual pinboard inactive orientation to a virtual pinboard active orientation, and the virtual surface application is configured to generate, in response to the rotation gesture, the user interface comprising the first virtual content item.

In one or more additional example aspects, a method includes obtaining, by an artificial reality system including a head-mounted display (HMD), image data via an image capture device, the HMD configured to output artificial reality content; detecting, by the artificial reality system, a physical peripheral device from the image data; generating, by the artificial reality system, a user interface comprising a first virtual content item; rendering, by the artificial reality system at a user interface position locked relative to a position of the peripheral device, the user interface for display at the HMD; detecting, by the artificial reality system, a peripheral device gesture performed by a user with respect to the peripheral device; generating, by the artificial reality system in response to the peripheral device gesture, a virtual pinboard comprising a second virtual content item corresponding to the first virtual content item; and rendering, by the artificial reality system, the virtual pinboard comprising the second virtual content item for display at the HMD. In one or more aspects, the user interface comprises a first plurality of scrollable virtual content items, including the first virtual content item, arranged along a dimension of the user interface, the user interface comprises a selection indicator that indicates the first virtual content item can be selected using a virtual content item selection gesture, and the method further comprising adding, by the artificial reality system to the virtual pinboard, in response to the peripheral device gesture being the virtual content item selection gesture, the second virtual content item corresponding to the first virtual content item to the virtual pinboard.

In one or more additional example aspects, a non-transitory, computer-readable medium includes instructions that, when executed, cause one or more processors of an artificial reality system including a head-mounted display (HMD) configured to output artificial reality content to: obtain image data via an image capture device; detect a physical peripheral device from the image data; generate a user interface comprising a first virtual content item; render, at a user interface position locked relative to a position of the peripheral device, the user interface for display at the HMD; detect a peripheral device gesture performed by a user with respect to the peripheral device; generate, in response to the peripheral device gesture, a virtual pinboard comprising a second virtual content item corresponding to the first virtual content item; and render the virtual pinboard comprising the second virtual content item for display at the HMD.

In one or more additional example aspects, an artificial reality system includes an image capture device configured to capture image data; a head mounted display (HMD) configured to output artificial reality content; a virtual surface application configured to detect a physical peripheral device from the image data, wherein the virtual surface application is configured to generate first one or more virtual markings based on user input detected at first locations on a surface of the peripheral device; and a rendering engine configured to render, at the first locations on the surface of the peripheral device, the first one or more virtual markings for display at the HMD, wherein the virtual surface application is configured to generate second one or more virtual markings based on the first one or more virtual markings, and wherein the rendering engine is configured to render, on a virtual drawing surface, the second one or more virtual markings for display at the HMD. In one or more aspects, the user input detected at first locations on the surface of the peripheral device comprises user inputs detected at a presence-sensitive surface of the peripheral device. In one or more aspects, a gesture detector configured to detect a placement gesture performed by the user using the peripheral device, wherein the virtual surface application is configured to, in response to the placement gesture, generate the second one or more virtual markings. In one or more aspects, the placement gesture comprises a stamping motion comprising a first translation, by the user, of the peripheral device toward a physical location corresponding to a virtual location of the virtual drawing surface, followed by a second translation, by the user, of the peripheral device away from the physical location corresponding to the virtual location of the virtual drawing surface. In one or more aspects, the placement gesture comprises touching, by the user, the peripheral device to a physical surface corresponding to the virtual drawing surface. In one or more aspects, the placement gesture comprises holding, by the user, the peripheral device within a threshold distance of a physical surface corresponding to the virtual drawing surface for a threshold amount of time. In one or more aspects, a gesture detector configured to detect a virtual drawing transformation gesture performed by the user, the virtual drawing transformation gesture comprising a translation or rotation movement of the peripheral device in physical space, wherein the virtual surface application is configured to, in response to the virtual drawing transformation gesture, scale, rotate, or translate the second one or more virtual markings, commensurate with the translation or rotation movement of the peripheral device in physical space. In one or more aspects, the virtual surface application is configured to, in response to determining a status of the virtual drawing surface is active, generate the virtual drawing surface to scale, rotate, or translate the second one or more virtual markings. In one or more aspects, a gesture detector configured to detect a virtual drawing transformation gesture performed by the user, the virtual drawing transformation gesture comprising a vertical or horizontal translation movement of the peripheral device in physical space, wherein the virtual surface application is configured to, in response to the virtual drawing transformation gesture, translate the second one or more virtual markings. In one or more aspects, a gesture detector configured to detect a virtual drawing transformation gesture performed by the user, the virtual drawing transformation gesture comprising a translation movement of the peripheral device toward or away from a plane in physical space corresponding to a virtual plane of the virtual drawing surface, wherein the virtual surface application is configured to, in response to the virtual content item transformation gesture, scale the second one or more virtual markings. In one or more aspects, a gesture detector configured to detect a virtual drawing transformation gesture comprising a rotation movement of the peripheral device, and wherein the virtual surface application is configured to, in response to the virtual drawing transformation gesture, rotate the second one or more virtual markings. In one or more aspects, the artificial reality system further includes the peripheral device, wherein the peripheral device comprises a presence-sensitive surface that detects the user inputs, and a gesture detector configured to detect the peripheral device gesture by processing the user inputs. In one or more aspects, a gesture detector configured to detect the user inputs from the image data.

In one or more additional example aspects, a method includes obtaining, by an artificial reality system including a head mounted display (HMD), image data via an image capture device, the HMD configured to output artificial reality content; detecting, by the artificial reality system, a physical peripheral device from the image data; detecting, by the artificial reality system, user input at first locations on a surface of the peripheral device; generating, by the artificial reality system, first one or more virtual markings based on the user input detected at the first locations on the surface of the peripheral device; rendering, by the artificial reality system at the first locations on the surface of the peripheral device, the first one or more virtual markings for display at the HMD; generating, by the artificial reality system, second one or more virtual markings based on the first one or more virtual markings; and rendering, by the artificial reality system on a virtual drawing surface, the second one or more virtual markings for display at the HMD. In one or more aspects, detecting, by the artificial reality system, a placement gesture performed by the user using the peripheral device, wherein generating the second one or more virtual markings comprises generating, in response to the placement gesture, the second one or more virtual markings based on the first one or more virtual markings. In one or more aspects, the placement gesture comprises a stamping motion comprising a first translation, by the user, of the peripheral device toward a physical location corresponding to a virtual location of the virtual drawing surface, followed by a second translation, by the user, of the peripheral device away from the physical location corresponding to the virtual location of the virtual drawing surface. In one or more aspects, detecting, by the artificial reality system, a virtual drawing transformation gesture comprising a translation or rotation movement of the peripheral device in physical space; and in response to the virtual drawing transformation gesture, scaling, rotating, or translating, by the artificial reality system, the second one or more virtual markings, commensurate with the translation or rotation movement of the peripheral device in physical space.

In one or more additional example aspects, a non-transitory, computer-readable medium includes instructions that, when executed, cause one or more processors of an artificial reality system to: obtain image data via an image capture device; detect a physical peripheral device from the image data; detect user input at first locations on a surface of the peripheral device; generate first one or more virtual markings based on the user input detected at the first locations on the surface of the peripheral device; render, at the first locations on the surface of the peripheral device, the first one or more virtual markings for display at a head-mounted display (HMD); generate second one or more virtual markings based on the first one or more virtual markings; and render, on a virtual drawing surface, the second one or more virtual markings for display at the HMD. In one or more aspects, the instructions further cause the one or more processors to: detect a placement gesture performed by the user using the peripheral device; and generate the second one or more virtual markings in response to the placement gesture. In one or more aspects, the instructions further cause the one or more processors to: detect a virtual drawing transformation gesture comprising a translation or rotation movement of the peripheral device in physical space; and in response to the virtual drawing transformation gesture, scale, rotate, or translate the second one or more virtual markings, commensurate with the translation or rotation movement of the peripheral device in physical space.

In one or more additional example aspects, an artificial reality system includes an image capture device configured to capture image data; a head-mounted display (HMD) configured to output artificial reality content; a virtual surface application configured to detect a physical peripheral device from the image data; a gesture detector configured to detect a pose of the peripheral device, wherein the virtual surface application is configured to: generate, based on the pose of the peripheral device, a virtual pointer along at least a portion of a line between the peripheral device and a virtual surface, the virtual pointer pointing at a location of the virtual surface; and perform one or more actions based on the location of the virtual surface; and a rendering engine configured to render the virtual pointer and the virtual surface for display at the HMD. In one or more aspects, the gesture detector is configured to detect a pointer drawing gesture in which the user modifies a pose of the peripheral device to cause the virtual pointer to point at multiple locations of the virtual surface at different times, to perform the one or more actions, the virtual surface application is configured to generate, in response to the peripheral device drawing gesture, one or more virtual markings at the locations of the virtual surface, and the rendering engine is configured to render the one or more virtual markings for display at the HMD. In one or more aspects, the virtual surface application is configured to generate a user interface comprising a draw element, the pointer drawing gesture comprises selection of the draw element, and the rendering engine is configured to render, at a user interface position locked relative to a position of the peripheral device, the user interface for display at the HMD. In one or more aspects, to generate the virtual pointer, the virtual surface application is configured to generate a visible element, and to render the virtual pointer, the rendering engine is configured to render the visible element at the location of the virtual surface. In one or more aspects, to generate the virtual pointer, the virtual surface application is configured to generate one or more visible elements along at least a portion of the line between the peripheral device and the location of the virtual surface. In one or more aspects, the one or more visible elements are partially transparent. In one or more aspects, the virtual surface application is configured to generate a user interface comprising one or more modify elements that allow a user to change a color or width of the virtual pointer, the virtual surface application is configured to change the color or width of the virtual pointer when the one or more modify elements are selected by a user, and the rendering engine is configured to render, at a user interface position locked relative to a position of the peripheral device, the user interface for display at the HMD. In one or more aspects, the gesture detector is configured to detect a peripheral device gesture performed by a user with respect to the peripheral device, the virtual surface includes one or more virtual content items and the location of the virtual surface corresponds to a selected virtual content item of the one or more virtual content items, the peripheral device gesture comprises a virtual content item transformation gesture comprising a translation or rotation movement of the peripheral device in physical space, and to perform the one or more actions, the virtual surface application is configured to, in response to the virtual content item transformation gesture, scale, rotate, or translate the selected virtual content item, relative to the virtual pinboard, commensurate with the translation or rotation movement of the peripheral device in physical space. In one or more aspects, the virtual surface application is configured to generate a user interface comprising a virtual content transformation element, virtual content item transformation gesture comprises selecting the virtual content transformation element, and the rendering engine is configured to render, at a user interface position locked relative to a position of the peripheral device, the user interface for display at the HMD. In one or more aspects, the gesture detector is configured to detect a peripheral device gesture performed by a user with respect to the peripheral device, the virtual surface includes one or more virtual content items and the location of the virtual surface corresponds to a selected virtual content item of the one or more virtual content items, the peripheral device gesture comprises an annotation gesture, and to perform the one or more actions, the virtual surface application is configured to, in response to the annotation gesture, generate the virtual surface to annotate the selected virtual content item.

In one or more additional example aspects, a method includes obtaining, by an artificial reality system including a head mounted display (HMD), image data via an image capture device, the HMD configured to output artificial reality content; detecting, by the artificial reality system, a physical peripheral device from the image data; detecting, by the artificial reality system, a pose of the peripheral device; generating, by the artificial reality system, based on the pose of the peripheral device, a virtual pointer along at least a portion of a line between the peripheral device and a virtual surface, the virtual pointer pointing at a location of the virtual surface; performing, by the artificial reality system, one or more actions based on the location of the virtual surface; and rendering, by the artificial reality system, the virtual pointer and the virtual surface for display at the HMD. In one or more aspects, detecting, by the artificial reality system, a pointer drawing gesture in which the user modifies a pose of the peripheral device to cause the virtual pointer to point at multiple locations of the virtual surface at different times, wherein performing, by the artificial reality system, the one or more actions comprises generating one or more virtual markings at the locations of the virtual surface; and rendering, by the artificial reality system, the virtual markings for display at the HMD. In one or more aspects, generating, by the artificial reality system, a user interface comprising a drawing element, wherein the pointer drawing gesture comprises selection of the drawing element; and rendering, by the artificial reality system at a user interface position locked relative to a position of the peripheral device, the user interface for display at the HMD. In one or more aspects, generating, by the artificial reality system, a user interface comprising one or more modify elements that allow a user to change a color or width of the virtual pointer; changing, by the artificial reality system, the color or width of the virtual pointer when the one or more modify elements are selected by a user; and rendering, by the artificial reality system at a user interface position locked relative to a position of the peripheral device, the user interface for display at the HMD. In one or more aspects, detecting, by the artificial reality system, a peripheral device gesture performed by a user with respect to the peripheral device, wherein the virtual surface includes one or more virtual content items and the location of the virtual surface corresponds to a selected virtual content item of the one or more virtual content items, wherein the peripheral device gesture comprises a virtual content item transformation gesture comprising a translation or rotation movement of the peripheral device in physical space; and in response to the virtual content item transformation gesture, scaling, rotating, or translating, by the artificial reality system, the selected virtual content item, relative to the virtual pinboard, commensurate with the translation or rotation movement of the peripheral device in physical space. In one or more aspects, detecting, by the artificial reality system, a peripheral device gesture performed by a user with respect to the peripheral device, wherein the virtual surface includes one or more virtual content items and the location of the virtual surface corresponds to a selected virtual content item of the one or more virtual content items, wherein the peripheral device gesture comprises an annotation gesture, and generating, by the artificial reality system in response to the virtual content item annotation gesture, the virtual surface to annotate the selected virtual content item.

In one or more additional example aspects, a non-transitory, computer-readable medium includes instructions that, when executed, cause one or more processors of an artificial reality system to: obtain image data via an image capture device; detect a physical peripheral device from the image data; detect a pose of the peripheral device; generate, based on the pose of the peripheral device, a virtual pointer along at least a portion of a line between the peripheral device and to a virtual surface, the virtual pointer pointing a location of the virtual surface; perform one or more actions based on the location of the virtual surface; and render the virtual pointer and the virtual surface for display at the HMD. In one or more aspects, the instructions further cause the one or more processors to: detect a pointer drawing gesture in which the user modifies a pose of the peripheral device to cause the virtual pointer to point at multiple locations of the virtual surface at different times, wherein performing the one or more actions comprises generating, in response to the peripheral device drawing gesture, one or more virtual markings at the locations of the virtual surface, and render the one or more virtual markings for display at the HMD. In one or more aspects, the instructions further cause the one or more processors to: generate a user interface comprising a drawing element, wherein the pointer drawing gesture comprises selection of the drawing element; and render, at a user interface position locked relative to a position of the peripheral device, the user interface for display at the HMD. In one or more aspects, the instructions further cause the one or more processors to: detect a peripheral device gesture performed by a user with respect to the peripheral device, wherein the virtual surface includes one or more virtual content items and the location of the virtual surface corresponds to a selected virtual content item of the one or more virtual content items, wherein the peripheral device gesture comprises a virtual content item transformation gesture comprising a translation or rotation movement of the peripheral device in physical space; and in response to the virtual content item transformation gesture, scale, rotate, or translate the selected virtual content item, relative to the virtual pinboard, commensurate with the translation or rotation movement of the peripheral device in physical space.

The details of one or more examples are set forth in the accompanying drawings and the description below. Other features, objects, and advantages will be apparent from the description and drawings, and from the claims.

DETAILED DESCRIPTION

Figure 1A:
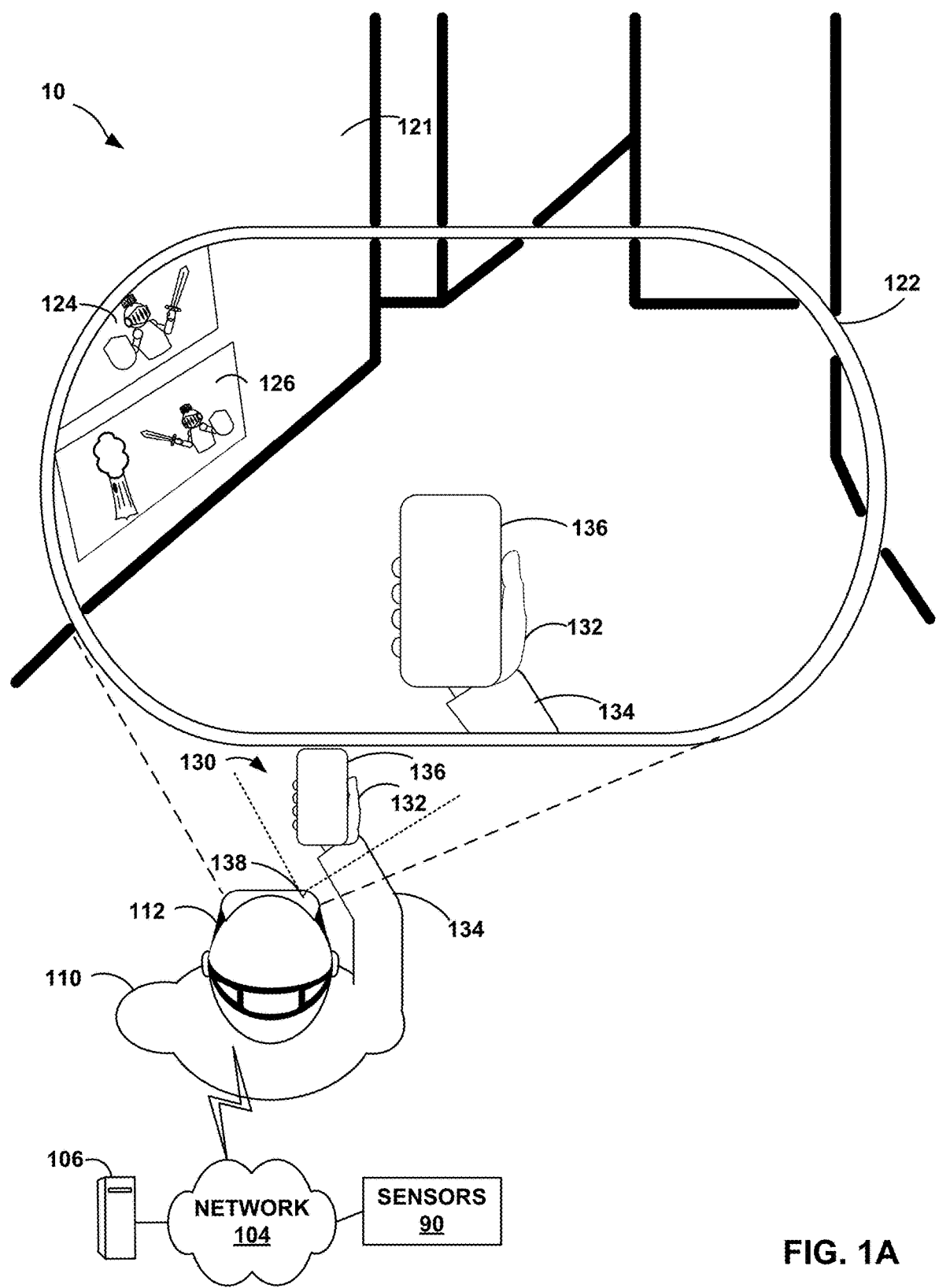
FIG. 1A is an illustration depicting an example artificial reality system including a head-mounted display (HMD) and a peripheral device in accordance with techniques of the disclosure.

FIG. 1A is an illustration depicting an example artificial reality system 10 including a head-mounted display (HMD) 112 and a peripheral device 136 in accordance with the techniques of the disclosure. In some examples, artificial reality system 10 generates and renders virtual content items 124, 126 (e.g., GIFs, photos, applications, live-streams, videos, text, a web-browser, drawings, animations, 3D models, representations of data files (including two-dimensional and three-dimensional datasets), or any other visible media) on a virtual surface. That is, as described herein, artificial reality system 10 presents one or more virtual content items in response to a determination that at least a portion of the location of virtual content items is in the field of view 130 of user 110. In some examples, a virtual surface is associated with a planar or other real-world surface (e.g., the virtual surface corresponds to and is locked to a physical planar surface, such as a wall table, or ceiling). In the example shown in FIG. 1A, the virtual surface is associated with wall 121. In other examples, a virtual surface can be associated with a portion of a surface (e.g., a portion of wall 121). In some examples, only the virtual content items contained within a virtual surface are rendered. In other examples, the virtual surface is generated and rendered (e.g., as a virtual plane with a textured, colored, and/or opaque surface or as a border corresponding to the virtual surface). In some examples, a virtual surface can be rendered as floating in a virtual or real-world physical environment (e.g., not associated with a particular real-world surface).

In the example of FIG. 1A, artificial reality system 10 includes HMD 112, console 106 and, in some examples, one or more external sensors 90. As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, peripheral device 136, and sensors 90 may, as shown in this example, be communicatively coupled via one or more networks 104, which may include wired or wireless networks, such as Wi-Fi, mesh networks or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. In some examples, artificial reality content 122 may comprise a mixture of real-world imagery (e.g., hand 132, peripheral device 136, walls 121) and virtual objects (e.g., virtual content items 124, 126) (e.g., mixed reality and/or augmented reality). In some examples, each of virtual content items 124, 126 is mapped (e.g., pinned, locked, placed) to a particular position within artificial reality content 122. In some examples, the particular position of a virtual content item within artificial reality content 122 corresponds to a position within the real world, physical environment (e.g., on a surface of a physical object). In the example shown in FIG. 1A, virtual content items 124, 126 are mapped to fixed positions on wall 121. The example in FIG. 1A also shows that virtual content item 124 partially appears on wall 121 only within artificial reality content 122, illustrating that this virtual content does not exist in the real world, physical environment.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

In accordance with the techniques of this disclosure, in some examples, artificial reality system 10 may trigger generation and rendering of virtual content items 124, 126 based on a current field of view 130 of user 110, as may be determined by real-time gaze tracking of the user, or other conditions. More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along with virtual objects, such as within artificial reality content 122. In some examples, the artificial reality application may render virtual representations of the portions of peripheral device 136, hand 132, and/or arm 134 of user 110 that are within field of view 130 (e.g., render real-world objects as virtual objects) within artificial reality content 122. In these examples, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

In any case, during operation, artificial reality system 10 performs object recognition within image data captured by image capture devices 138 of HMD 112 or other external image capture devices to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of kiosk or other stationary or mobile system. Peripheral device 136 may or may not include a display device for outputting content to a screen. In some examples, peripheral device 136 may be in communication with HMD 112 and/or console 106 using wireless communications links (e.g., Wi-Fi, near-field communication of short-range wireless communication such as Bluetooth), using wired communication links, or using other types of communication links. In some examples, peripheral device 136 includes one or more presence-sensitive surfaces for detecting one or more objects (e.g., fingers, stylus) touching or hovering over the presence-sensitive surface. The artificial reality application analyzes any tracked motions, configurations, positions, and/or orientations of peripheral device 136, hand 132, and/or portions of arm 134 to identify one or more gestures performed by particular objects, e.g., peripheral device 136, hand 132 (including particular digits of the hand), and/or portions of arm 134 of user 110. To detect the gesture(s), the artificial reality application may compare the motions, configurations, positions and/or orientations of peripheral device 136, hand 132, and/or portions of arm 134 to gesture definitions stored in a gesture library of artificial reality system 10, where each gesture in the gesture library may be mapped to one or more actions. In some examples, detecting movement may include tracking positions of one or more of the digits (individual fingers and thumb) of hand 132, including whether one or more digits (such as an index finger) perform a flicking or throwing gesture. In other examples, detecting movement may include tracking a position and/or orientation of peripheral device 136, hand 132 (optionally including particular digits of the hand), and/or arm 134 (i.e., the normal of the arm facing toward HMD 112) relative to the current pose of HMD 112. The position and orientation of peripheral device or hand 132 (or a portion thereof) thereof may alternatively be referred to as the pose of peripheral device 136 and/or hand 132 (or a portion thereof), respectively.

Moreover, the artificial reality application may analyze configurations, positions, and/or orientations of peripheral device 136, hand 132, and/or arm 134 to identify a gesture that includes peripheral device 136, hand 132, and/or arm 134 being held in one or more specific configurations, positions, and/or orientations for at least a threshold period of time. As examples, one or more particular positions at which peripheral device 136, hand 132, and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element, such as a menu. As another example, one or more particular configurations of the peripheral device 136 and/or hand 132 being maintained within field of view 130 against a surface (e.g., wall 121) for at least a configurable period of time may be used by artificial reality system 10 as an indication that user 110 is attempting to perform a stamping gesture. Although only right hand 132 and right arm 134 of user 110 are illustrated in FIG. 1A, in other examples, artificial reality system 10 may identify a left hand and/or arm of user 110 or both right and left hands and/or arms of user 110. In this way, artificial reality system 10 may detect single-handed gestures performed by either hand, double-handed gestures, or arm-based gestures within the physical environment, and generate associated user interface elements in response to the detected gestures.

The artificial reality system 10 determines whether an identified gesture corresponds to a gesture defined by one of a plurality of entries in a gesture library of console 106 and/or HMD 112. Each of the entries in the gesture library may define a different gesture as a specific motion, configuration, position, and/or orientation of a peripheral device, a user's hand, digit(s) (finger(s) or thumb(s)), and/or arm over time, or a combination of such properties. In addition, each of the defined gestures may be associated with a desired response in the form of one or more actions to be performed by the artificial reality application. As one example, one or more of the defined gestures in the gesture library may trigger the generation, transformation, and/or configuration of one or more user interface elements (e.g., virtual content, a menu) to be rendered and overlaid on artificial reality content 122, where the gesture may define a location and/or orientation of UI elements in artificial reality content 122. As another example, one or more of the defined gestures may indicate an interaction by user 110 with a particular user interface element, e.g., selection of a UI element to trigger the presentation and/or placement of virtual content, a change to a presented user interface, presentation of other menu elements of the presented user interface, or the like.

In some aspects, AR system 10 may analyze configurations, positions, and/or orientations of peripheral device 136 to identify a menu activation gesture that includes peripheral device 136 being held in a specific configuration and orientation for at least a threshold period of time. The menu activation gesture may, for example, be peripheral device being held in a substantially horizontal orientation (e.g., a landscape orientation) (not shown in FIG. 1A).

AR system 10 generates and presents virtual surfaces within the artificial reality environment and facilitates user interaction with the virtual surfaces using peripheral device 136. As described in further detail below, the virtual surface may include a virtual pinboard or a virtual drawing surface (e.g., a virtual canvas) in an artificial reality environment. AR system 10 enables the user to interact with the virtual surfaces using peripheral device 136, which may be manipulated and otherwise interacted with by the user to provide input to AR system 10 through pose tracking of the peripheral device 136 and/or via one or more input devices of the peripheral device, such as a presence-sensitive surface.

Accordingly, the techniques of the disclosure provide specific technical improvements to the computer-related field of rendering and displaying content by an artificial reality system. For example, artificial reality systems as described herein may provide a high-quality artificial reality experience to a user of the artificial reality system by generating and rendering artificial reality content and interacting with virtual surfaces based on detection of interactions with peripheral device 136 by the user. More specifically, the techniques may provide the user with intuitive user input in the form of gestures associated with the peripheral device by which the user may activate a menu interface and/or create, select, place, move, scale, rotate, or otherwise alter virtual content with respect to a virtual surface.

In addition, systems as described herein may be configured to detect gestures that provide self-haptic feedback to the user. For example, one or more fingers on each hand of the user may touch or approximately touch the peripheral device in the physical world as part of an interaction with a particular virtual user interface element in the artificial reality content. The touch between the one or more fingers of the user's hand and the peripheral device may provide the user with a simulation of the sensation felt by the user when interacting directly with a physical user input object, such as a button on a physical keyboard or other physical input device.

As another example, AR systems as described herein can enable the user to provide fine-grained user inputs with respect to virtual user interface elements rendered virtually on a peripheral device 136 that provides haptic feedback, in contrast to free-floating virtual user interfaces in the artificial reality environment. This can simplify and improve the precision of gesture detection. In addition, peripheral device 136 may not display the user interface elements at its own display and may not even include a display. The techniques may therefore additionally reduce power consumption and simplify AR applications by eliminating a separate interface that would otherwise need to be generated and displayed, at a presence-sensitive display of a smartphone or tablet for instance, for receiving precision inputs from a user. In some examples, receiving user inputs with a presence-sensitive surface may provide more precise gesture detection than image-based gesture detection techniques.

Figure 1B:
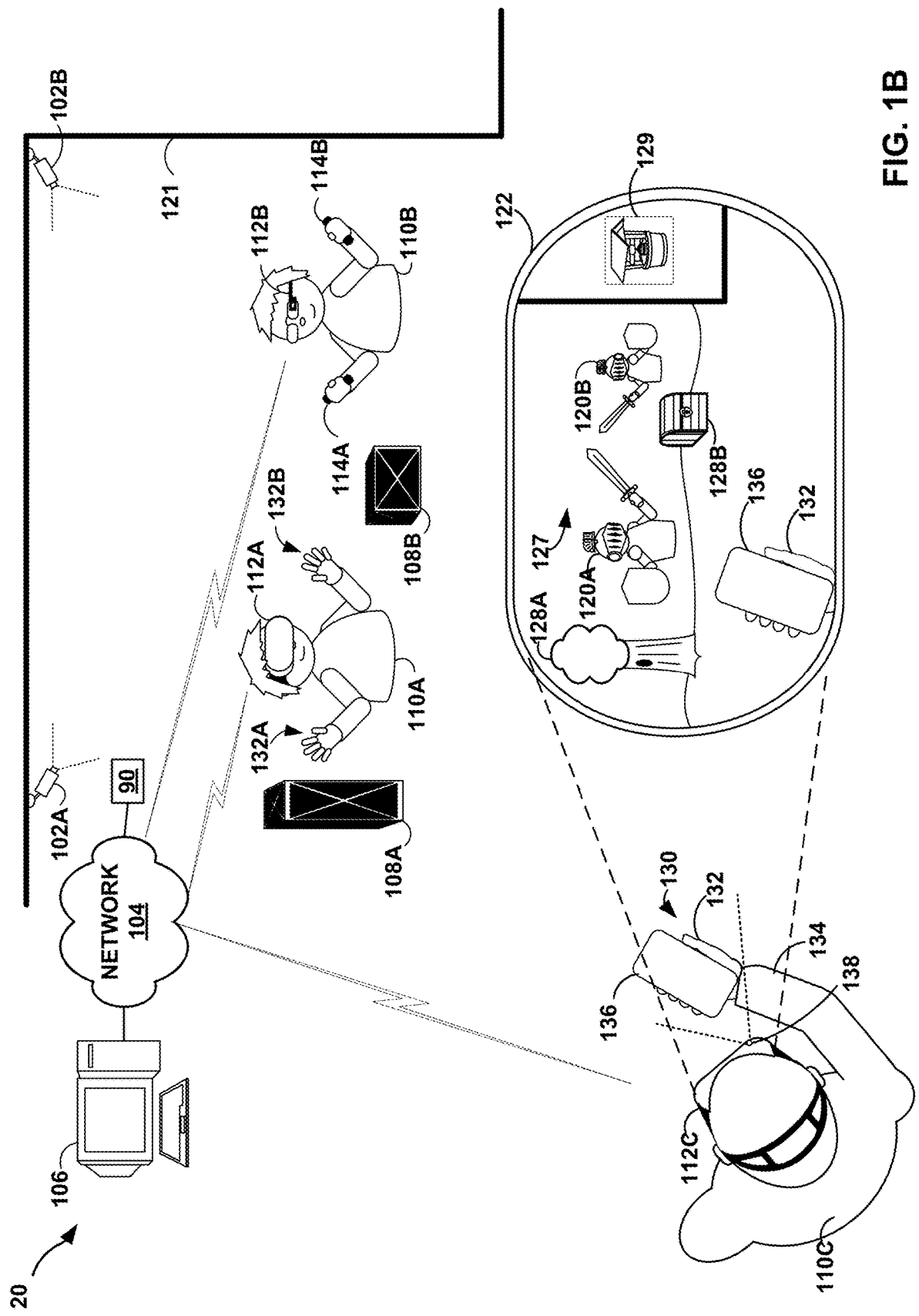
FIG. 1B is an illustration depicting an example artificial reality system in accordance with techniques of the disclosure.

FIG. 1B is an illustration depicting another example artificial reality system 20 in accordance with the techniques of the disclosure. Similar to artificial reality system 10 of FIG. 1A, in some examples, artificial reality system 20 of FIG. 1B may generate and render virtual content items with respect to a virtual surface within an artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 136 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Figure 2A:
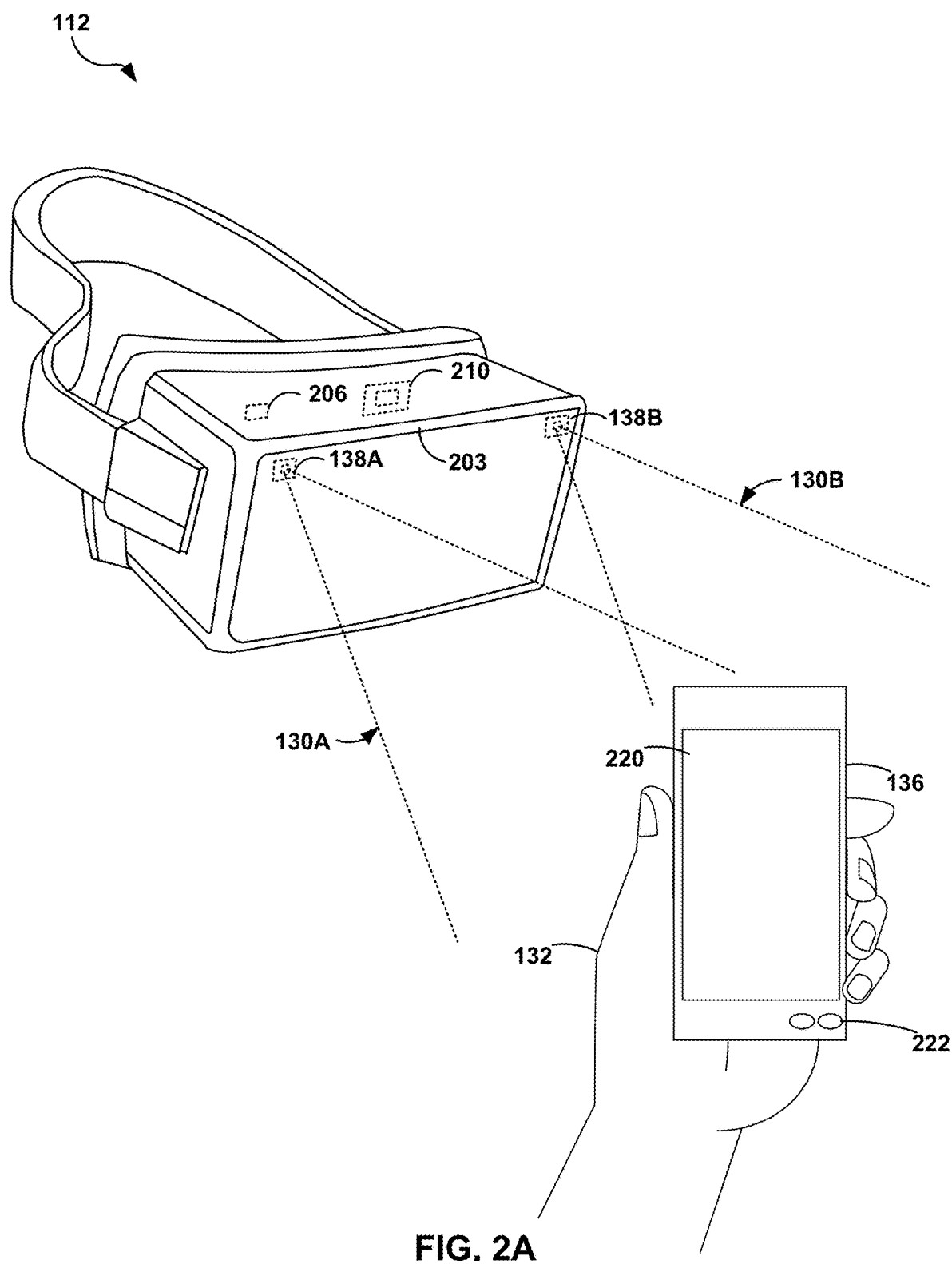
FIG. 2A is an illustration depicting an example HMD and an example peripheral device, in accordance with techniques of the disclosure.

FIG. 2A is an illustration depicting an example HMD 112 and an example peripheral device 136, in accordance with techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, in accordance with the techniques described herein, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). As explained herein, in accordance with the techniques of the disclosure, control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, in accordance with the techniques described herein, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices 222 (e.g., buttons, trackball, scroll wheel) for interacting with virtual content (e.g., to select a virtual UI element, scroll through virtual UI elements).

Figure 2B:
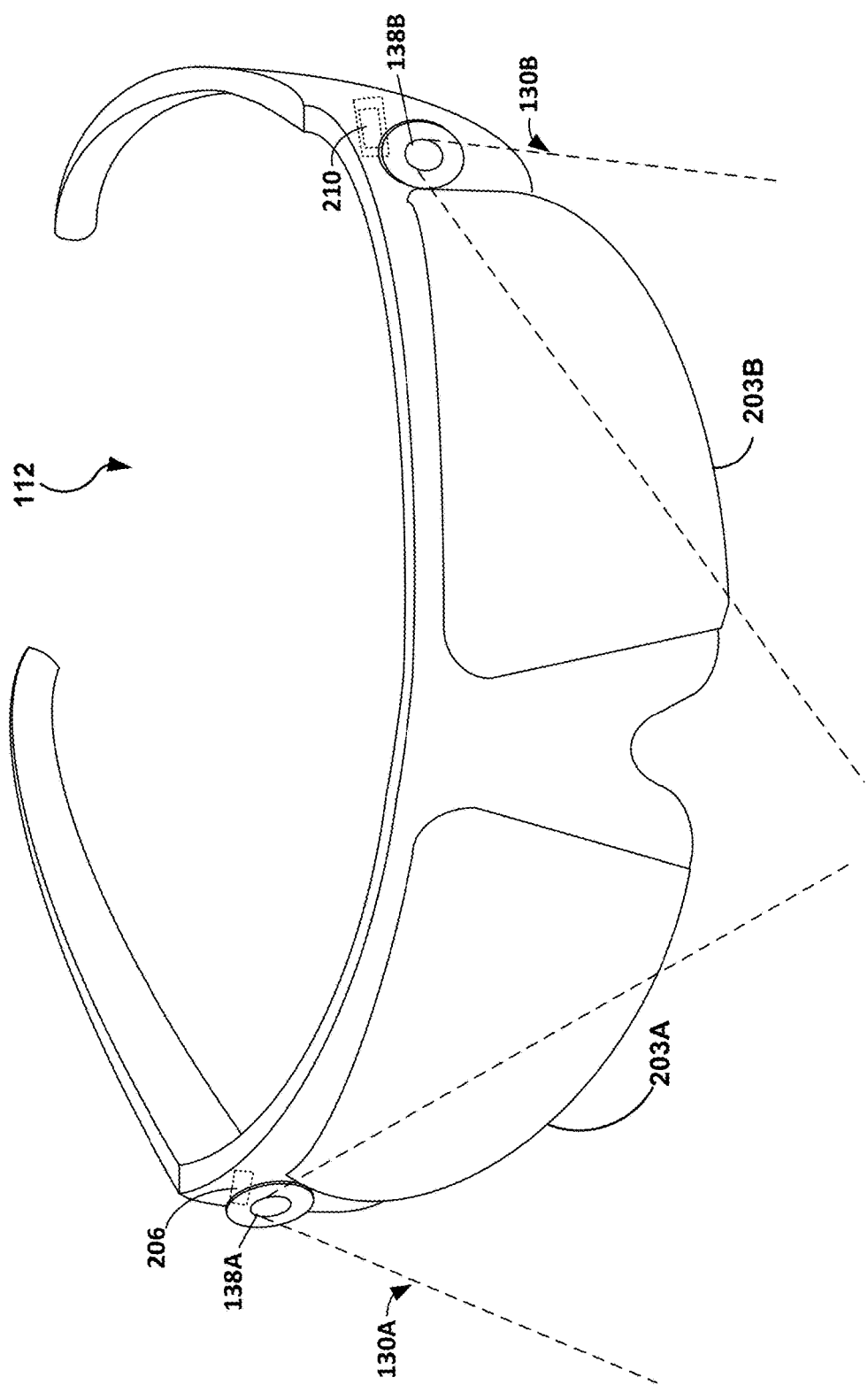
FIG. 2B is an illustration depicting an example HMD, in accordance with techniques of the disclosure.

FIG. 2B is an illustration depicting an example HMD 112, in accordance with techniques of the disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 3:
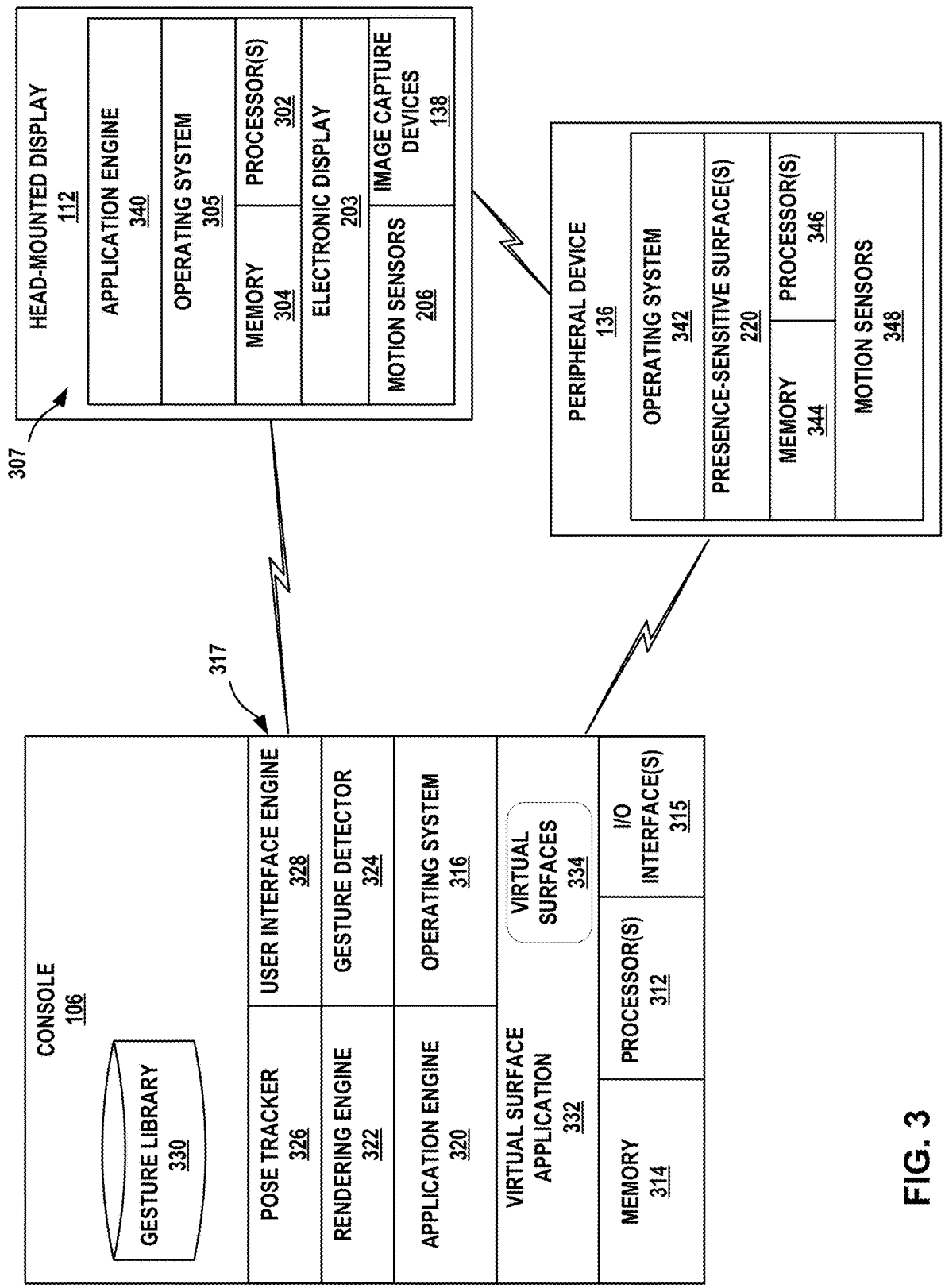
FIG. 3 is a block diagram showing example implementations of a console, an HMD, and a peripheral device of the artificial reality systems of FIGS. 1A, 1B.

FIG. 3 is a block diagram showing example implementations of console 106, HMD 112, and peripheral device 136 of artificial reality system 10, 20 of FIGS. 1A, 1B. In the example of FIG. 3, console 106 performs pose tracking, gesture detection, and user interface and virtual surface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, user interface engine 328, and virtual surface application 332. In some examples, virtual surface application 332 includes functionality to generate and render virtual surfaces in accordance with this disclosure. In one or more aspects, virtual surfaces 334 is a data structure that stores virtual surface information for virtual surfaces. Virtual surface information can include information about the physical location that corresponds to the virtual surface (e.g., the location of the of the virtual surface), the dimensions of the virtual surface, virtual content items pinned or otherwise associated with a virtual surface (e.g., the virtual media item files and any metadata associated with those media item files, virtual markings), etc. In one or more aspects, the information stored in virtual surfaces 334 can be stored in a database, a map, a search tree, or any other data structure.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112. Application engine 320 may execute all or portions of virtual surface application 332.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

In some examples, pose tracker 326 determines a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), where proximate may refer to being within a threshold distance from the virtual surface.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. Gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 executing on console 106 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Figure 4:
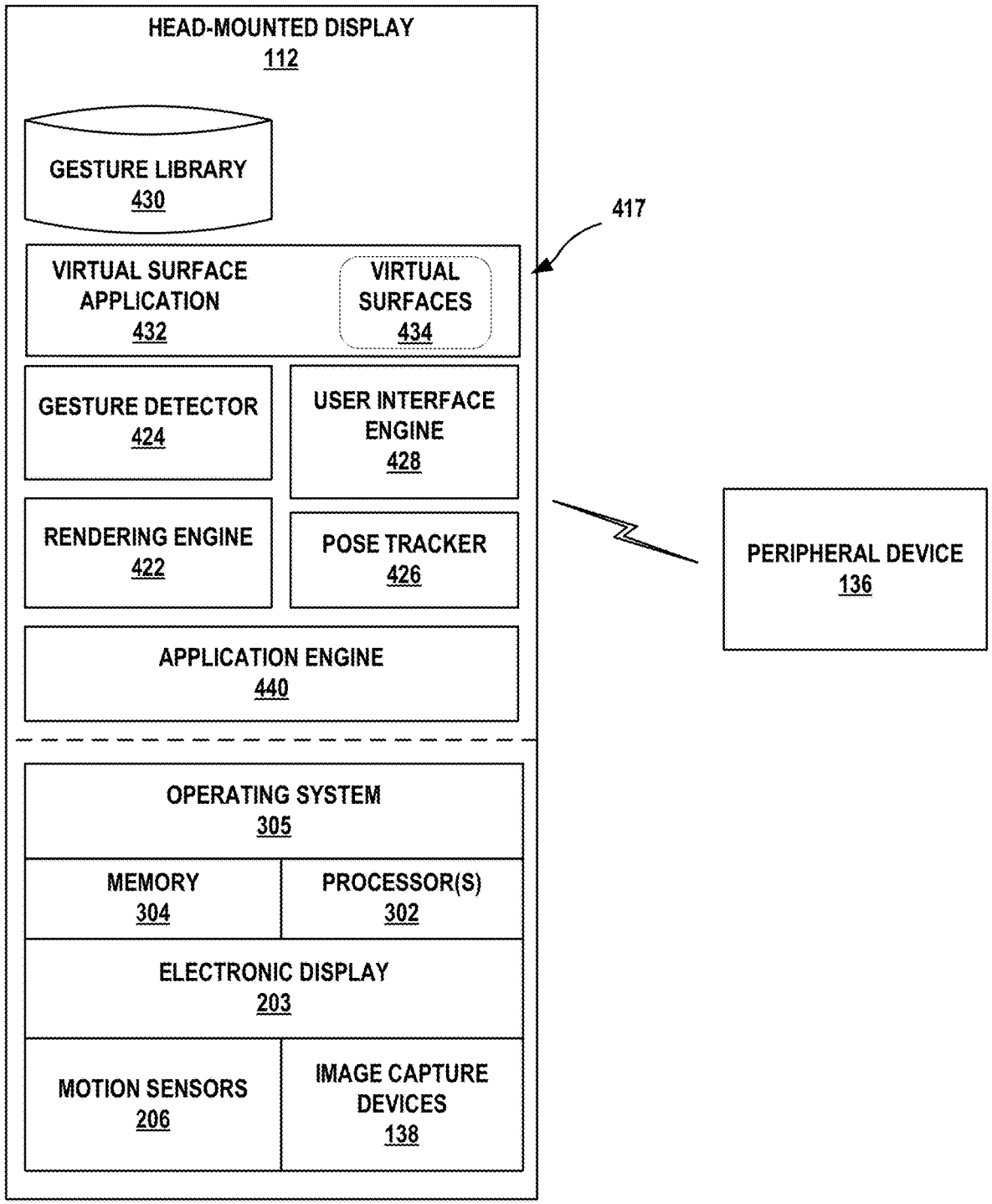
FIG. 4 is a block diagram depicting an example in which gesture detection, user interface generation, and virtual surface functions are performed by the HMD of the artificial reality systems of FIGS. 1A, 1B in accordance with the techniques of the disclosure.

FIG. 4 is a block diagram depicting an example in which gesture detection and virtual surface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include virtual surface application 452, application engine 440, rendering engine 422, gesture detector 424, pose tracker 426, and user interface engine 428. In various examples, software components 417 operate similar to the counterpart components of console 106 of FIG. 3 (e.g., virtual surface application 352, application engine 320, rendering engine 322, gesture detector 324, pose tracker 326, and user interface engine 328) to construct virtual surfaces and/or virtual objects overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110. In accordance with the techniques of the disclosure, virtual surface application 332 generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136.

Gesture detector 424 may track movement, including changes to position and orientation, of the peripheral device, hand (including digits), and/or arm based on the captured image data, and compare motion vectors of the objects to one or more entries in gesture library 430 to detect a gesture or combination of gestures performed by user 110. Gesture library 430 is similar to gesture library 330 of FIG. 3. Some of all of the functionality of gesture detector 424 may be executed by peripheral device 136.

Figure 5:
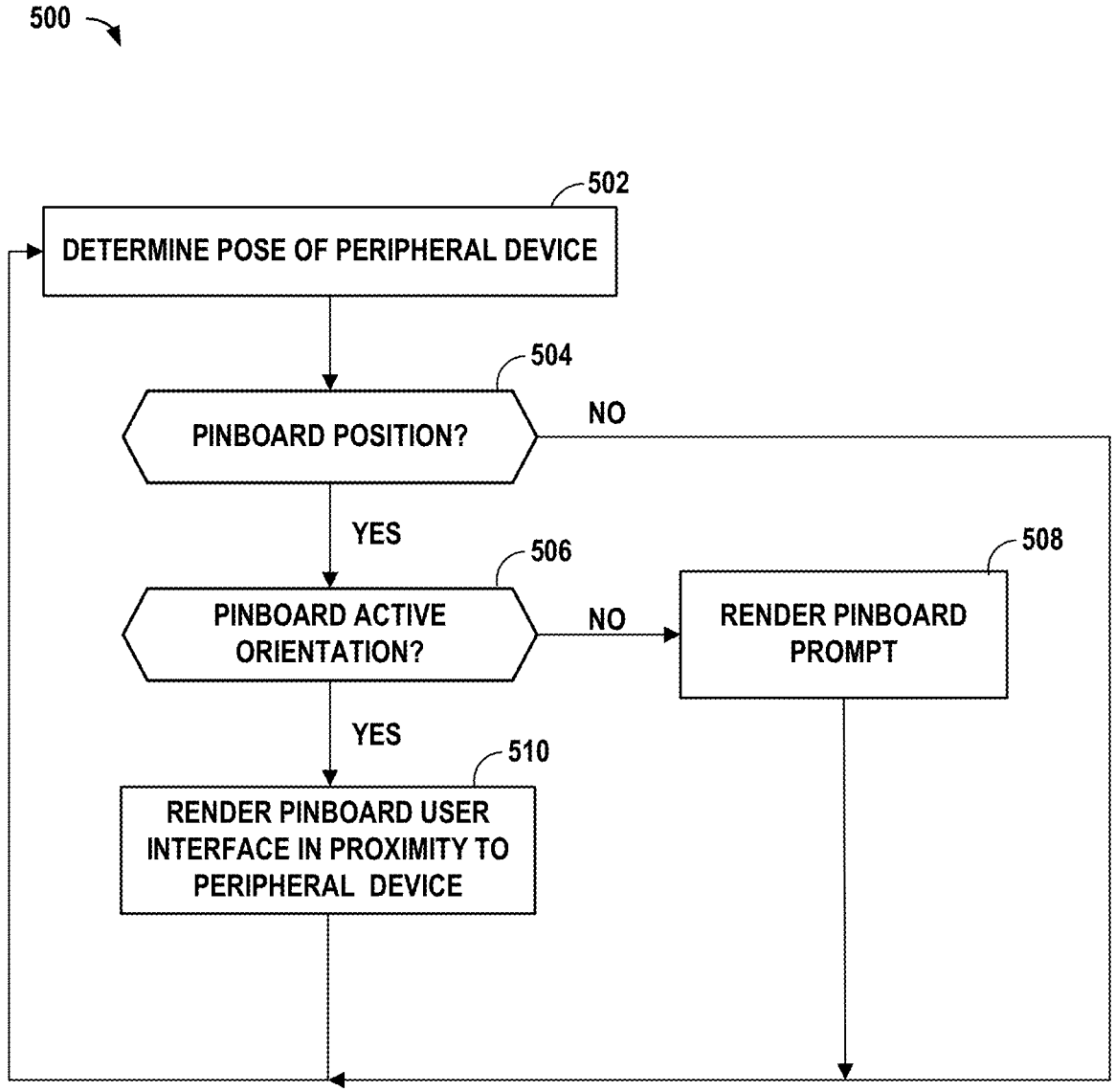
FIG. 5 is a flowchart illustrating operations of an example mode of operation for an artificial reality system, in accordance with aspects of the disclosure.
Figure 6:
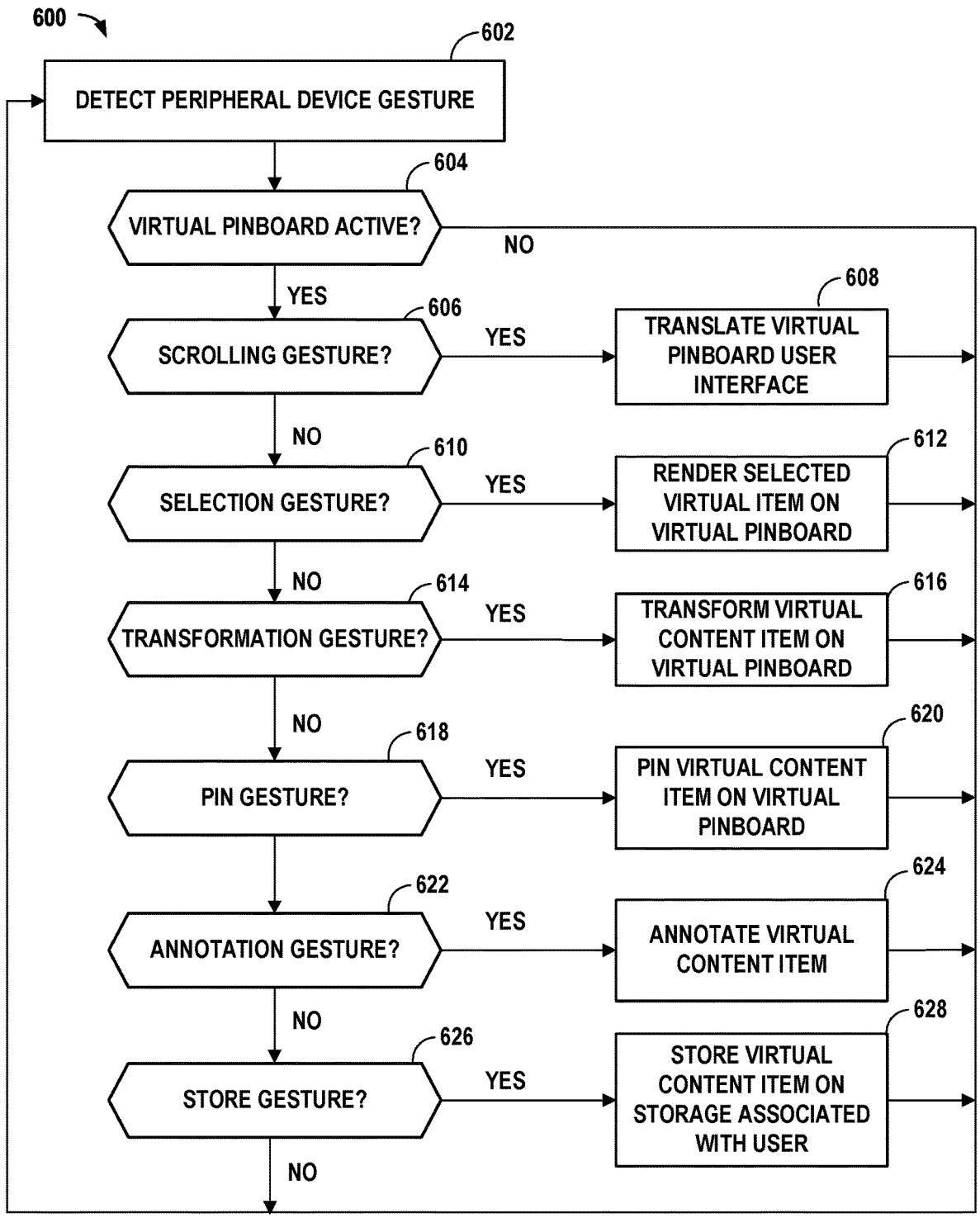
FIG. 6 is a flowchart illustrating operations of an example mode of operation for an artificial reality system, in accordance with aspects of the disclosure.

FIGS. 5 and 6 are flowcharts illustrating example modes of operation for an artificial reality system, in accordance with techniques described in this disclosure. The operations illustrated in FIGS. 5 and 6 may be performed by one or more components of an artificial reality system, such as artificial reality systems 10, 20 of FIGS. 1A, 1B. For instance, some or all of the operations may be performed by one or more of virtual surface application (332, 432 of FIGS. 3 and 4), pose tracker (326, 426 of FIGS. 3 and 4), gesture detector (324, 424 of FIGS. 3 and 4), a user interface engine (328, 428 of FIGS. 3 and 4), and a rendering engine (322, 422 of FIGS. 3 and 4).

FIG. 5 is a flowchart illustrating operations of an example mode of operation of an artificial reality system for activating a pinboard menu prompt or a pinboard UI menu in accordance with aspects of the disclosure. In some examples, a peripheral device must be in a particular position and orientation to interact with a virtual surface. A certain pose of a peripheral device may be detected and used to trigger activation of a user interface or a menu prompt for interacting with a virtual surface. The artificial reality system may determine a current pose of a peripheral device (502). The pose may include the current position and orientation of the peripheral device. In one or more aspects, image data may be captured and analyzed to determine the pose of the peripheral device. Other sensor data may be used in addition to, or instead of, image data to determine the pose of the peripheral device. For example, GPS sensor(s) of the peripheral device may indicate the current position or location of the peripheral device. Additionally, or alternative, accelerometer(s) may indicate the current acceleration of the peripheral device to help determine the current orientation of the device.

The artificial reality system may determine if the current position of the peripheral device comprises a pinboard position (504). For example, the artificial reality system may detect whether the HMD and/or the peripheral device is proximate (e.g., within ten feet, 6 feet, or within any threshold distance) to a physical position corresponding to a virtual position of the virtual pinboard. In one or more aspects, the artificial reality system can lookup virtual surface information for any virtual surface within a threshold distance of the HMD and/or the peripheral device from virtual surfaces 334, 434 of FIGS. 3 and 4. If virtual surface information is available, the artificial reality system determines whether the peripheral device and/or the HMD is in a pinboard position.

In response to determining that the HMD and/or the peripheral device is not in a pinboard position (NO branch of 504), the artificial reality system may determine an updated pose of the peripheral device (502). In response to determining that the HMD and/or the peripheral device is in a pinboard position (YES branch of 504), the artificial reality system may determine whether the peripheral device is in a pinboard active orientation (YES branch of 506). In one or more aspects, a virtual pinboard active orientation corresponds to the peripheral device being held in a landscape orientation (e.g., horizontally or substantially horizontally) while the virtual surface and the peripheral device are within the field of view of the HMD. In one or more aspects, a virtual pinboard active orientation may also, or alternatively, correspond to the peripheral device being held face-up.

In response to determining that the peripheral device is in a virtual pinboard inactive orientation (e.g., not in a virtual pinboard active orientation) (NO branch of 506), the artificial reality system may render a pinboard prompt (508). In one or more aspects, the pinboard prompt is rendered in proximity and/or locked to the peripheral device (e.g., at a user interface position locked relative to a position of the peripheral device). In one or more aspects, the pinboard prompt is rendered in over a surface of the peripheral device. After rendering the pinboard prompt, the flow returns to determine the current pose of the peripheral device 502. There may be many other operations performed by the artificial reality system in between rendering pinboard prompt (508) and determining a current pose of the peripheral device (502).

Figure 7A:
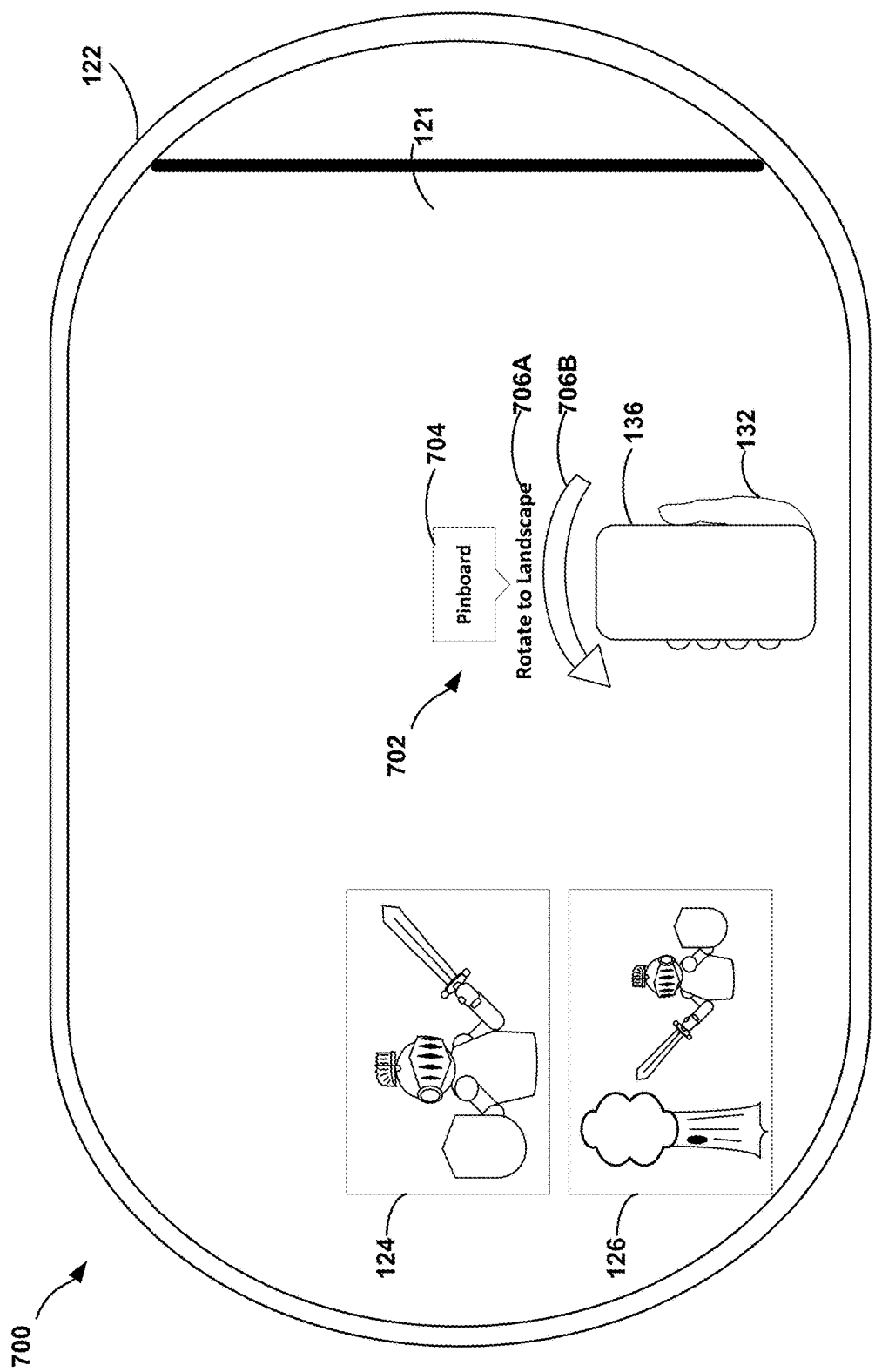
FIGS. 7A-7H are example HMD displays illustrating interactions with virtual pinboards in accordance with aspects of the disclosure.

FIG. 7A is an example HMD display 700 illustrating a pinboard prompt 702 in accordance with aspects of the disclosure. In the example illustrated in FIG. 7A, the virtual pinboard prompt 702 comprises an indication 704 of a virtual surface at the wall 121 (a pinboard) and an instruction 706 to rotate the peripheral device to a landscape orientation.

In one or more aspects, pinboard prompt 702 can be rendered in proximity to peripheral device 136 (e.g., above or adjacent to peripheral device 136). In one or more aspects, pinboard prompt 702 can be rendered on the surface of peripheral device 136 (not shown). In one or more aspects, pinboard prompt 702 can be overlaid on wall 121. In one or more aspects, instruction 706 can include text 706A and/or arrow 706B. In the example illustrated in FIG. 7A, the virtual surface corresponds to wall 121 and includes virtual content items 124, 126. In one or more aspects, the virtual surface can correspond to the entire surface area of wall 121 or a subset of the surface area of wall 121. In one or more aspects, virtual content items can comprise GIFs, photos, applications, live-streams, videos, text, a web-browser, drawings, animations, 3D models, representations of data files (including two-dimensional and three-dimensional datasets), or any other visible media. In one or more aspects, peripheral device 136 must be in a landscape orientation for the user to interface with the virtual pinboard associated with wall 121.

Returning to FIG. 5, in response to determining that peripheral device 136 is in a virtual pinboard active orientation, the artificial reality system may render a pinboard user interface in proximity to peripheral device (510). After rending the pinboard user interface, the flow returns to determine the current pose of the peripheral device (502). There may be many other operations performed by the artificial reality system in between determining a current pose of the peripheral device (502).

Figure 7B:
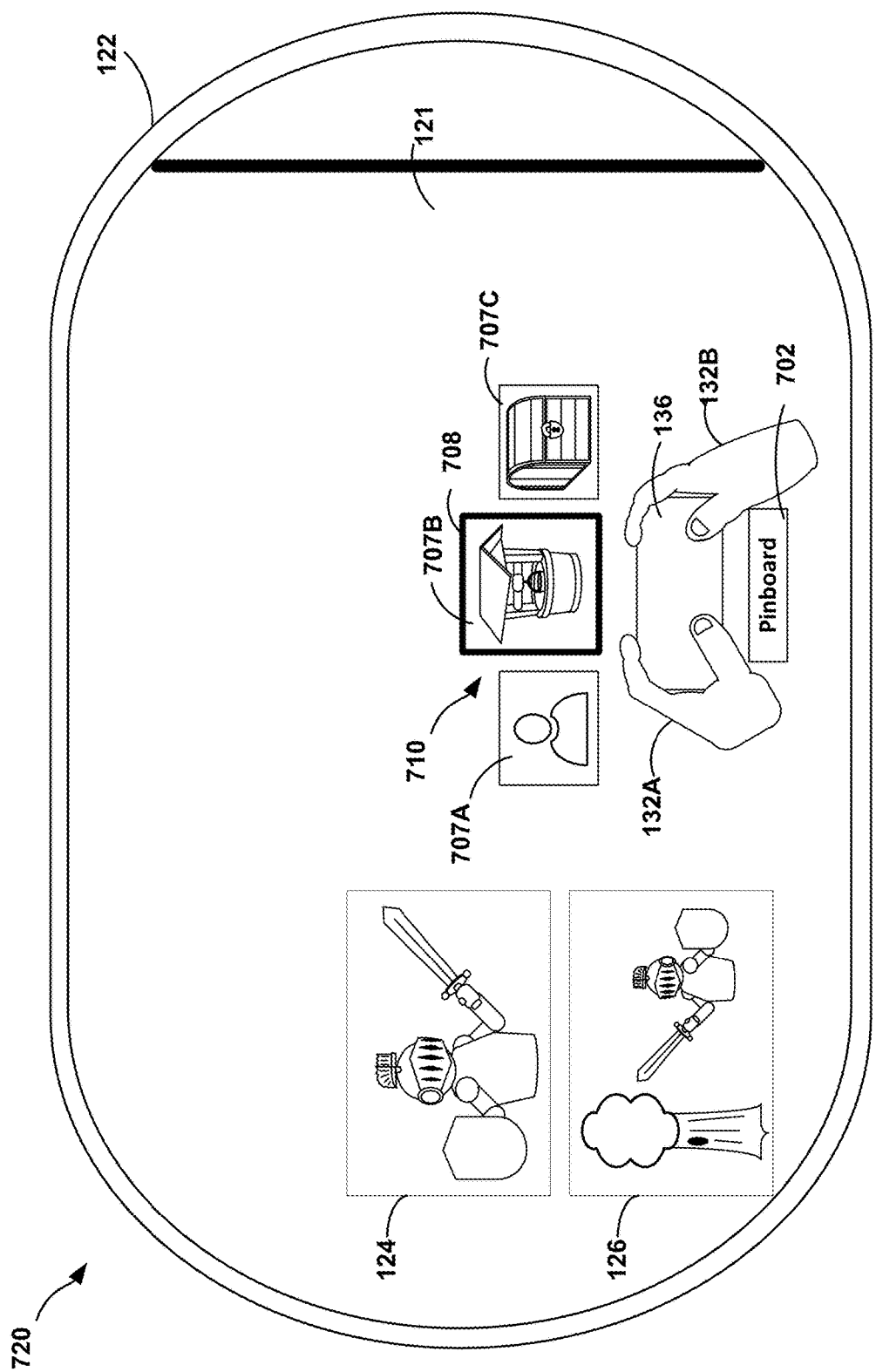

FIG. 7B is an example HMD display 720 illustrating a pinboard user interface 710 in accordance with aspects of the disclosure. In the example illustrated in FIG. 7B, the user of the artificial reality system has placed peripheral device 136 in a virtual pinboard active orientation (e.g., in a landscape orientation) and in proximity to the physical location of physical wall 121 corresponding to a virtual location of a virtual pinboard including virtual content items 124, 126. The artificial reality system can generate, when the HMD is proximate to the physical position corresponding to the virtual position of the virtual pinboard and when the peripheral device is in the virtual pinboard active orientation, virtual content selection user interface 710. In one or more aspects, virtual content selection user interface 710 can comprise a plurality of scrollable virtual content menu items 707A-707C arranged along a dimension (e.g., horizontally along the X axis, vertically along the Y axis) of user interface 170 and an indication 702 that user interface 710 corresponds to a virtual pinboard. In one or more aspects, a user can perform a scrolling gesture (e.g., a swiping motion) over virtual content menu items 707A-707C or on the surface of peripheral device 136 and the artificial reality system can perform a scroll operation to show other virtual content items available for selection in response to detecting, based on captured image data or touch input received at a surface of peripheral device 136, the scrolling gesture. In one or more aspects, user interface 710 comprises a selection indicator 708 that indicates virtual content menu item 707B can be selected using a virtual content item selection gesture. In one or more aspects, selection indicator 708 can comprise highlighting, a border, shading (or shadow), an enlarged representation of virtual content media item 707B, the location within user interface 710 (e.g., in the middle of scrollable virtual content menu items 707A-707C), and/or any other indication that a focus is on that particular virtual content item. In one or more aspects, the selection indicator 708 can from a first virtual content item (e.g., 707B) to a second virtual content item (e.g., 707C) in response to the artificial reality system detecting a swipe gesture.

Returning to FIG. 5, after rendering user interface 710, artificial reality system may determine a new current pose of the peripheral device (502). There may be many other operations performed by the artificial reality system in between rendering user interface 710 and determining a new pose of the peripheral device. If the artificial reality system detects that the peripheral device or the HMD is no longer in a virtual pinboard position, then the artificial reality system can remove the virtual pinboard prompt 702 or virtual pinboard user interface 710 from the display if a virtual pinboard prompt 702 or virtual pinboard user interface 710 had been displayed because the peripheral device and/or HMD is no longer in the appropriate configuration to display the virtual pinboard prompt 702 or virtual pinboard user interface (504). After removing remove the virtual pinboard prompt 702 or virtual pinboard user interface 710 from the display, the flow returns to determine a new current pose of the peripheral device (502). There may be many other operations performed by the artificial reality system in between removing the virtual pinboard prompt 702 or virtual pinboard user interface 710 and determining a new pose of the peripheral device.

FIG. 6 is a flowchart illustrating an example mode of operation of an artificial reality system, in accordance with aspects of the disclosure. The artificial reality system may detect a peripheral device gesture (602). In one or more aspects, the peripheral device gesture may include changes in position and/or orientation of the peripheral device in physical space. In one or more aspects, the peripheral device gesture may include a hand gesture performed with respect to the peripheral device (e.g., touch input on a surface of the peripheral device, a hand gesture performed with the peripheral device, a hand gesture performed in proximity to the peripheral device). In one or more aspects, the peripheral device gesture can be detected from image data captured from image sensors and/or from input received at a presence-sensitive surface of the peripheral device. In one or more aspects, other sensor data may be used in addition to, or instead of, image data to determine the pose of the peripheral device. For example, GPS sensor(s) of the peripheral device may indicate the current position or location of the peripheral device. Additionally, or alternative, accelerometer(s) may indicate the current acceleration of the peripheral device to help any movements of the peripheral device.

The artificial reality system may determine if the virtual pinboard is active (e.g., if the peripheral device is in a pinboard position and orientation as described above) (604). In one or more aspects, the artificial reality system may determine if a virtual content item "pinned" on a virtual pinboard is active (604). In one or more aspects, a virtual content item pinned on a virtual pinboard is active when it is editable and/or when a user can otherwise interact with it. In some examples, a virtual content item is in an active state when it is first added to the virtual pinboard or when the virtual content item is selected by a user. In some aspects, an active virtual content item includes highlighting, a border, scaling, movement, annotation, popping out, shading (or a shadow), and/or any other indication that a user can manipulate or otherwise interact with a particular virtual content item.

If virtual pinboard is active (YES branch of 604), then the artificial reality system can determine if the user performed a scrolling gesture (606). In some aspects, a scrolling gesture can be a substantially horizontal motion of a hand (or one or more fingers of a hand) while a virtual pinboard user interface is active. For example, the artificial reality system can compare a previous position of the hand with a current position of the hand to determine if a scrolling gesture has occurred. If the scrolling gesture is detected (YES branch of 606), then the artificial reality system can scroll through scrollable user interface virtual content menu items 707A-707C of FIG. 7B in accordance with the scrolling gesture (608). For example, the artificial reality system can generate and render scrolling virtual content items in user interface 710 of FIG. 7B (e.g., allowing the user to scroll through other available virtual content items). If the user interface of virtual content items is oriented vertically, then the scrolling gesture can be substantially vertical motion of the hand. If the scrolling gesture is not detected, the artificial reality system can determine if another gesture is detected that is not the scrolling gesture (610). "Substantially" vertical and horizontal may be within 5 degrees, 10 degrees, 20 degrees, or 30 degrees of vertical or horizontal.

The artificial reality system can determine whether a selection gesture has been performed (610). A selection gesture can correspond to selecting a virtual content menu item displayed in a user interface of selectable virtual content items (e.g., user interface 710 of FIG. 7B) or to selecting a virtual content item rendered on a virtual pinboard. In response to detecting the selection gesture (YES branch of 610), the artificial reality system can generate and render the selected virtual content item on a virtual pinboard (612). If a selection gesture is not detected (NO branch of 610), the artificial reality system can determine if another gesture is detected that is not the selection gesture.

Figure 7C:
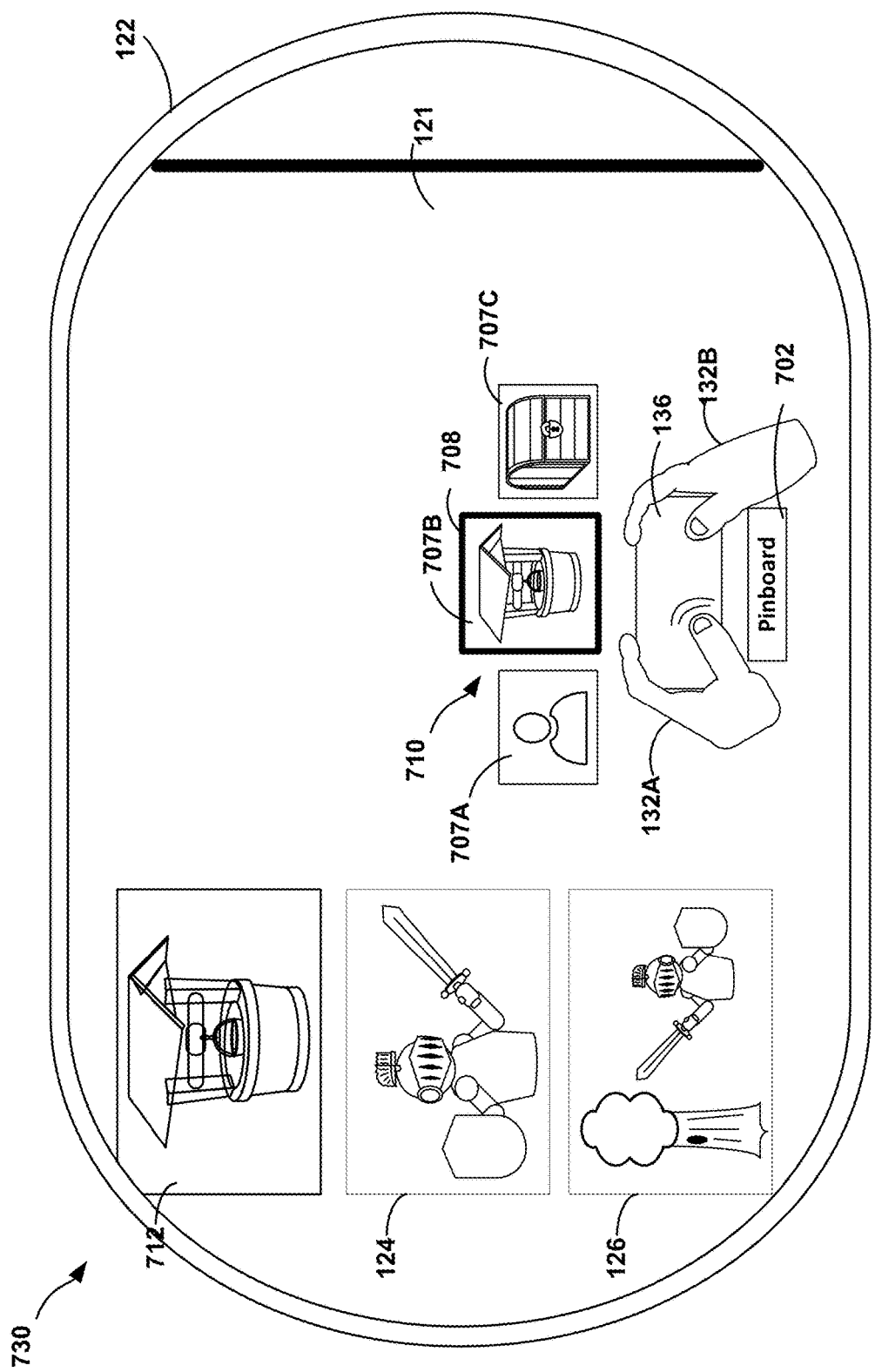

FIG. 7C is an example HMD display 730 illustrating a selection gesture in accordance with aspects of the disclosure. In the example illustrated in FIG. 7C, the user performs a virtual content item selection gesture comprising a tap or touch of a surface of peripheral device 136 while selection indicator 708 indicates that virtual content menu item 707B is selectable. In one or more aspects, the virtual content item selection gesture can be detected from captured image data and/or by a presence-sensitive surface of the peripheral device, as noted above. In one or more aspects, the virtual content item selection gesture can comprise a flicking gesture of hand 132A or 132B performed over virtual content item 707B comprising a "flicking" motion of one or more fingers of hand 132A or 132B toward a physical position corresponding to a virtual position of the virtual pinboard (e.g., toward wall 121). In another example, the virtual content item selection gesture can comprise a tap gesture of hand 132A or 132B performed over virtual content menu item 707B comprising a "tap" or touch motion of one or more fingers of hand 132A or 132B over virtual content menu item 707B (a motion of one or more fingers of hand 132A or 132B simulating a touching gesture over or on virtual content menu item 707B). As shown in FIG. 7C, the artificial reality system can add, in response to detecting the virtual content item selection gesture, virtual content item 712 corresponding to selected virtual content menu item 707B to the virtual pinboard corresponding to wall 121. In one or more aspects, virtual content item 712 can be added at a default or predetermined location on the virtual pinboard. In other examples, virtual content item 712 can be added at a location on the virtual pinboard that corresponds to a flicking gesture (e.g., to the virtual location virtual content menu item 707B would land if it was physically flicked toward wall 121).

As noted above, a selection gesture can correspond to selecting an already-rendered virtual content item on a virtual pinboard. For example, a selection gesture can comprise a tap or touch motion of one or more fingers of hand 132A or 132B over a virtual content item rendered on the virtual pinboard corresponding to wall 121 (e.g., any of virtual content items 712, 124, 126 of FIG. 7C).

Returning to FIG. 6, the artificial reality system can determine whether a virtual content item transformation gesture has been performed while a virtual content item is active (614). In response to detecting the virtual content item transformation gesture (YES branch of 614), the artificial reality system can transform (e.g., translate, rotate, scale) the active virtual content item on a virtual pinboard (616). If a virtual content item transformation gesture is not detected (NO branch of 614), the artificial reality system can determine if another gesture is detected that is not the virtual content item transformation gesture.

Figure 7D:
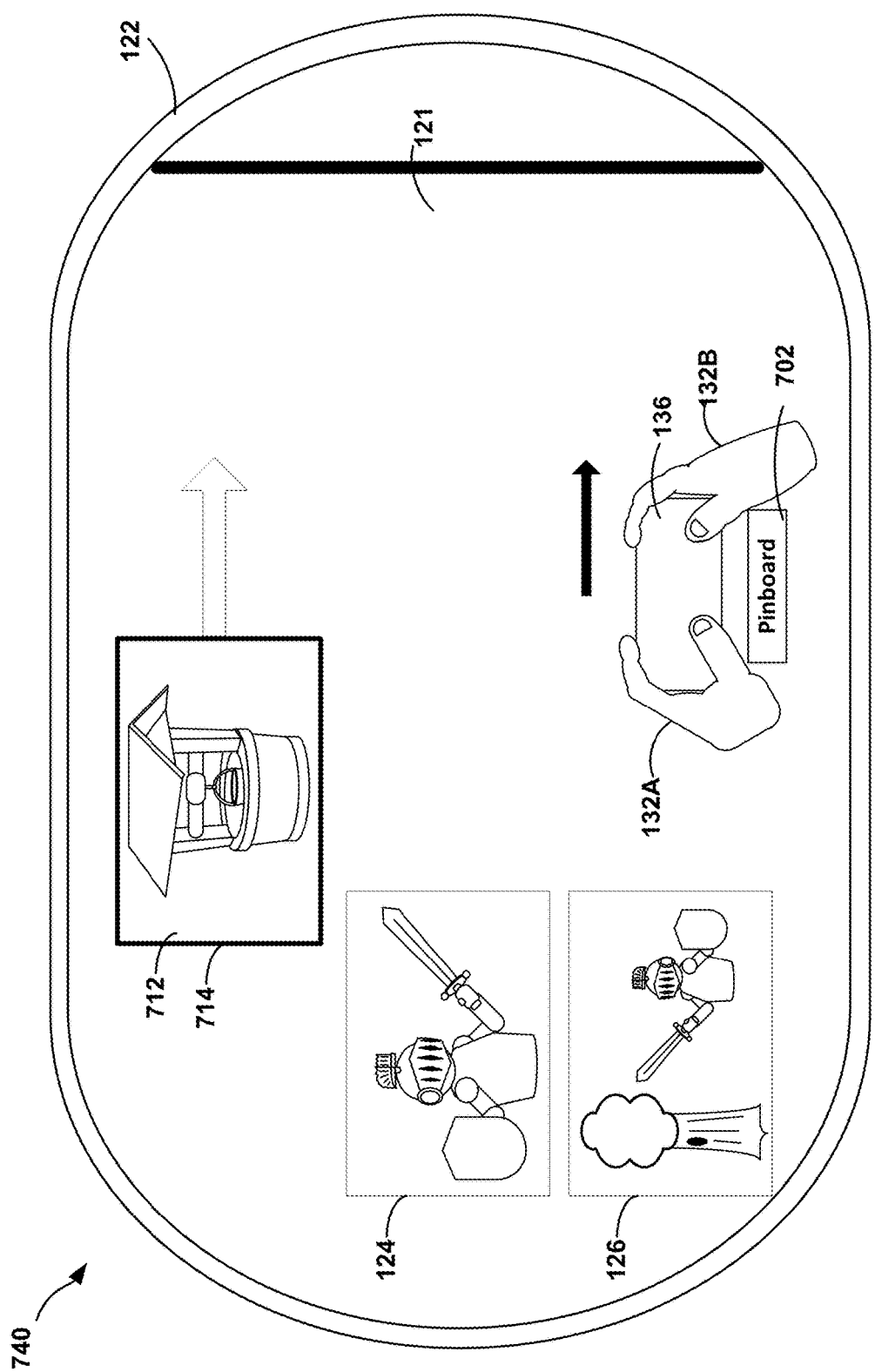

FIG. 7D is an example HMD display 740 illustrating a virtual content item transformation gesture in accordance with aspects of the disclosure. In the example illustrated in FIG. 7D, the user is moving peripheral device 136 horizontally toward the right (e.g., performing a horizontal translation gesture) while virtual content item 712 is active. In one or more aspects, an active virtual content item can include an active indicator 714 (e.g., a border, highlighting, a shadow, and/or any other indication that a user can manipulate or otherwise interact with a particular virtual content item). In response to detecting the translation gesture, the artificial reality system translates virtual content item 712 in accordance with the translation gesture performed with respect to peripheral device 136 (e.g., moves virtual content item 712 to the right as shown in FIG. 7D). In one or more aspects, the user can translate (e.g., move) peripheral device 136 in other directions (e.g., in a vertical direction), which would cause the artificial reality system to move virtual content item 712 in accordance with that motion. In one or more aspects, virtual content item 712 is moved commensurate with the translation movement of peripheral device 136 in physical space (e.g., moved in the same direction and for the same distance as peripheral device 136). For example, if peripheral device 136 is moved to the right three inches, artificial reality system will move virtual content item 712 to the right three inches. In one or more aspects, virtual content item 712 is moved in substantially the same direction (e.g., within 10 degrees) and for substantially the same distance (e.g., within inches) as peripheral device 136. In one or more aspects, the artificial reality system will move virtual content item 712 a magnitude distance corresponding to the distance that the peripheral device 136 is moved (e.g., 50%, 150%, 200% or any percentage of the distance the peripheral device 136 is moved).

Figure 7E:
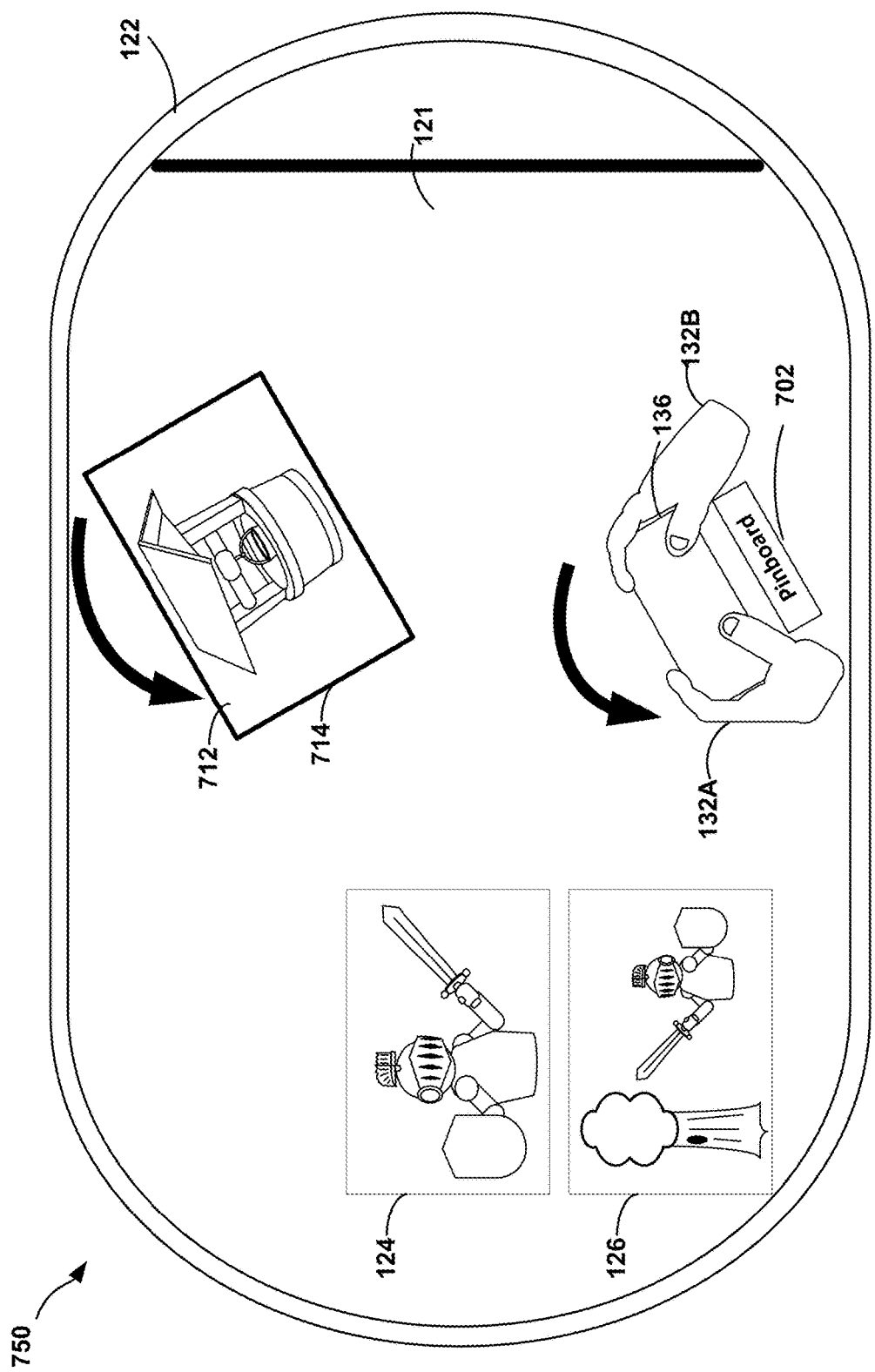

FIG. 7E is an example HMD display 750 illustrating a virtual content item transformation gesture in accordance with aspects of the disclosure. In the example illustrated in FIG. 7E, the user rotates peripheral device 136 counterclockwise while virtual content item 712 is active. In one or more aspects, an active virtual content item can include an active indicator 714 (e.g., a border, highlighting, a shadow, and/or any other indication that a user can manipulate or otherwise interact with a particular virtual content item). In response to detecting the rotation gesture, the artificial reality system rotates virtual content item 712 in accordance with the translation gesture performed with respect to peripheral device 136 (e.g., rotates virtual content item 712 as shown in FIG. 7D). In one or more aspects, the user can rotate peripheral device 136 in other directions (e.g., in a clockwise direction), which would cause the artificial reality system to rotate virtual content item 712 in accordance with that direction. In one or more aspects, virtual content item 712 is rotated commensurate with the rotation movement of peripheral device 136 in physical space (e.g., rotated in the same direction and for the same degrees as peripheral device 136). For example, if peripheral device 136 is moved to the counterclockwise fifteen degrees, artificial reality system will rotate virtual content item 712 counterclockwise fifteen degrees. In one or more aspects, virtual content item 712 is rotated for substantially the same degrees (e.g., within ten degrees) as peripheral device 136. In one or more aspects, the artificial reality system will rotate virtual content item 712 a magnitude corresponding to the degrees that the peripheral device 136 is rotated (e.g., 50%, 150%, 200% or any percentage of the degrees the peripheral device 136 is rotated).

Figure 7F:
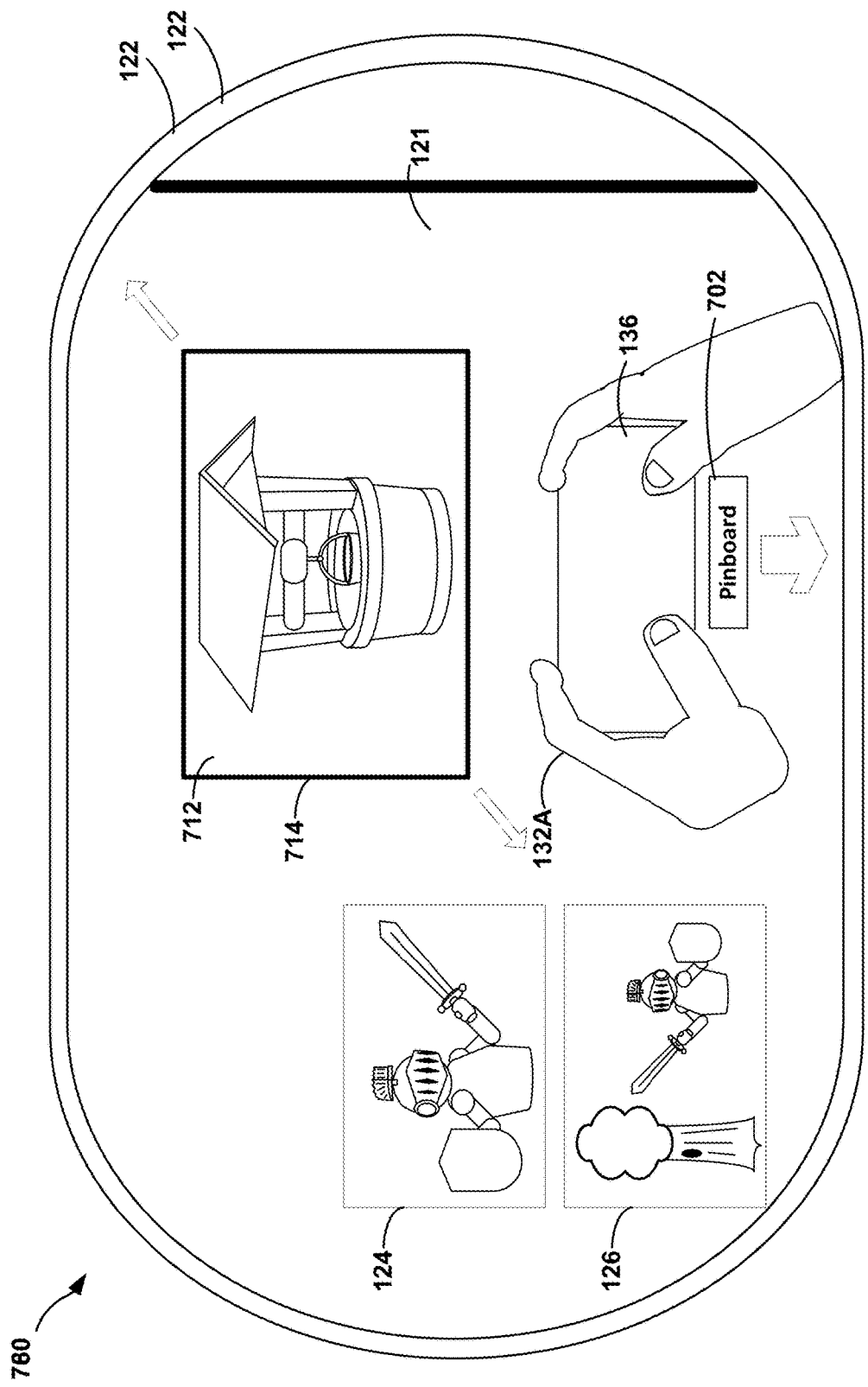

FIG. 7F is an example HMD display 760 illustrating a virtual content item transformation gesture in accordance with aspects of the disclosure. In the example illustrated in FIG. 7F, the user moves peripheral device 136 away from the virtual surface corresponding to wall 121 while virtual content item 712 is active. In one or more aspects, an active virtual content item can include an active indicator 714 (e.g., a border, highlighting, a shadow, and/or any other indication that a user can manipulate or otherwise interact with a particular virtual content item). In response to detecting a translation gesture toward or away a plane in physical space (e.g., wall 121), the artificial reality system scales virtual content item 712 in accordance with the translation gesture performed with respect to peripheral device 136. In the example illustrated in FIG. 7F, the artificial reality system increases the size of virtual content item 712 in response to the peripheral device 136 being moved away from the virtual surface corresponding to wall 121. In other examples, the artificial reality system reduces the size of virtual content item 712 in response to the user moving peripheral device 136 toward the virtual surface corresponding to wall 121. In one or more aspects, the size of virtual content item 712 is scaled in accordance with the distance peripheral device 136 to the virtual surface corresponding to wall 121, with an effect similar to projection.

In one or more aspects, the various virtual content item transformation gestures described above can be combined (e.g., performed simultaneously or serially in any order). For example, a user can perform a translation gesture (in any direction) and/or rotation gesture while virtual content item 712 is active. For example, a user can move peripheral device 136 horizontally and away from a virtual surface while also rotating the peripheral device counterclockwise and the artificial reality system will, in response to the combination of gestures, transform virtual content item 712 by moving it horizontally, increasing its size, and rotating it counterclockwise in accordance with the combination of virtual content item transformation gestures.

Returning to FIG. 6, after determining that a virtual content item transformation gesture was not detected, the artificial reality system can determine whether a pin gesture has been performed while a virtual content item is active (618). In response to detecting the pin gesture (YES branch of 618), the artificial reality system can annotate the active virtual item on a virtual pinboard (620). If a pin gesture is not detected (NO branch of 618), the artificial reality system can determine if another gesture is detected that is not the pin gesture.

Figure 7G:
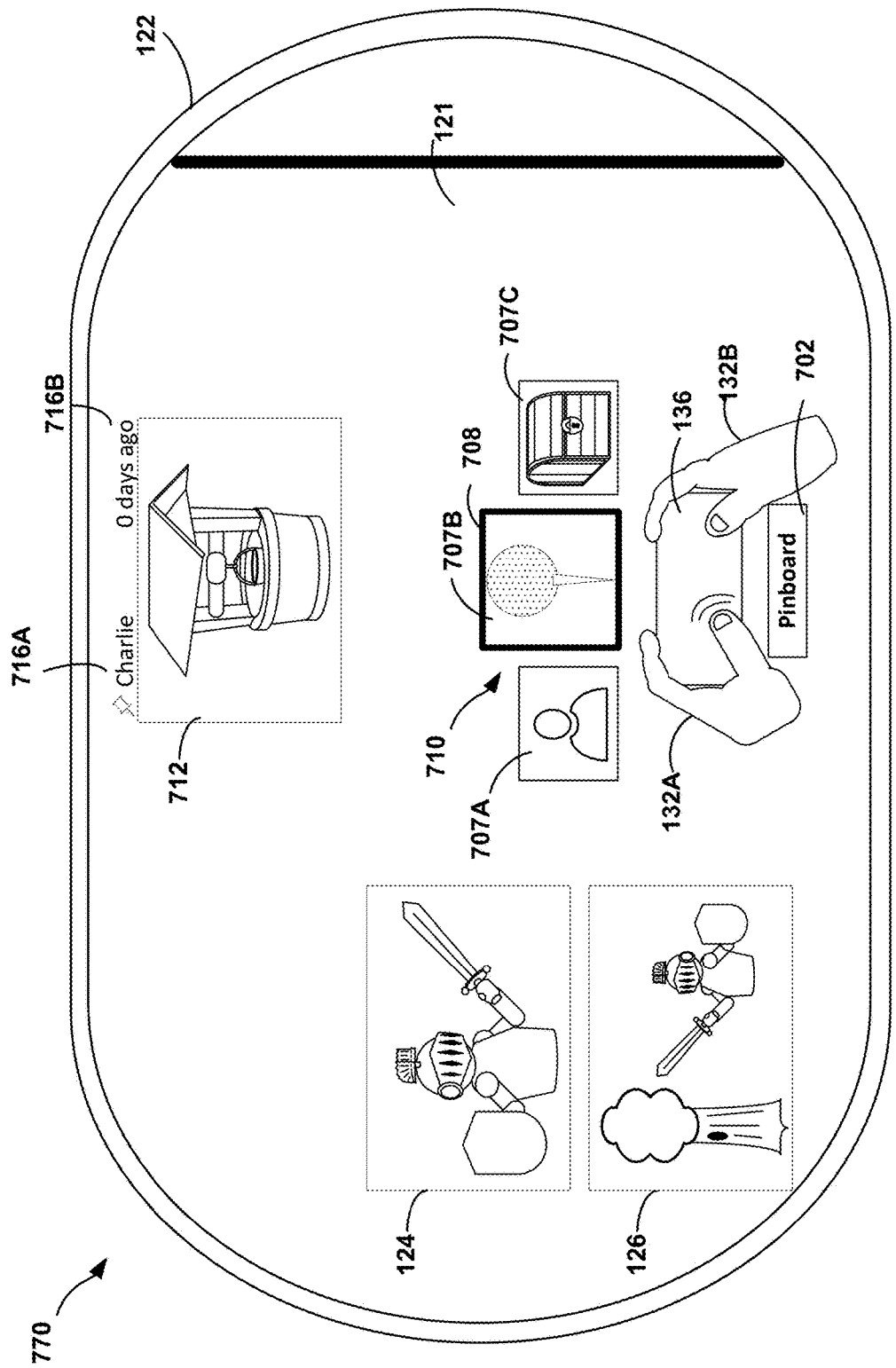

FIG. 7G is an example HMD display 780 illustrating a pin gesture in accordance with aspects of the disclosure. In one or more aspects, a pin gesture comprises a tap gesture on the surface of peripheral device 136 (e.g., a single tap, a double-tap). In one or more aspects, a pin gesture comprises a selection or touch gesture of a user interface element (e.g., a virtual button) generated and rendered on the surface of peripheral device 136. In response to detecting the pin gesture, the artificial reality system will set virtual content item 712 to inactive, pin or place (e.g., associate virtual content item 712 to that particular pose on the virtual surface corresponding to wall 121), and generate and render virtual content selection user interface 710 comprising of a plurality of scrollable virtual content menu items 707A-707C such that the user may select another virtual content item. In one or more aspects, the artificial system stores the association of the pose of virtual content item 712 on the virtual surface associated with wall 121 in a data set (e.g., in virtual surfaces data sets 334 or 434 of FIG. 3 or 4, respectively). In one or more aspects, the artificial reality system may generate and render metadata associated with virtual content items pinned to the virtual pinboard. In some examples, this metadata can be stored in a data set (e.g., in virtual surfaces data sets 334 or 434 of FIG. 3 or 4, respectively). For example, as illustrated in FIG. 7G, information about the user pinned or placed a virtual content item (e.g., metadata 716A) and how long ago that virtual content item was placed (e.g., metadata 716B) can be rendered proximate (e.g., adjacent) to virtual content item 712. In some examples, metadata about a virtual content item can be generated and rendered over the virtual content item. In some examples, metadata about a selected virtual content item can be generated and rendered on a surface of peripheral device 136 (e.g., by the HMD or by the peripheral device itself). It should be understood that other metadata about a virtual content item can be maintained and/or rendered, including information about the author/creator, the size of the virtual content, duration, or any other metadata about visible media.

Returning to FIG. 6, after determining that a pin gesture was not detected, the artificial reality system can determine whether an annotation gesture has been performed while a virtual content item is active (622). In response to detecting the annotation gesture (YES branch of 622), the artificial reality system can annotate the active virtual item on a virtual pinboard (624). If an annotation gesture is not detected (NO branch of 622), the artificial reality system can determine if another gesture is detected that is not the annotation gesture.

Figure 7H:
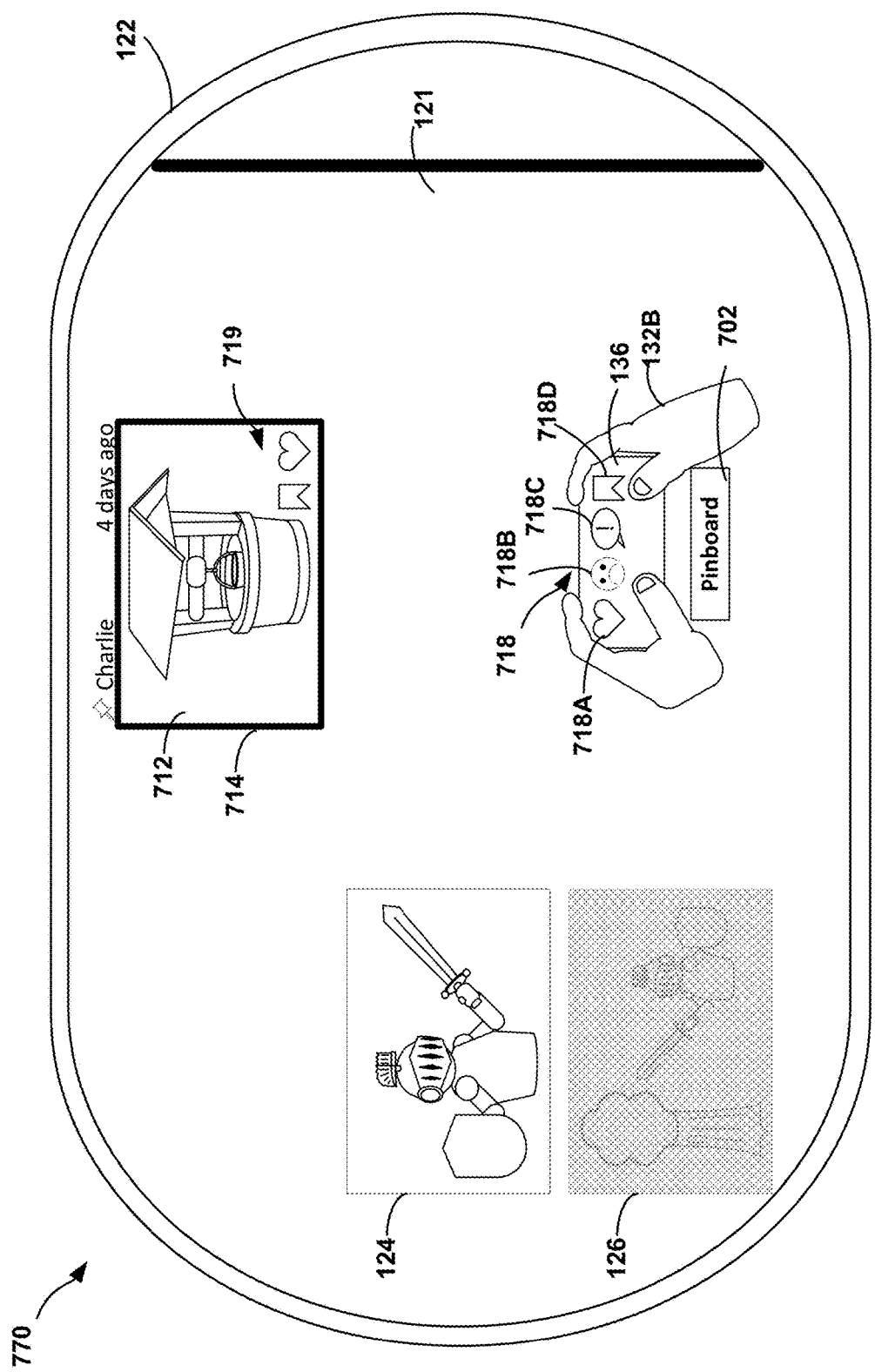

FIG. 7H is an example HMD display 780 illustrating a virtual pinboard in accordance with aspects of the disclosure. In the example illustrated in FIG. 7H, the artificial reality system generates and renders user interface 718 while virtual content item 712 is active. In one or more aspects, user interface 718 includes one or more elements (e.g., 718A-718D) to annotate active virtual content item 712. In one or more aspects, an annotation gesture comprises hand 132 (or one or more fingers of hand 132) selecting (e.g., touching) one of elements 718A-718C. For example, a user can annotate active virtual content item 712 by selecting an "emoji" (e.g., any of elements 718A, 718B) that indicates a user's reaction to the virtual content item. In response to detecting a gesture selecting or touching element 718A, the artificial reality system will annotate active virtual content item 712 to indicate that the user "loves" or "likes" virtual content item 712. In some examples, the "love" or "like" annotation will be reflected on virtual content item 712 (e.g., element 719 will be generated over virtual content item 712 as shown in FIG. 7H) or in proximity to (e.g., adjacent to) virtual content item 712. In another example, a user can annotate active virtual content item 712 by commenting on the virtual content item. For example, a user can select element 718C and the artificial reality system can, in response to detecting the selection gesture of element 718C, generate and render a virtual keyboard for the user to enter a comment about active virtual content item 712. In one or more aspects, the entered comment will be reflected over virtual content item 712 or in proximity to (e.g., adjacent to) virtual content item 712. In one or more aspects, user interface 718 is rendered for display at the HMD (e.g., user interface 718 is projected on a surface of peripheral device 136 by the HMD as shown in FIG. 7H). In one or more aspects, user interface 718 is rendered for display by peripheral device 136 (e.g., at a display or touchscreen of peripheral device 136). In one or more aspects, an active virtual content item can include an active indicator 714 (e.g., a border, highlighting, a shadow, and/or any other indication that a user can manipulate or otherwise interact with a particular virtual content item) to indicate that the user can annotate that virtual content item.

Returning to FIG. 6, after determining that an annotation gesture was not detected, the artificial reality system can determine whether a store gesture has been performed while a virtual content item is active (626). In response to detecting the store gesture (YES branch of 626), the artificial reality system can store the active virtual content item to storage associated with the user (628). In one or more aspects, a store gesture can comprise a selection gesture of a store element generated and rendered on the surface peripheral device 136. For example, a store gesture can comprise a user selecting or touching bookmark element 718D while virtual content item 712 is active, as illustrated in FIG. 7H. As noted above, user interface 718, including bookmark element 718D can be rendered for display at the HMD (e.g., user interface 718 can be projected on a surface of peripheral device 136 by the HMD as shown in FIG. 7H) or user interface 718 can be rendered for display by peripheral device 136 (e.g., at a display or touchscreen of peripheral device 136). If a store gesture is not detected (NO branch of 626), the flow returns to detect a peripheral device gesture (602). There may be many other operations performed by the artificial reality system in between detecting a peripheral device gesture (602).

Figure 8:
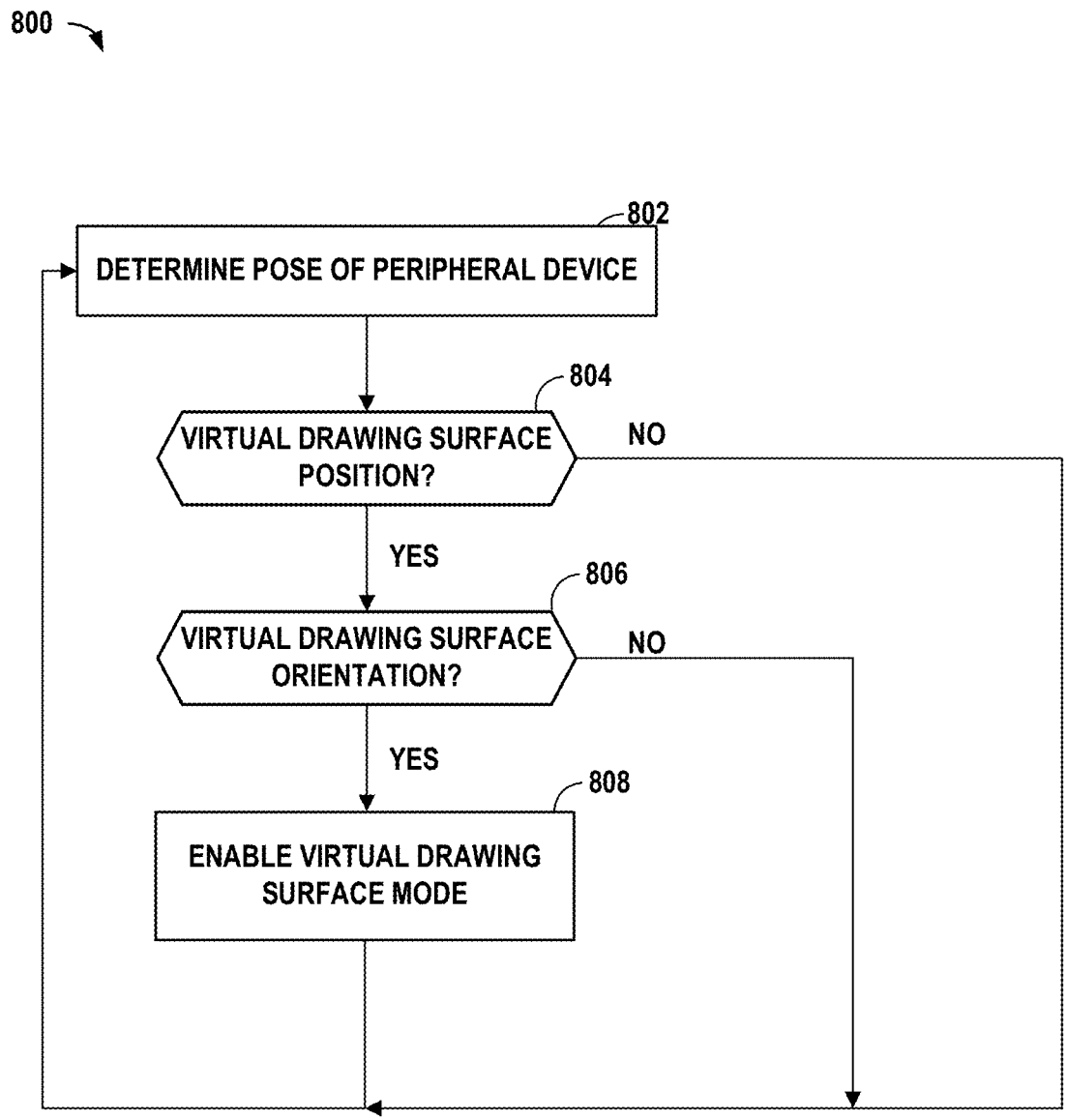
FIG. 8 is a flowchart illustrating operations of an example mode of operation for an artificial reality system, in accordance with aspects of the disclosure.
Figure 9A:
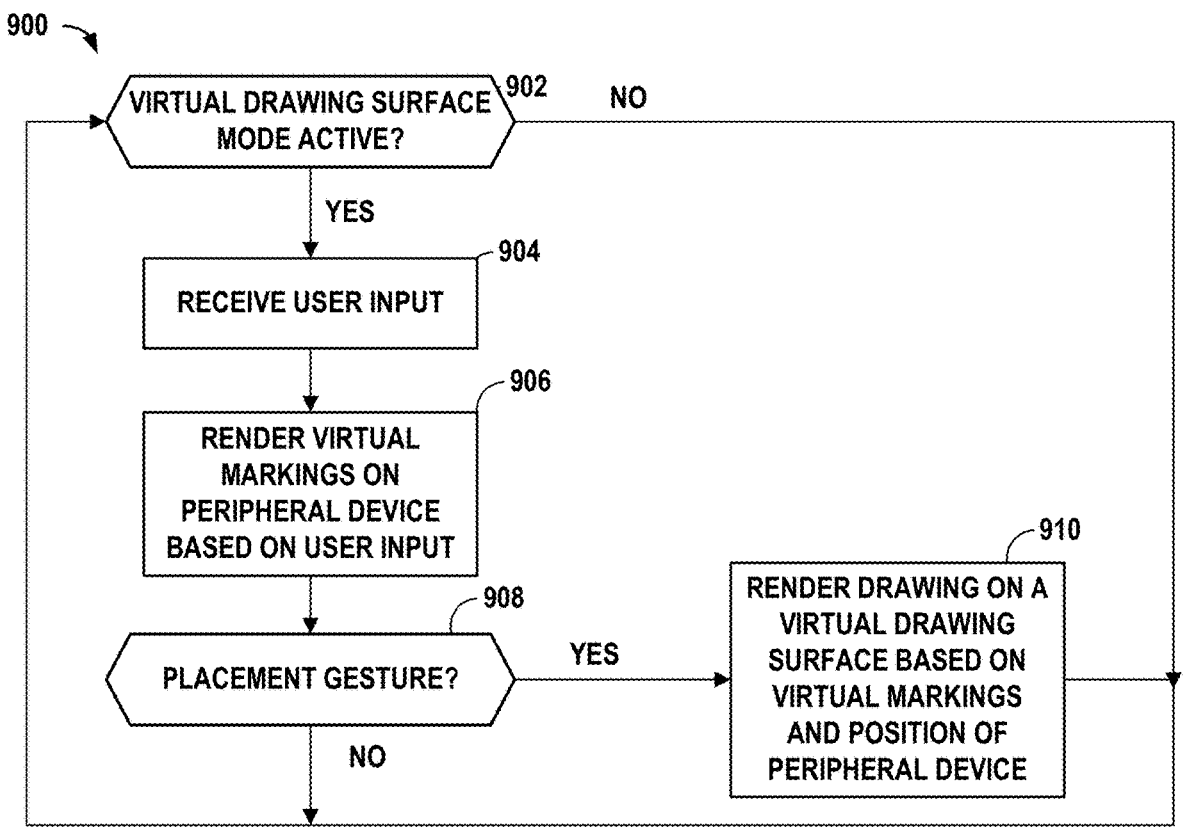
FIGS. 9A-9B are flowcharts illustrating operations of example modes of operation for an artificial reality system, in accordance with aspects of the disclosure.
Figure 9B:
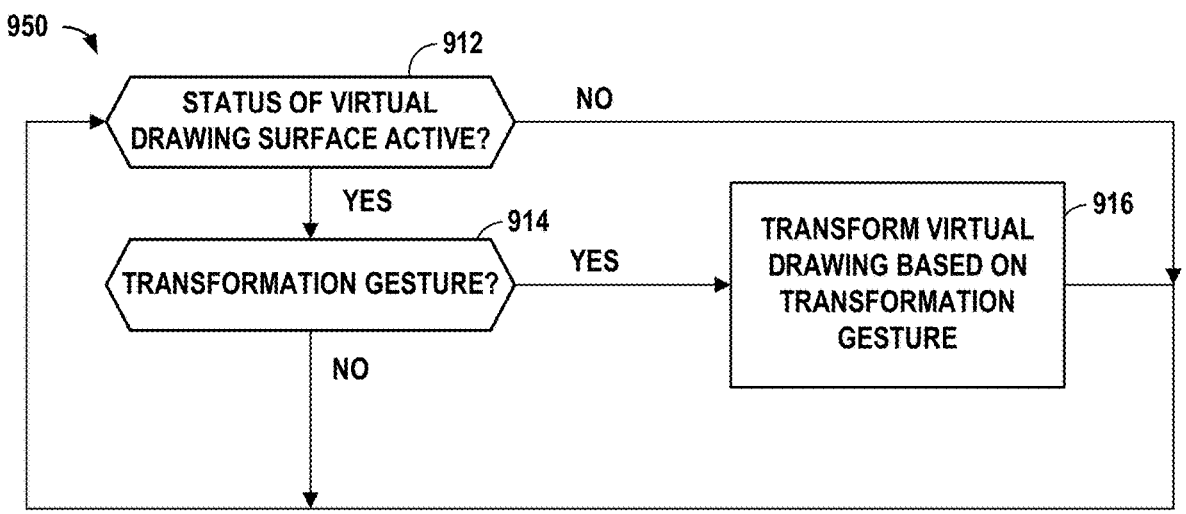

FIGS. 8, 9A, and 9B are flowcharts illustrating example modes of operation for an artificial reality system, according to techniques of this disclosure. The operations illustrated in FIGS. 8, 9A, and 9B may be performed by one or more components of an artificial reality system, such as artificial reality systems 10, 20 of FIGS. 1A, 1B. For instance, some or all of the operations may be performed by one or more of virtual surface application (332, 432 of FIGS. 3 and 4), pose tracker (326, 426 of FIGS. 3 and 4), gesture detector (324, 424 of FIGS. 3 and 4), a user interface engine (328, 428 of FIGS. 3 and 4), and a rendering engine (322, 422 of FIGS. 3 and 4).

FIG. 8 is a flowchart illustrating operations of an example method for activating a virtual drawing surface mode in accordance with aspects of the disclosure. In some examples, a peripheral device must be in a particular position and orientation to enable a virtual drawing surface mode. A certain pose of a peripheral device may be detected and used to trigger activation of enable a virtual drawing surface mode. The artificial reality system may determine a current pose of a peripheral device (802). The pose may include the currently position and orientation of the peripheral device. In one or more aspects, image data may be captured and analyzed to determine the pose of the peripheral device. Other sensor data may be used in addition to, or instead of, image data to determine the pose of the peripheral device. For example, GPS sensor(s) of the peripheral device may indicate the current position or location of the peripheral device. Additionally, or alternative, accelerometer(s) may indicate the current acceleration of the peripheral device to help determine the current orientation of the device.

The artificial reality system may determine if the current position of the peripheral device comprises a virtual drawing surface position (804). For example, the artificial reality system may detect whether the HMD and/or the peripheral device is proximate (e.g., within ten feet, 6 feet, or within any threshold distance) to a physical position corresponding to a virtual position of a virtual drawing surface. In one or more aspects, the artificial reality system can lookup virtual drawing surface information for any virtual surface within a threshold distance of the HMD and/or the peripheral device from virtual surfaces data set (334, 434 of FIGS. 3 and 4). If virtual drawing surface information is available, the artificial reality system will determine that the peripheral device and/or the HMD is in a virtual drawing surface position.

In response to determining that the HMD and/or the peripheral device is not in a virtual drawing surface position (NO branch of 804), the artificial reality system may determine an updated pose of the peripheral device (802). In response to determining that the HMD and/or the peripheral device is in a virtual drawing surface position (YES branch of 804), the artificial reality system may determine whether the peripheral device is in a virtual drawing surface orientation (806). In some examples, the peripheral device need only be in a virtual pinboard orientation to enable the virtual drawing surface mode (e.g., step 804 is not performed and the artificial reality system may determine whether the peripheral device is in a virtual drawing surface orientation (806) after determining a current pose of a peripheral device (802)). In one or more aspects, a virtual drawing surface orientation corresponds to the peripheral device being held in a landscape orientation (e.g., horizontally or substantially horizontally) while the peripheral device is within the field of view of the HMD.

In response to determining that the peripheral device is not in a virtual drawing surface orientation (NO branch of 806), the artificial reality system may determine an updated pose of the peripheral device (802). In response to determining that the peripheral device is in a virtual drawing surface orientation (YES branch of 806), the artificial reality system may enable a virtual drawing surface mode (808). After enabling the virtual drawing surface mode (808), the flow returns to determine the current pose of the peripheral device (802). There may be many other operations performed by the artificial reality system in between determining a current pose of the peripheral device (802). If the artificial reality system detects that the peripheral device is no longer in a virtual drawing surface position (804) or orientation (806), then the artificial reality system can disable the virtual drawing surface mode if the virtual drawing surface was previously enabled because the peripheral device and/or HMD is no longer in the appropriate configuration for the virtual drawing surface mode. After disabling the virtual drawing surface mode, the flow returns to determine a new current pose of the peripheral device (802). There may be many other operations performed by the artificial reality system in between disabling the virtual drawing surface mode and determining a new pose of the peripheral device.

FIG. 9A is a flowchart illustrating example methods for interacting with a virtual drawing surface in accordance with aspects of the disclosure. The artificial reality system may determine whether the virtual drawing surface is active or enabled (e.g., as described above with reference to FIG. 8). In response to determining that the virtual drawing surface mode not active (NO branch of 902), the artificial reality system may determine whether the virtual drawing surface mode is active again at a later time (902). There may be many other operations performed by the artificial reality system in between determining again whether the virtual drawing surface mode is active (902).

In response to determining that the virtual drawing surface mode is active (YES branch of 902), the artificial reality system receives user input (904). In one or more aspects, user input corresponds to one or more touch gestures performed on a surface of the peripheral device by a user. In one or more aspects, the touch gestures can be performed with one or more parts of a user's hand (e.g., one or more fingers, thumb or any other part of a hand), a stylus, or any other object. In one or more aspects, the user input (e.g., the one or more touch gestures) can be detected from image data captured from image sensors and/or be detected at a presence-sensitive surface of the peripheral device. For example, the artificial reality system may track a user's hand(s), a stylus, and/or other objects to detect when and where the user's hand(s), the stylus, and/or another object comes in contact with a surface of the peripheral device. In another example, the peripheral device will detect touch input at a presence-sensitive surface and convey touch information (e.g., location information of the touch input, pressure information of the touch input) to the HMD and/or console of the artificial reality system. In response receiving user input, the virtual reality system will render one or more virtual marks at the locations on the surface of the peripheral device where the user touch input was detected (906). In one or more aspects, the one or more virtual marks are rendered for display at the HMD (e.g., the one or more virtual marks are projected on the surface of peripheral device 136 by the HMD). In one or more aspects, the one or more marks are rendered for display by peripheral device 136 (e.g., at a display or touchscreen of peripheral device 136). After rendering the virtual markings based on the received user input (906), the artificial reality system can detect whether a placement gesture is performed (908).

Figure 10A:
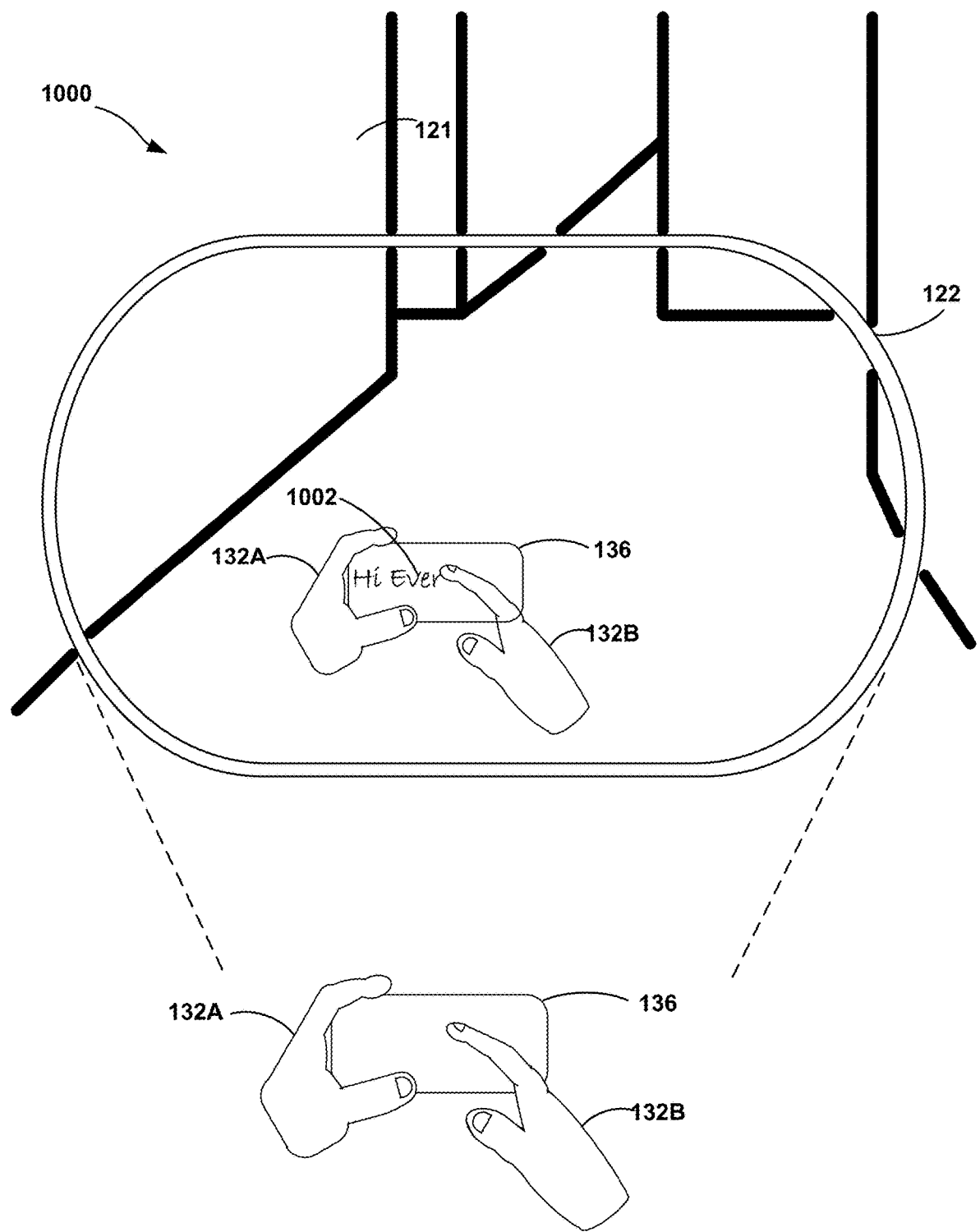
FIGS. 10A-10H are example HMD displays illustrating interacting with virtual drawing surfaces in accordance with aspects of the disclosure.
Figure 10B:
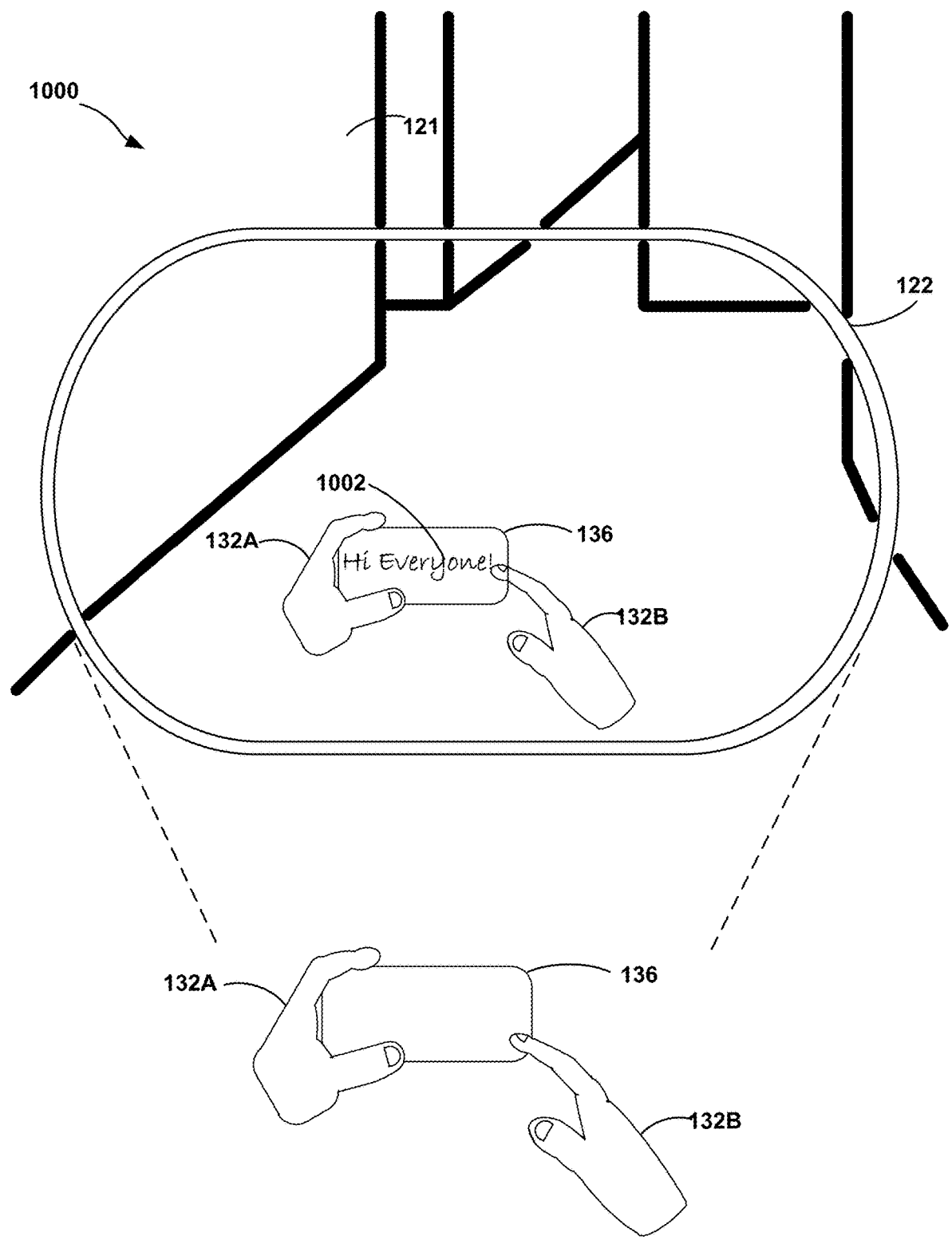

FIG. 10A is an example HMD display 1000 illustrating a virtual drawing surface mode in accordance with aspects of the disclosure. In the example illustrated in FIG. 10A, a user is interacting with (e.g., performing touch gestures on) a peripheral device 136 with the index finger of hand 132B. In one or more aspects, the touch gestures performed on the surface of peripheral device 136 can detected from image data captured by an image capture device of the artificial reality system, as noted above. In one or more aspects, the surface of peripheral device 136 is a presence-sensitive surface at which the peripheral device 136 detects the touch gestures, as noted above. In response to detecting the user input (e.g., the touch gestures) at the surface of peripheral device 136, the artificial reality system generates and renders virtual marks 1002 for display at the HMD at the locations of the surface of peripheral device 136 where the touch gestures were performed, as illustrated in artificial content 122 of FIG. 10A. As shown in FIG. 10A, virtual markings 1002 do not exist outside of artificial reality content 122 (e.g., cannot be seen without an HMD). In one or more aspects, virtual markings are rendered on a display of the peripheral device 136 (not shown) and can be seen with or without an HMD. In one or more aspects, virtual markings 1002 are generated and rendered as the touch input is detected. For example, FIG. 10B illustrates HMD display 1000 at a later time than shown in FIG. 10A. In this example, the user has completed the phrase "Hi Everyone!" with touch gestures on the surface of peripheral device 136 as shown in artificial content 122 of FIG. 10B.

Returning to FIG. 9A, after rendering the virtual markings based on the received user input (906), the artificial reality system can detect whether a placement gesture is performed (908). In one or more aspects, a placement gesture can comprise a stamping motion or other stamping gesture described herein. For example, the stamping motion can include the user moving peripheral device 136 toward a physical location corresponding to a virtual location of a virtual drawing surface (e.g., a virtual surface corresponding to physical wall), followed by the user moving peripheral device 136 away from the physical location corresponding to the virtual location of the virtual drawing surface. In another example, the stamping motion can include the user touching peripheral device 136 to a physical surface corresponding to a virtual drawing surface. In another example, the stamping motion can include the user holding peripheral device 136 within a threshold distance (e.g., within 10 inches, a foot, or any distance) of a physical surface corresponding to the virtual drawing surface for a threshold amount of time (e.g., 3 seconds, 5 seconds, or any other amount of time). In one or more aspects, a placement gesture comprises a selection or touch gesture of a user interface element (e.g., a virtual button) generated and rendered on the surface of peripheral device 136. In response to determining that the placement gesture was performed, rendering a virtual drawing comprising second one or more virtual markings on a virtual drawing surface based on the virtual markings previously rendered on peripheral device 136. In one or more aspects, the rendered virtual drawing status is set to active after it is rendered.

Figure 10C:
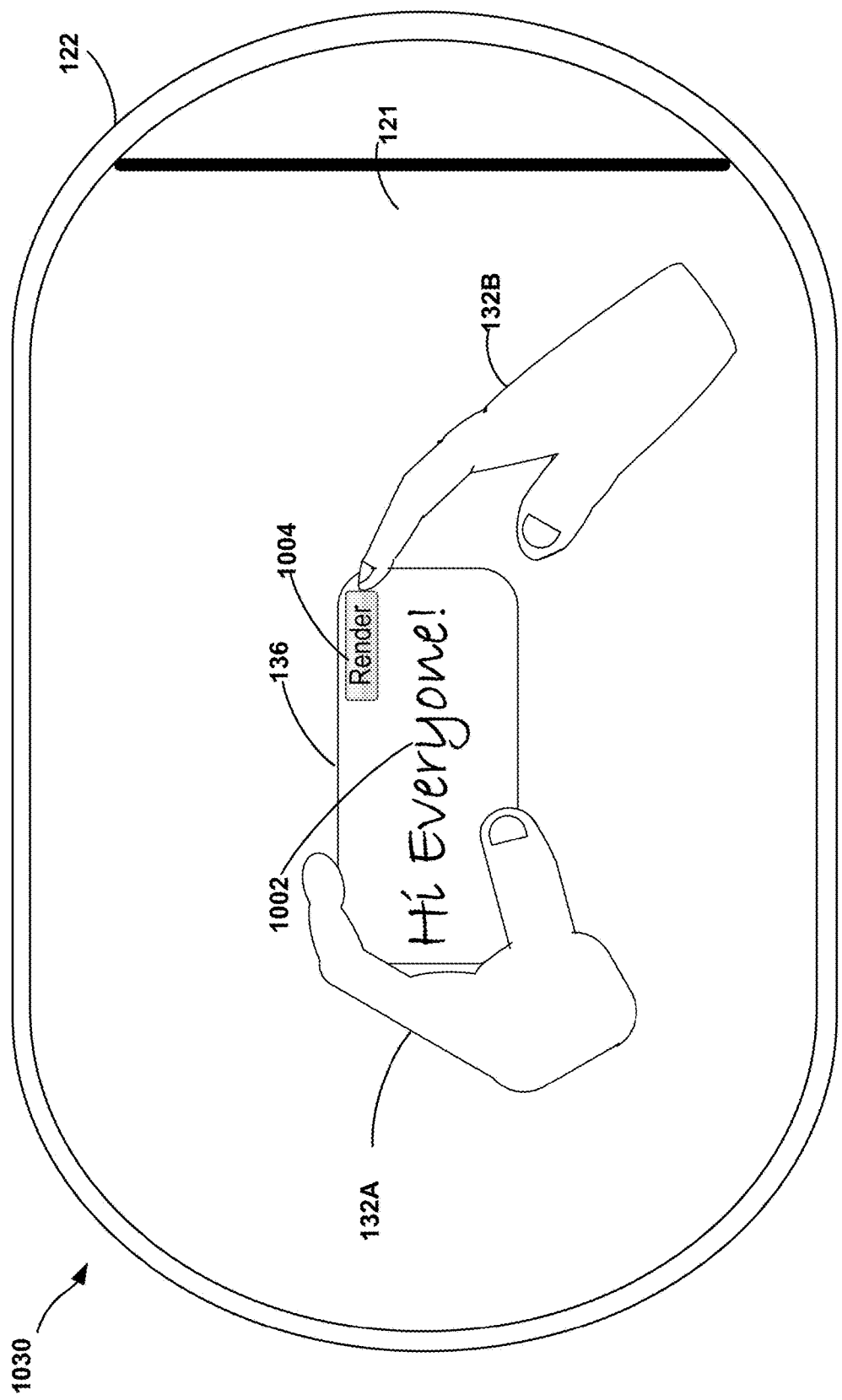
Figure 10D:
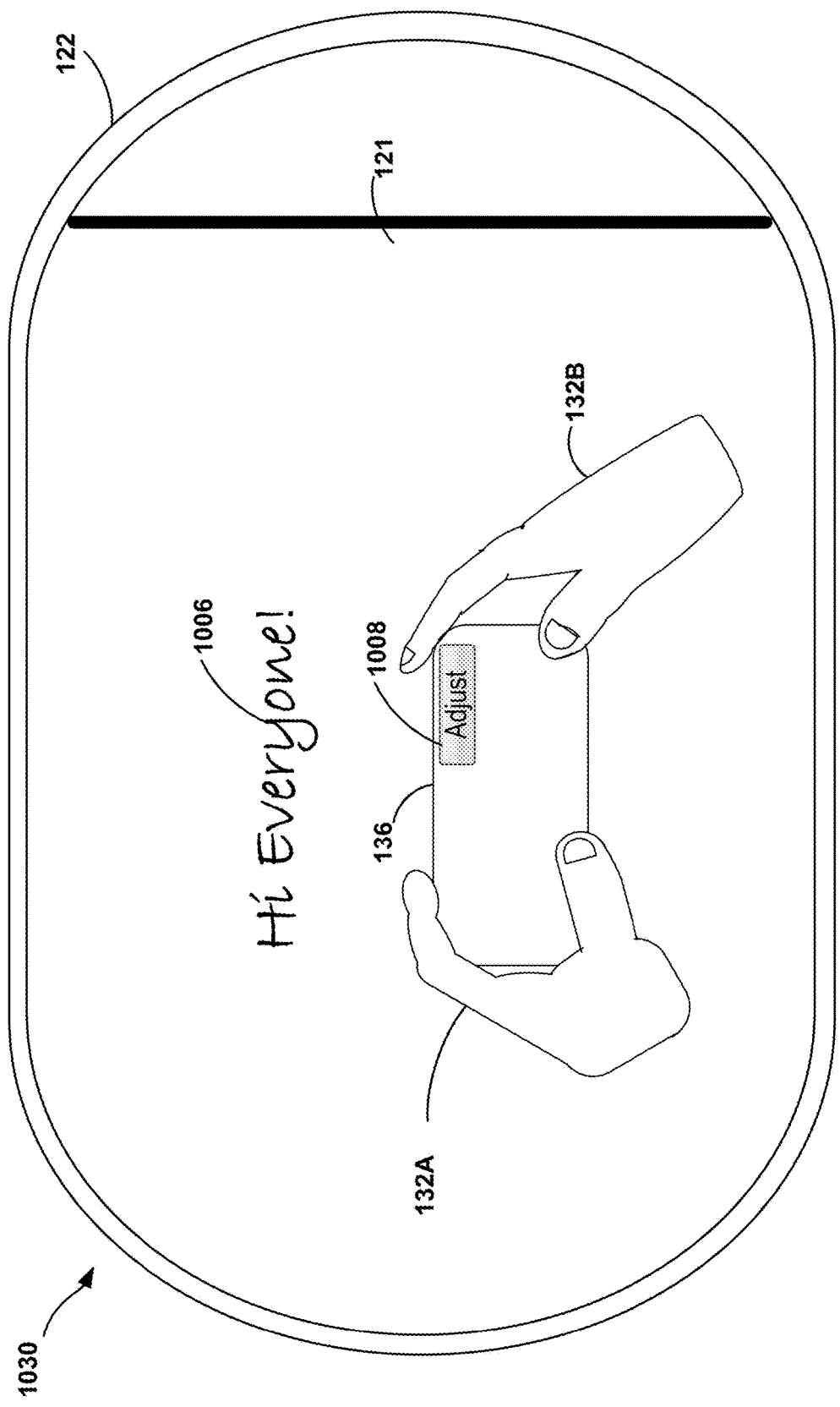

FIGS. 10C-10D are example HMD displays 1030 illustrating a placement gesture in accordance with aspects of the disclosure. In the example illustrated in FIGS. 10C-10D, the user can be performing a stamping motion with peripheral device 136. Compared to the example in FIG. 10B, the user has moved peripheral device closer toward wall 121 in FIG. 10C. In one or more aspects, the user can then move peripheral device 136 away from wall 121 to complete the stamping gesture, as shown in FIG. 10D. In one or more aspects, the user can touch peripheral device 136 to wall 121 to complete the stamping gesture. In one or more aspects, the user can hold peripheral device 136 within a threshold distance (e.g., within 10 inches, a foot, or any distance) of wall 121 for a threshold amount of time (e.g., 3 seconds, 5 seconds, or any other amount of time) to complete the stamping gesture. In one or more aspects, the placement gesture can include the user selecting user interface element 1000 (e.g., in conjunction with or instead of the stamping gesture). In any case, FIG. 10D illustrates the rendered virtual drawing 1006 comprising virtual markings 1006 based on virtual makings 1002 from FIG. 10C. In one or more aspects, the status of virtual drawing 1006 is set to active when it rendered by the artificial reality system. In one or more aspects, the artificial realty system, in response to rendering virtual drawing 1006, renders user interface element 1008 on a surface of peripheral device 136 to enable the user to further modify virtual drawing 1006 on the virtual drawing surface corresponding to wall 121.

FIG. 9B is a flowchart illustrating example methods for interacting with a virtual drawing surface in accordance with aspects of the disclosure. The artificial reality system may determine whether a virtual drawing surface or a virtual drawing is active (912). In one or more aspects, a virtual drawing is active after it is first rendered on a virtual drawing surface (e.g., after a placement gesture as described above). In one or more aspects, a virtual drawing surface or virtual drawing surface is active when it is selected by a user (e.g., when a user performs a selection or touch gesture on the virtual surface or the virtual drawings). In one or more aspects, a virtual drawing is active when a user selects or selects and holds a user interface element (e.g., a virtual adjust or active button). If a virtual drawing surface and a virtual drawing are not active (NO branch of 912), the artificial reality system may determine whether a virtual drawing surface or a virtual drawing is active again at a later time (912). There may be many other operations performed by the artificial reality system in between determining again whether a virtual drawing surface or a virtual drawing is active (912).

In response to determining that a virtual drawing surface or a virtual drawing is active (YES branch of 912), the artificial reality system can determine whether a virtual drawing transformation gesture has been performed (914). In response to detecting the virtual drawing transformation gesture (YES branch of 914), the artificial reality system can transform (e.g., translate, scale, rotate) the active virtual drawing on a virtual drawing surface (916). In one or more aspects, if a virtual drawing transformation gesture is not detected (NO branch of 914), the flow returns to determine whether a virtual drawing surface or a virtual drawing is active again (912). There may be many other operations performed by the artificial reality system in between determining again whether a virtual drawing surface or a virtual drawing is active (912).

Figure 10E:
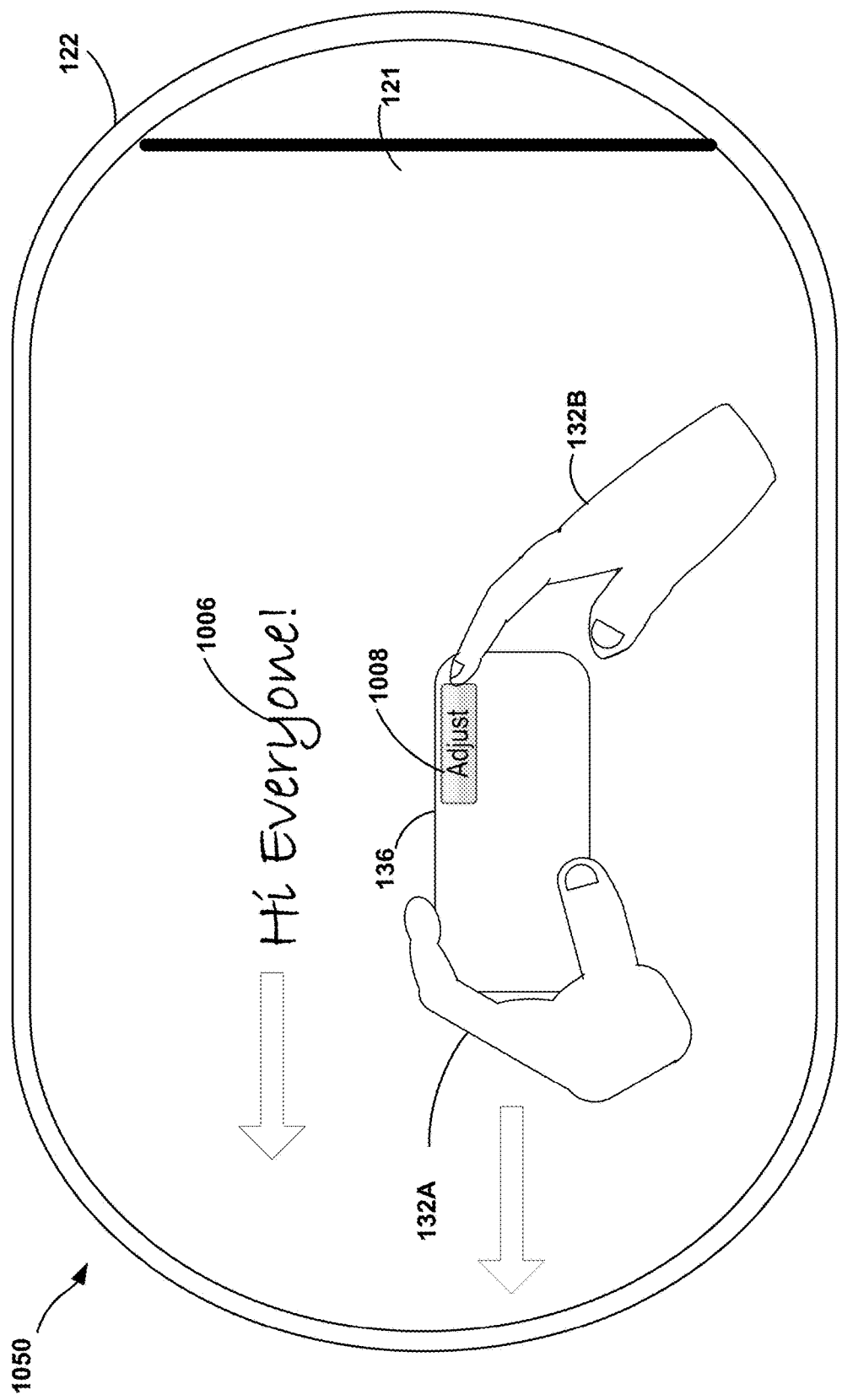

FIG. 10E is an example HMD display 1050 illustrating a virtual drawing transformation gesture in accordance with aspects of the disclosure. In the example illustrated in FIG. 10E, the user is moving peripheral device 136 horizontally toward the left (e.g., performing a horizontal translation gesture) while virtual drawing 1006 is active (e.g., while the user is selecting and holding user interface element 1008). In one or more aspects, an active virtual drawing can include an active indicator (e.g., a border, highlighting, a shadow, and/or any other indication that a user can manipulate or otherwise interact with a particular virtual drawing) (not shown). In response to detecting the translation gesture, the artificial reality system translates virtual drawing 1006 in accordance with the translation gesture performed with respect to peripheral device 136 (e.g., moves virtual drawing 1006 to the left as shown in FIG. 10E). In one or more aspects, the user can translate (e.g., move) peripheral device 136 in other directions (e.g., in a vertical direction), which would cause the artificial reality system to move virtual drawing 1006 in accordance with that motion. In one or more aspects, virtual drawing 1006 is moved commensurate with the translation movement of peripheral device 136 in physical space (e.g., moved in the same direction and for the same distance as peripheral device 136). For example, if peripheral device 136 is moved to the left three inches, artificial reality system will move virtual drawing 1006 to the left three inches. In one or more aspects, virtual drawing 1006 is moved in substantially the same direction (e.g., within 10 degrees) and for substantially the same distance (e.g., within inches) as peripheral device 136. In one or more aspects, the artificial reality system will move virtual drawing 1006 a magnitude distance corresponding to the distance that the peripheral device 136 is moved (e.g., 50%, 150%, 200% or any percentage of the distance the peripheral device 136 is moved).

Figure 10F:
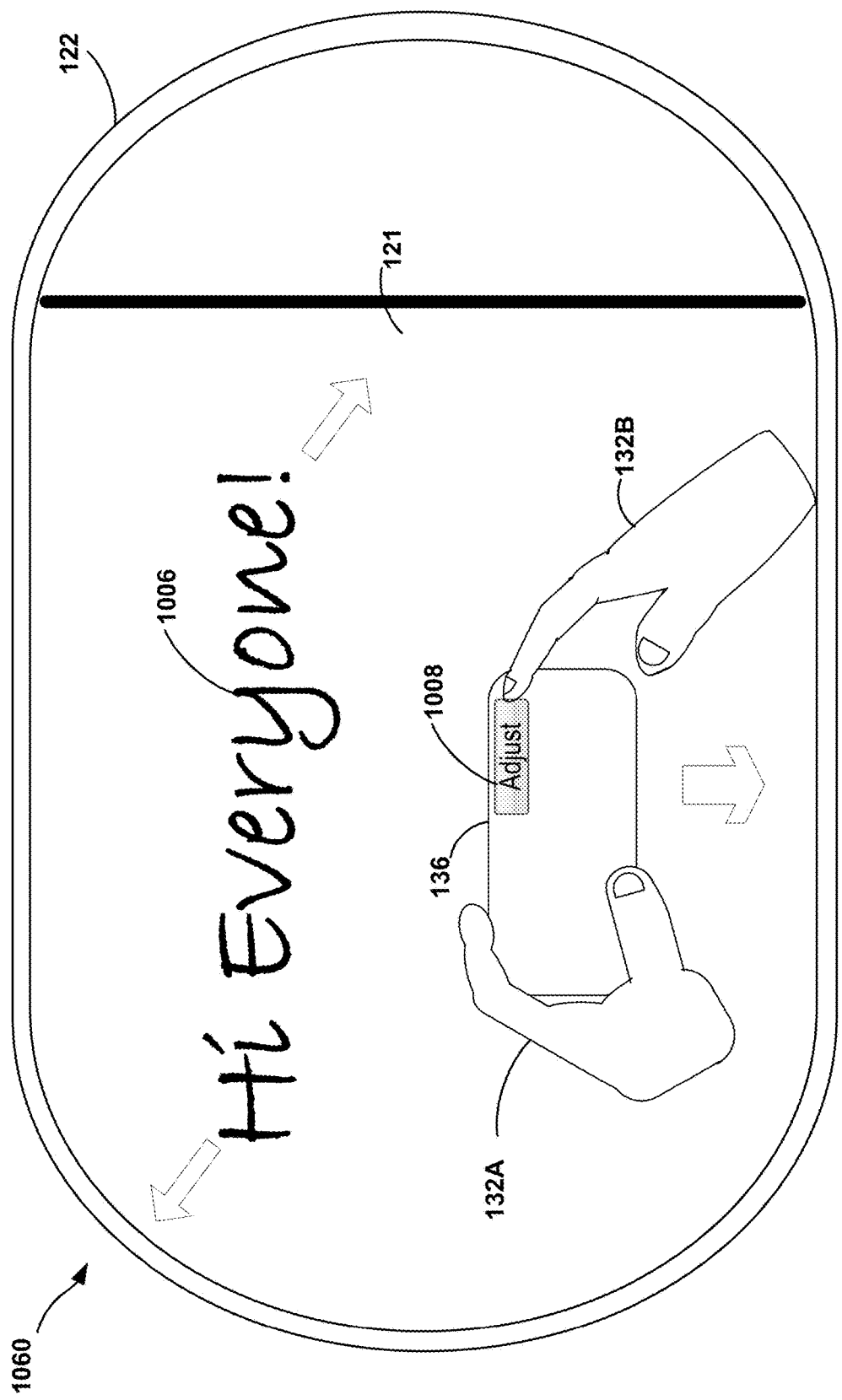

FIG. 10F is an example HMD display 1060 illustrating a virtual drawing transformation gesture in accordance with aspects of the disclosure. In the example illustrated in FIG. 10F, the user moves peripheral device 136 away from the virtual drawing surface corresponding to wall 121 while virtual drawing 1006 is active (e.g., while the user is selecting and holding user interface element 1008). In response to detecting a translation gesture toward or away a plane in physical space (e.g., wall 121), the artificial reality system scales virtual drawing 1006 in accordance with the translation gesture performed with respect to peripheral device 136. In the example illustrated in FIG. 10F, the artificial reality system increases the size of virtual drawing 1006 in response to the peripheral device 136 being moved away from the virtual drawing surface corresponding to wall 121. In other examples, the artificial reality system reduces the size of virtual drawing 1006 in response to the user moving peripheral device 136 toward the virtual drawing surface corresponding to wall 121. In one or more aspects, the size of virtual drawing 1006 is scaled in accordance with the distance peripheral device 136 to the virtual surface corresponding to wall 121, with an effect similar to projection.

Figure 10G:
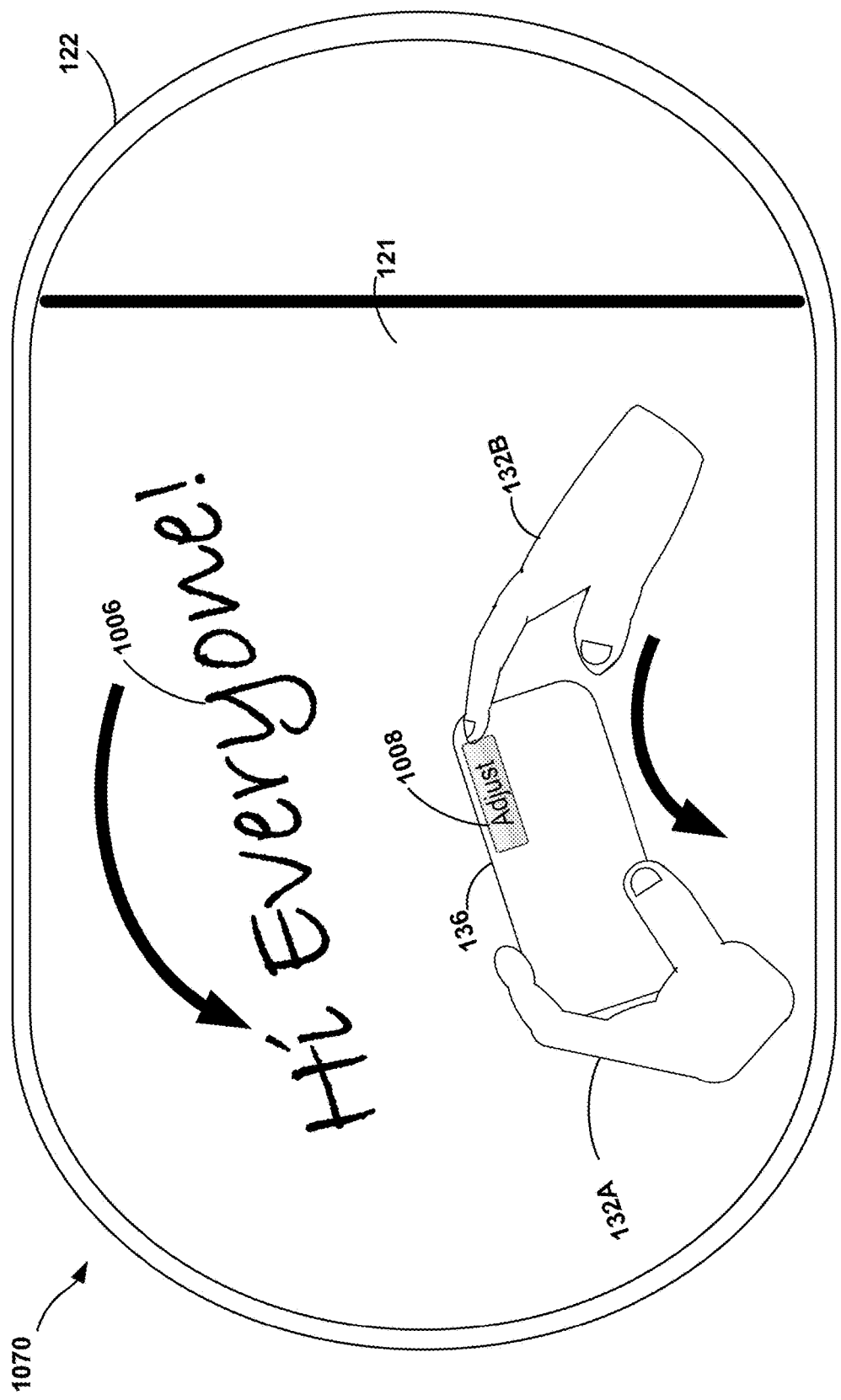

FIG. 10G is an example HMD display 1070 illustrating a virtual drawing transformation gesture in accordance with aspects of the disclosure. In the example illustrated in FIG. 10G, the user rotates peripheral device 136 counterclockwise while virtual drawing 1006 is active (e.g., while the user is selecting and holding user interface element 1008). In response to detecting the rotation gesture, the artificial reality system rotates virtual drawing 1006 in accordance with the translation gesture performed with respect to peripheral device 136 (e.g., rotates virtual drawing 1006 as shown in FIG. 10G). In one or more aspects, the user can rotate peripheral device 136 in other directions (e.g., in a clockwise direction), which would cause the artificial reality system to rotate virtual drawing 1006 in accordance with that direction. In one or more aspects, virtual drawing 1006 is rotated commensurate with the rotation movement of peripheral device 136 in physical space (e.g., rotated in the same direction and for the same degrees as peripheral device 136). For example, if peripheral device 136 is moved to the counterclockwise fifteen degrees, artificial reality system will rotate virtual drawing 1006 counterclockwise fifteen degrees. In one or more aspects, virtual drawing 1006 is rotated for substantially the same degrees (e.g., within ten degrees) as peripheral device 136. In one or more aspects, the artificial reality system will rotate virtual drawing 1006 a magnitude corresponding to the degrees that the peripheral device 136 is rotated (e.g., 50%, 150%, 200% or any percentage of the degrees the peripheral device 136 is rotated).

In one or more aspects, the various virtual drawing transformation gestures described above can be combined (e.g., performed simultaneously or serially in any order). For example, a user can perform a translation gesture (in any direction) and/or rotation gesture while virtual drawing 1006 is active (e.g., while the user is selecting and holding user interface element 1008). For example, a user can move peripheral device 136 horizontally and away from a virtual surface while also rotating the peripheral device counterclockwise and the artificial reality system will, in response to the combination of gestures, transform virtual drawing 1006 by moving it horizontally, increasing its size, and rotating it counterclockwise in accordance with the combination of virtual drawing transformation gestures.

Returning to FIG. 9B, after transforming the active virtual drawing, the flow returns to determine whether a virtual drawing surface or a virtual drawing is active again (912). There may be many other operations performed by the artificial reality system in between determining again whether a virtual drawing surface or a virtual drawing is active (912).

Figure 10H:
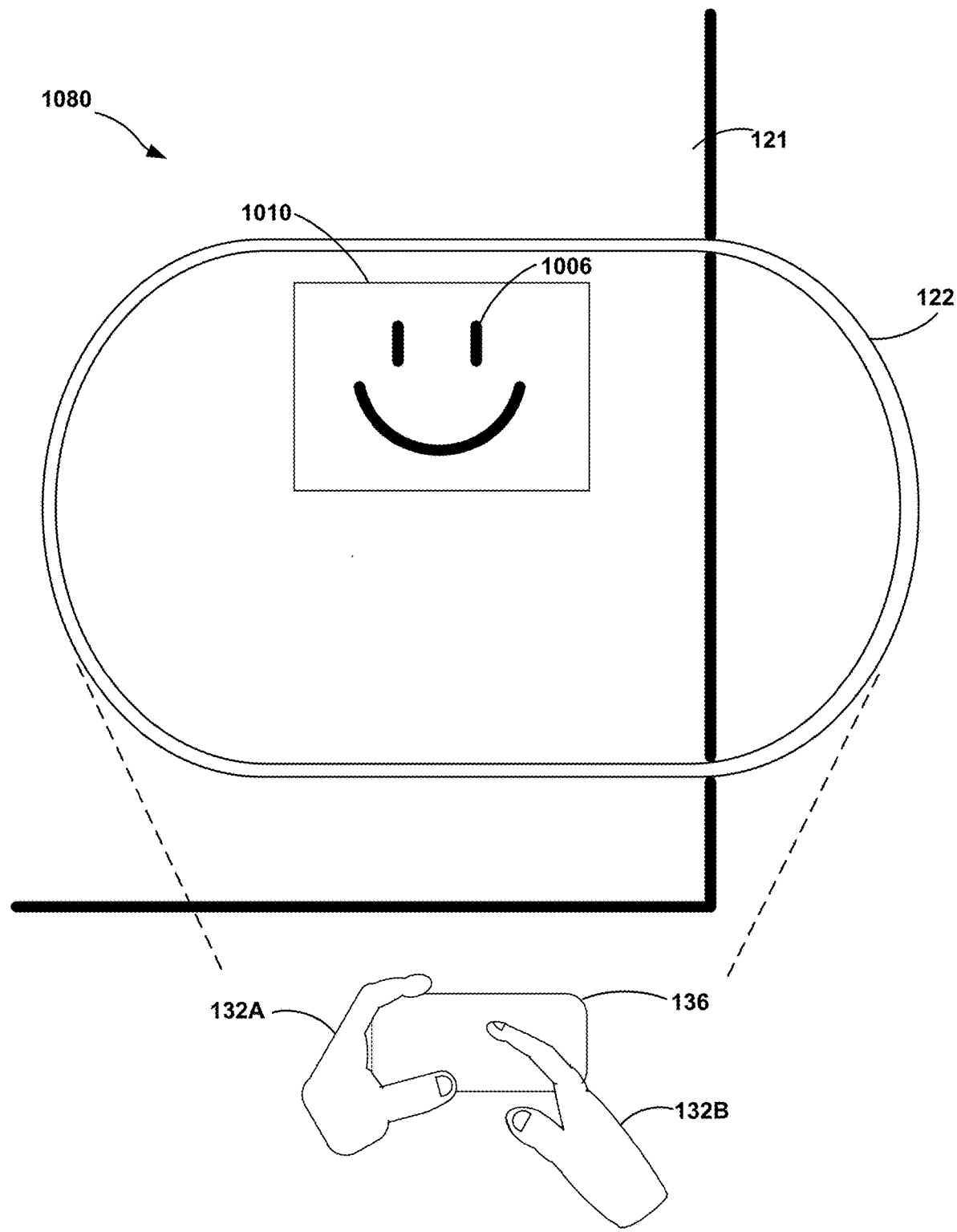

FIG. 10H is an example HMD display 1080 illustrating a virtual drawing surface mode in accordance with aspects of the disclosure. In the example illustrated in FIG. 10H, a user is interacting with (e.g., performing touch gestures on) a peripheral device 136 with the index finger of hand 132B. In one or more aspects, the touch gestures performed on the surface of peripheral device 136 can detected from image data captured by an image capture device of the artificial reality system, as noted above. In one or more aspects, the surface of peripheral device 136 is a presence-sensitive surface at which the peripheral device 136 detects the touch gestures, as noted above. In response to detecting the user input (e.g., the touch gestures) at the surface of peripheral device 136, the artificial reality system generates and renders virtual marks 1006 on virtual drawing surface 1010 for display at the HMD, as illustrated in FIG. 10H. In one or more aspects, the artificial reality system also generates and renders virtual marks 1006 for display at the HMD at the locations of the surface of peripheral device 136 where the touch gestures were performed (not shown). In one or more aspects, virtual markings 1010 are generated and rendered as the touch input is detected. For example, FIG. 10B illustrates HMD display 1000 at a later time than shown in FIG. 10A.

Figure 11:
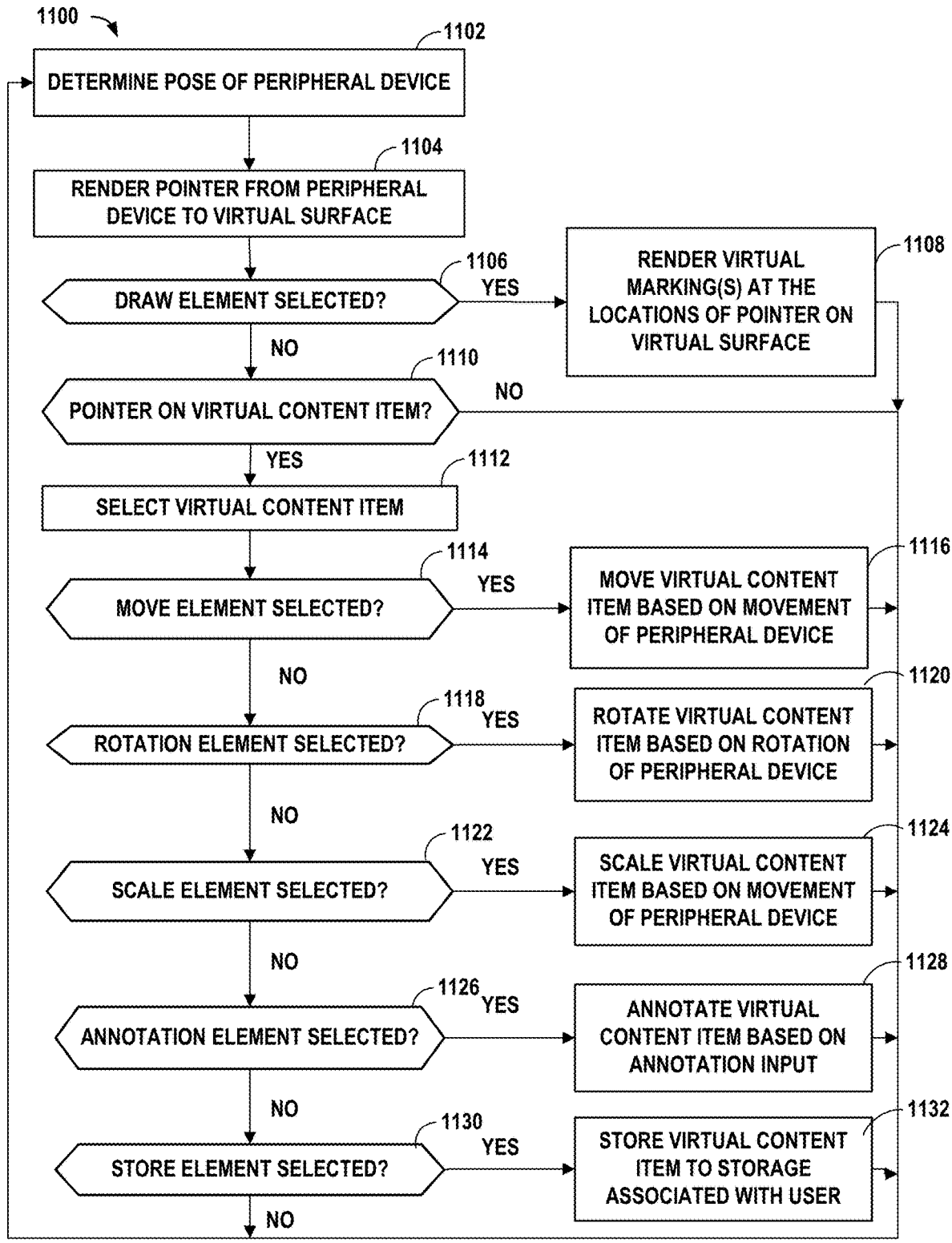
FIG. 11 is a flowchart illustrating operations of an example mode of operation for an artificial reality system, in accordance with aspects of the disclosure.

FIG. 11 is a flowchart illustrating operations of an example mode of operation for an artificial reality system, in accordance with aspects of the disclosure. The artificial reality system may determine a current pose of a peripheral device (1102). The pose may include the current position and orientation of the peripheral device. In one or more aspects, image data may be captured and analyzed to determine the pose of the peripheral device. Other sensor data may be used in addition to, or instead of, image data to determine the pose of the peripheral device. For example, GPS sensor(s) of the peripheral device may indicate the current position or location of the peripheral device. Additionally, or alternative, accelerometer(s) may indicate the current acceleration of the peripheral device to help determine the current orientation of the device. The artificial reality system then generates and renders, based on the pose of the peripheral device, a virtual pointer along at least a portion of a line between the peripheral device and a virtual surface (1104).

Figure 12A:
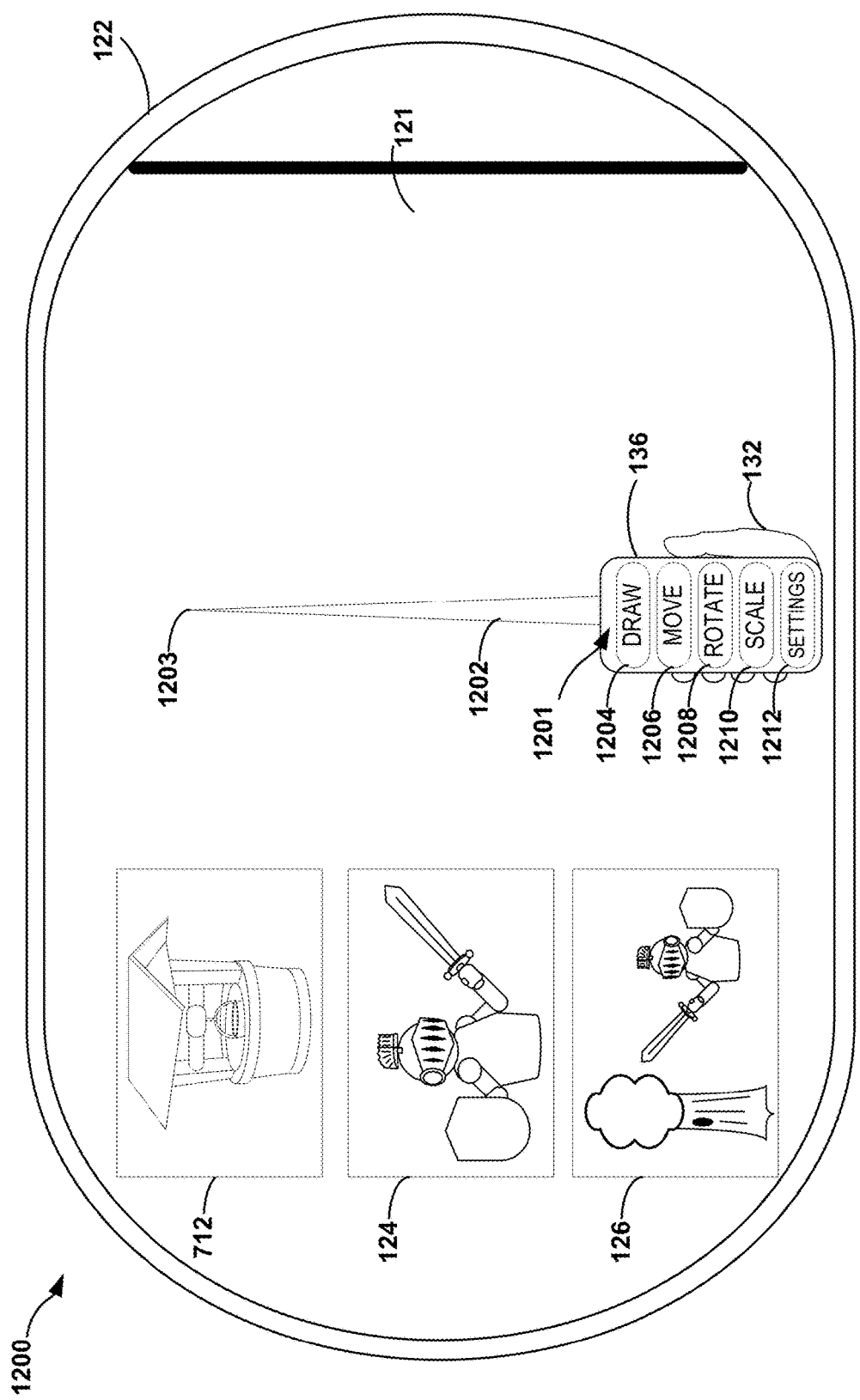
FIGS. 12A-12I are example HMD displays illustrating interacting with virtual surfaces with a virtual laser pointer in accordance with aspects of the disclosure.

FIG. 12A is an example HMD display 1200 illustrating a virtual pointer 1202 in accordance with aspects of the disclosure. In the example illustrated in FIG. 12A, the artificial reality content 122 includes virtual pointer 1202 along a line between peripheral device 136 to location 1203 on a virtual surface corresponding to a physical wall 121. In one or more aspects, the virtual pointer 1202 is not a solid and can be broken up into one or more portions of the same or different lengths. In some examples, virtual pointer 1202 is generated and rendered not as a beam or other virtual elements along a line between peripheral device 136 to location 1203 but is instead generated and rendered as a virtual element at location 1203. The virtual element can be any shape, text, or other glyph. In the examples illustrated in FIG. 12A, the virtual surface also includes virtual content items 712, 124, and 126. In one or more aspects, virtual content items can comprise GIFs, photos, applications, live-streams, videos, text, a web-browser, drawings, animations, 3D models, representations of data files (including two-dimensional and three-dimensional datasets), markings, or any other visible media. In one or more aspects, the artificial reality system generates and renders a pointer user interface 1201 on a surface of peripheral device 136. In one or more aspects, pointer user interface 1201 includes a draw element 1204, move element 1206, rotate element 1208, scale element 1210, and/or a settings element 1212. In one or more aspects, pointer user interface 1201 can include other combination of user interface elements. In one or more aspects, user interface 1201 is rendered for display at the HMD (e.g., user interface 1201 is projected on a surface of peripheral device 136 by the HMD as shown in FIG. 12A such that user interface 1201 appears to part of or overlaid on peripheral device). In one or more aspects, the artificial reality system does not render peripheral device 136 but only user interface 1201. In some cases, user interface 1201 may be rendered partially transparent on peripheral device 136. In one or more aspects, user interface 1201 is rendered for display by peripheral device 136 (e.g., at a display or touchscreen of peripheral device 136).

Returning to FIG. 11, after rendering the pointer, the artificial reality system can determine whether a draw element was selected (1106). In response to the draw element being selected (YES branch of 1106), the artificial reality system will render virtual marking(s) at the location(s) of the pointer on a virtual surface (1108). If the draw element is not selected (NO branch of 1106), the artificial reality system can determine if the location of the pointer is on a virtual content item (1110). Selection of any of elements may include virtually pressing, virtually swiping, virtually holding or other user interface gesture made by a user with respect to positions corresponding to the virtual element.

Figure 12B:
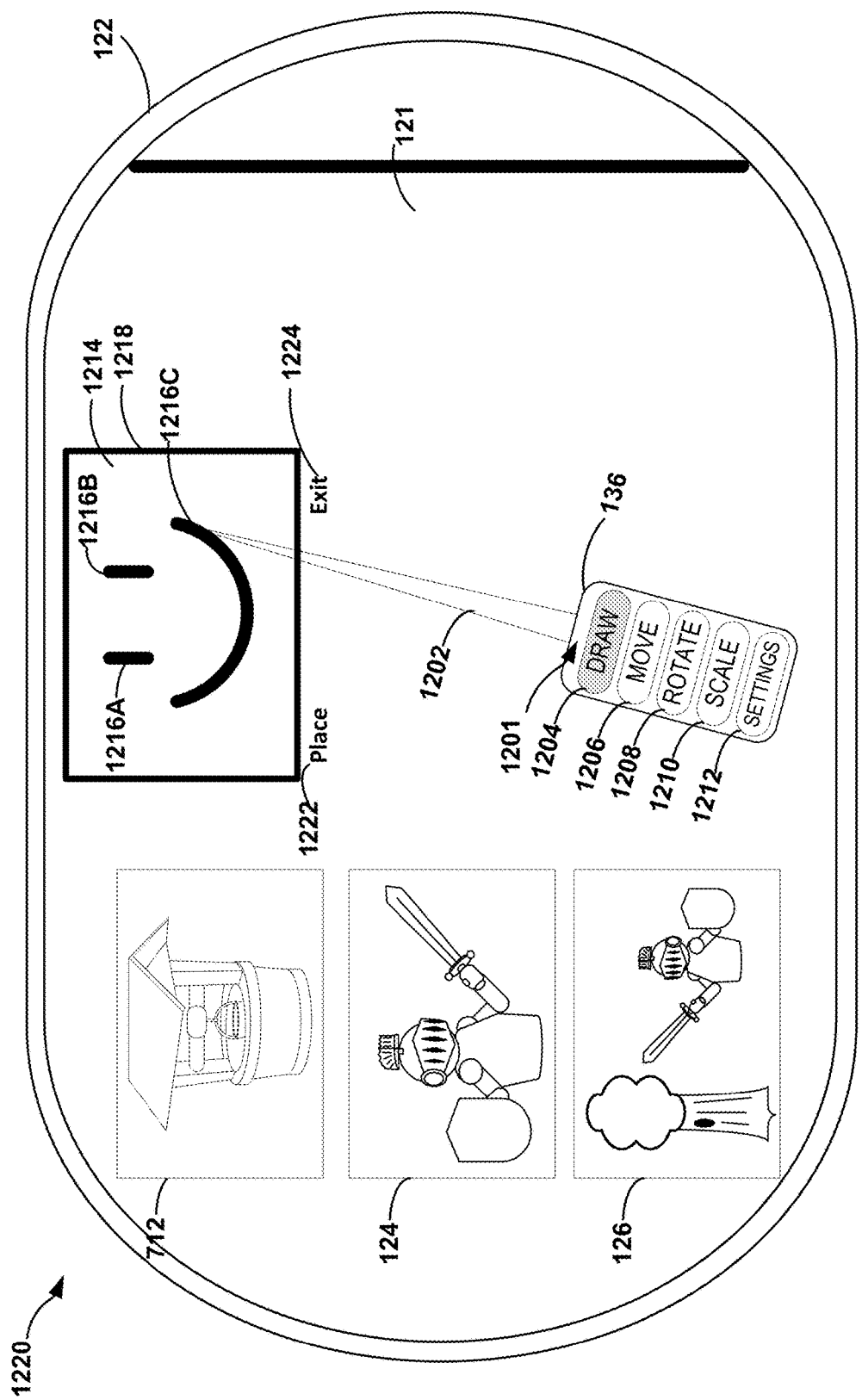

FIG. 12B is an example HMD display 1220 illustrating a pointer drawing gesture in accordance with aspects of the disclosure. In the example illustrated in FIG. 12B, a user is interacting with a virtual drawing surface 1214 (e.g., by performing one or more drawing gestures) with the peripheral device 136 while selecting draw element 1204. In one or more aspects, the one or more drawing gestures performed with peripheral device 136 can detected from image data captured by an image capture device of the artificial reality system, as noted above. In response to detecting the one or more drawing gestures with peripheral device 136, the artificial reality system generates and renders virtual markings 1216A-1216C for display at the HMD at the locations of pointer 1202 on virtual drawing surface 1214 while the user selected draw element 1204. In the example shown in FIG. 12B, the user performed a vertical drawing gesture with peripheral device 136 while selecting draw element 1204 to render marking 1216A, next the user performed a second vertical drawing gesture peripheral device 136 while selecting draw element 1204 to render marking 1216B, and then the user performed a third drawing gesture peripheral device 136 while selecting draw element 1204 to render marking 1216C. In one or more aspects, the user did not select draw element 1204 in between performing the first, second and third drawing gestures. In one or more aspects, virtual drawing surface can include border 1218. In one or more aspects, virtual drawing surface 1214 is associated with a planar surface (e.g., wall 121). In one or more aspects, virtual drawing surface can correspond to an entire physical surface (e.g., have the same surface area as the physical surface) or correspond to a portion of a physical surface (e.g., as shown in FIG. 12B). In some examples, a virtual drawing surface can be rendered as floating in a virtual or real-world physical environment (e.g., not associated with a particular real-world surface) (not shown).

Figure 12C:
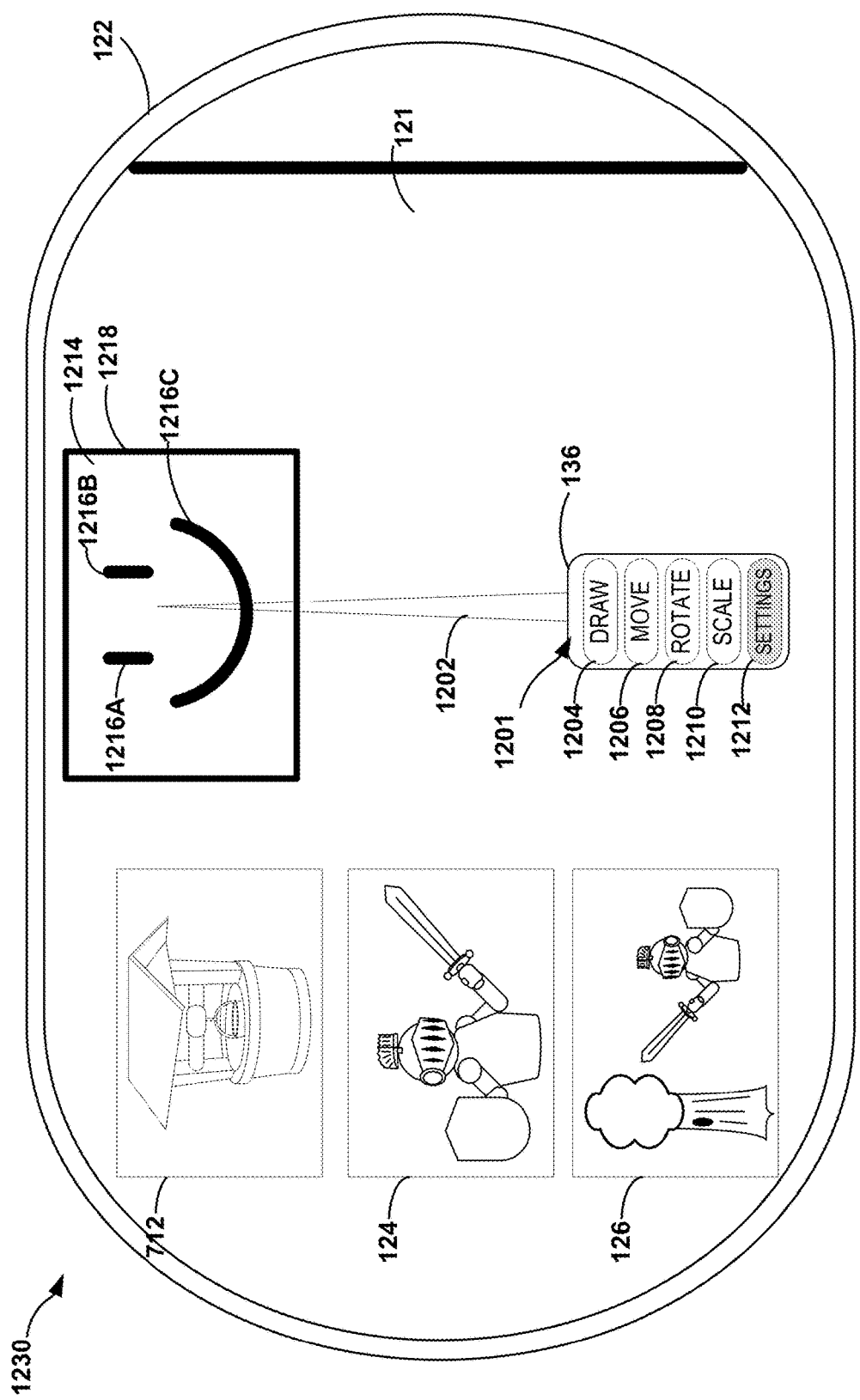
Figure 12D:
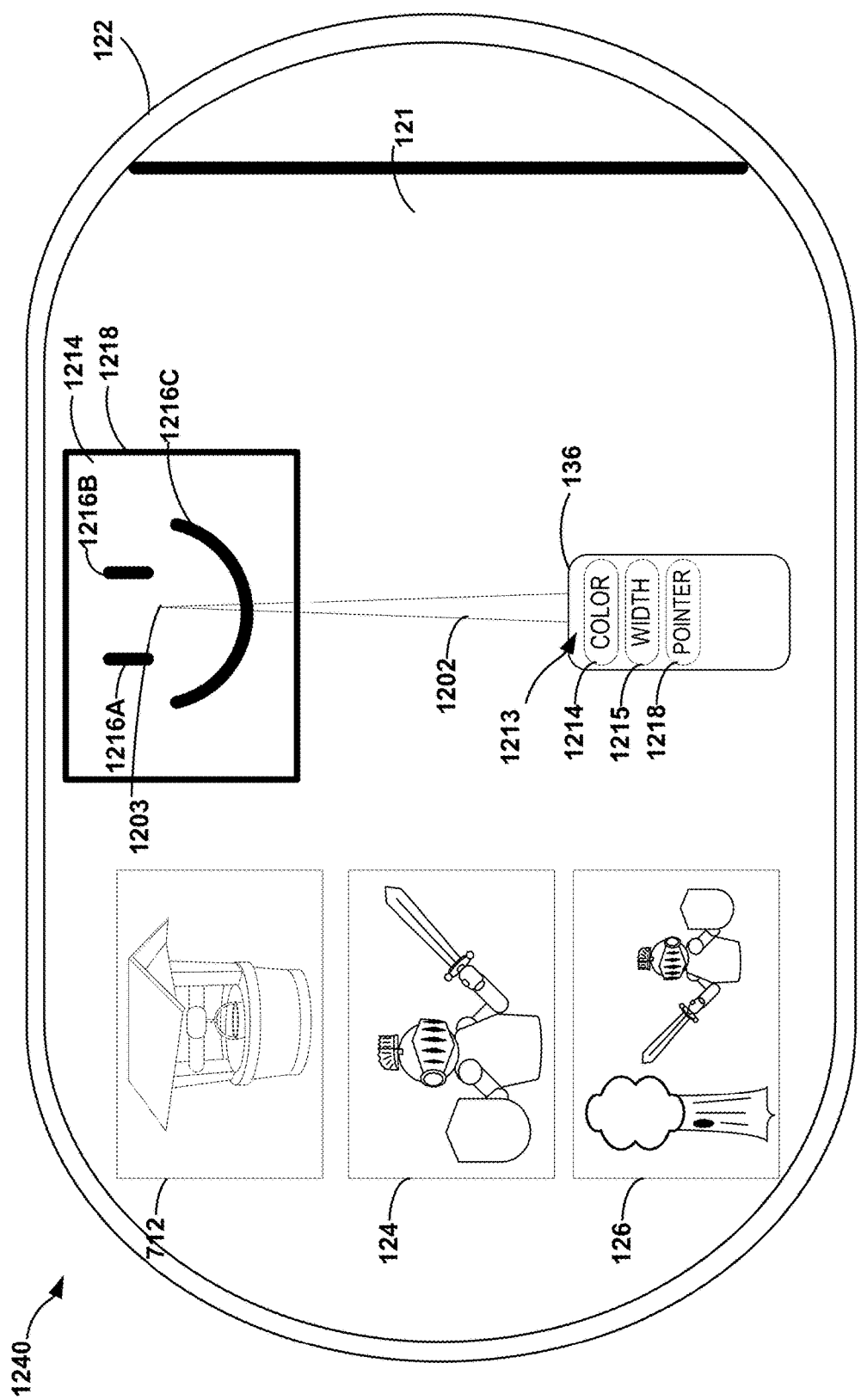

FIGS. 12C-12D illustrate HMD displays 1030-1040, respectively, illustrating user interfaces that allow a user to alter virtual pointer 1202 in accordance with aspects of the disclosure. In response to detecting the selecting settings element 1212 of user interface 1201 (e.g., as illustrated in FIG. 12C), the artificial reality system generates and renders settings user interface 1218 on a surface of peripheral device 136 (e.g., as illustrated in FIG. 12D). In the example illustrated in FIG. 12D, settings user interface 1213 includes one or more modify elements, which in this example include a color element 1214, width element 1215, and pointer element 1218. In one or more aspects, pointer user interface 1213 can include other combination of user interface elements. In one or more aspects, user interface 1213 is rendered for display at the HMD (e.g., user interface 1213 is projected on a surface of peripheral device 136 by the HMD as shown in FIG. 12D). In one or more aspects, user interface 1213 is rendered for display by peripheral device 136 (e.g., at a display or touchscreen of peripheral device 136). In one or more aspects, the artificial reality system changes the color of virtual pointer 1202 in response to detecting a selection of color element 1214 (e.g., the artificial reality system will toggle the rendered color of virtual pointer 1202). In one or more aspects, changing the color of virtual pointer 1202 will change the color of any future rendered virtual markings with virtual pointer 1202. In one or more aspects, the artificial reality system changes the color of virtual markings 1216A-1216C in response to detecting a selection of color element 1214 while the location 1203 of virtual pointer 1202 is on virtual drawing surface 1218. In one or more aspects, the artificial reality system changes the color of any of virtual markings 1216A-1216C in response to detecting a selection of color element 1214 while the location 1203 of virtual pointer 1202 is on any of virtual markings 1216A-1216C. In one or more aspects, the artificial reality system changes the width of virtual pointer 1202 in response to detecting a selection of width element 1215 (e.g., the artificial reality system will toggle the rendered width of virtual pointer 1202). In one or more aspects, the artificial reality system changes the width of virtual pointer 1202 in response to detecting a pinching gesture. For example, a pinching gesture can comprise two or more fingers of hand 132A or 132B moving closer to or further from each other over or on presence-sensitive surface of peripheral device 136. In one or more aspects, the artificial reality system can reduce or narrow the width of virtual pointer 1202 in response to detecting a pinching gesture comprising two or more fingers of hand 132A or 132B moving closer to each other over or on the surface of peripheral device 136 (e.g., hovering over or touching the surface of peripheral device 136). In one or more aspects, the artificial reality system can increase the width of virtual pointer 1202 in response to detecting a pinching gesture comprising two or more fingers of hand 132A or 132B moving away from each other over or on presence-sensitive surface of peripheral device 136. In one or more aspects, the artificial reality system may render a visual cue about the width of virtual pointer 1202 (e.g., on the virtual drawing surface). In one or more aspects, changing the width of virtual pointer 1202 will change the width of any future rendered virtual markings with virtual pointer 1202. In one or more aspects, the artificial reality system changes the width of virtual markings 1216A-1216C in response to detecting a selection of width element 1215 or a pinching gesture while the location 1203 of virtual pointer 1202 is on virtual drawing surface 1218. In one or more aspects, the artificial reality system changes the width of any of virtual markings 1216A-1216C in response to detecting a selection of width element 1215 or a pinching gesture while the location 1203 of virtual pointer 1202 is on any of virtual markings 1216A-1216C. In one or more aspects, the artificial reality system changes other characteristics of virtual pointer 1202 in response to detecting a selection of pointer element 1215. In some examples, the other characteristics include the shape of virtual pointer 1202 (e.g., cone, tube, line), whether virtual pointer 1202 includes a pattern (e.g., whether only one or more portions of the virtual pointer are rendered, the opaqueness of the virtual pointer 1202 (e.g., whether or how transparent the beam is), the brightness of virtual pointer 1202, and/or any other visual characteristic of virtual pointer 1202.

Returning to FIG. 11, after determining that a draw element was not selected (NO branch of 1106), the artificial reality system determines whether the virtual pointer is located on a virtual content item on a virtual surface (1110). In response to determining that the virtual pointer is located on a virtual content item on a virtual surface (YES branch of 1110), the artificial reality system will select the virtual content item (e.g., set the status of the virtual content item to active) (1112). After selecting the virtual content item, the artificial reality system can determine whether a virtual content transformation element, such as a move element, is selected (1114). In response to determining that the move element was selected (YES branch of 1114), the artificial reality system will move the selected virtual content item based on any movement of the peripheral device 136, including, for example, a virtual content item transformation gesture (1116). If the move element was not selected (NO branch of 1114), the artificial reality system can determine whether another virtual content transformation element was selected that is not the move element (1118).

Figure 12E:
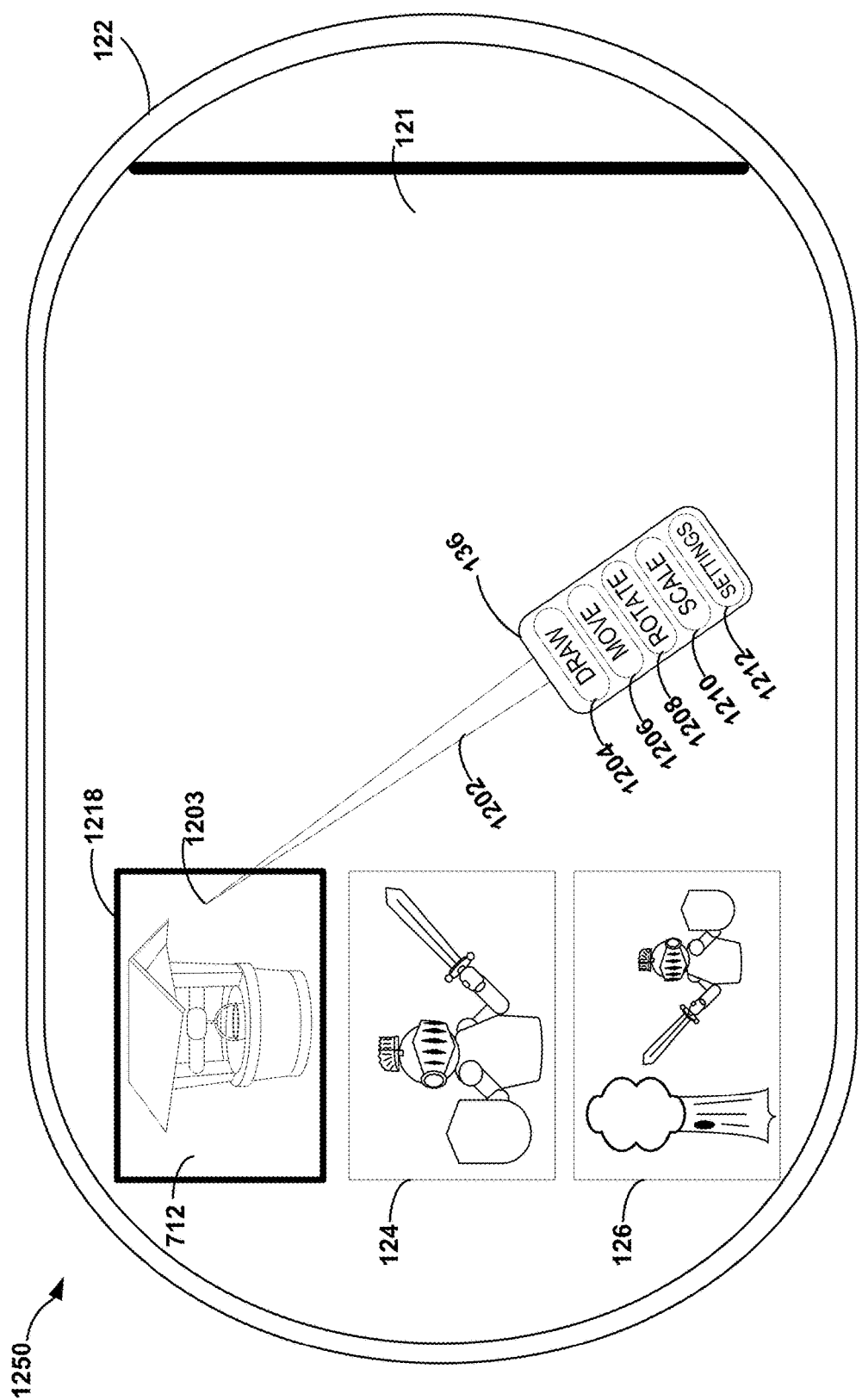

FIG. 12E is an example HMD display 1250 illustrating a user selecting virtual content item 712 with virtual pointer 1202 in accordance with aspects of the disclosure. In the example illustrated in FIG. 12E, the artificial reality system selects virtual content item 712 (e.g., sets the status of virtual content item 712 to active) in response to location 1203 of virtual pointer 1202 being detected on virtual content item. In one or more aspects, an active virtual content item can include an active indicator 1218 (e.g., a border, highlighting, a shadow, and/or any other indication that a user can manipulate or otherwise interact with a particular virtual drawing). In one or more aspects, the user can modify virtual 712 while it is selected, as described in further detail below.

Figure 12F:
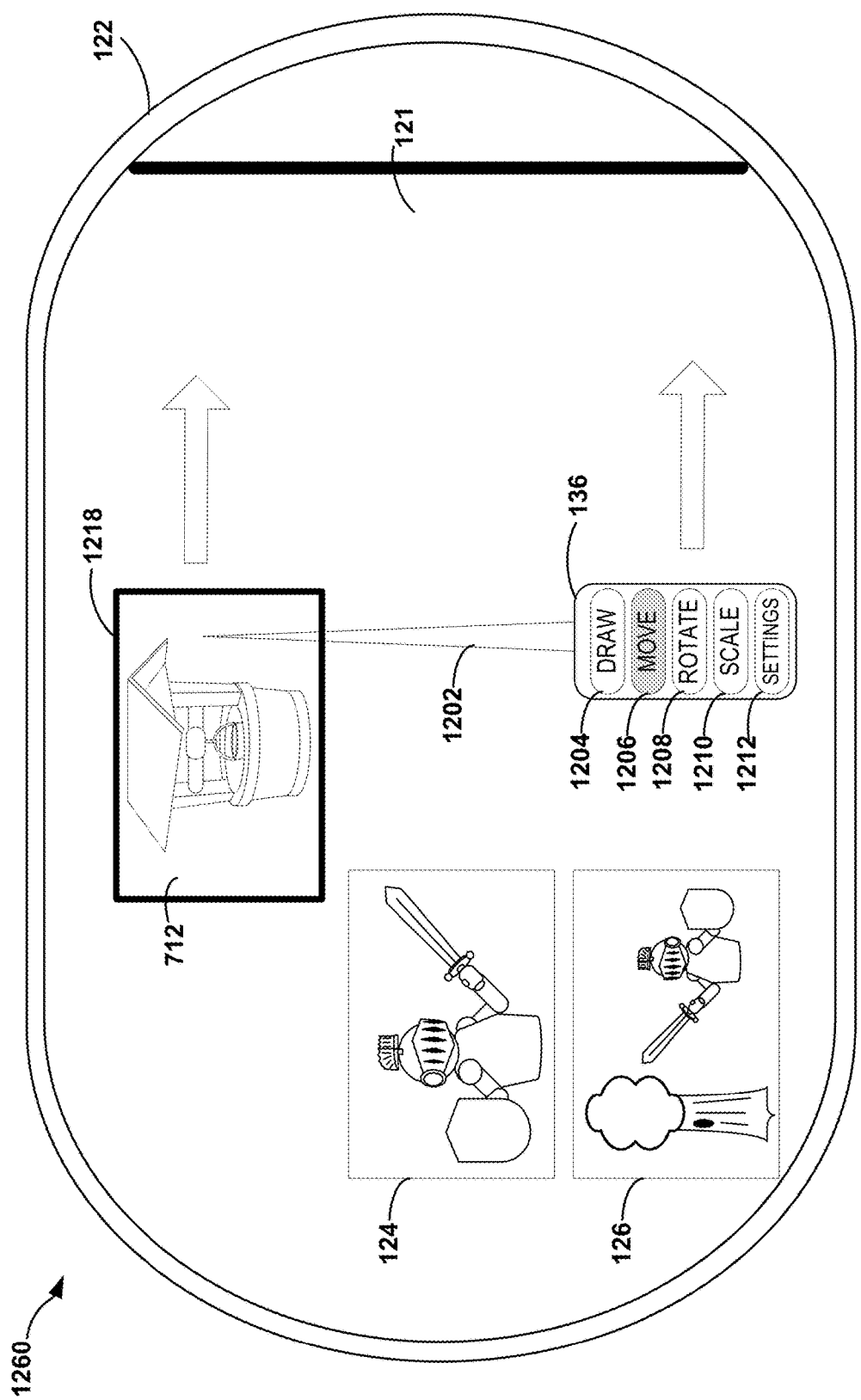

FIG. 12F is an example HMD display 1260 illustrating a virtual content item transformation gesture while selecting move selecting move element 1206 in accordance with aspects of the disclosure. In the example illustrated in FIG. 12F, the user is moving peripheral device 136 horizontally toward the right (e.g., performing a horizontal translation gesture) while virtual content item 712 is active. In response to detecting the translation gesture while selecting move element 1206, the artificial reality system translates virtual drawing 1006 in accordance with the translation gesture performed with respect to peripheral device 136 (e.g., moves virtual drawing 1006 to the right as shown in FIG. 112F). In one or more aspects, the user can translate (e.g., move) peripheral device 136 in other directions (e.g., in a vertical direction), which would cause the artificial reality system to move virtual content item 712 in accordance with that motion. In one or more aspects, virtual content item 712 is moved commensurate with the translation movement of peripheral device 136 in physical space (e.g., moved in the same direction and for the same distance as peripheral device 136). For example, if peripheral device 136 is moved to the left three inches, artificial reality system will move virtual content item 712 to the left three inches. In one or more aspects, virtual content item 712 is moved in substantially the same direction (e.g., within 10 degrees) and for substantially the same distance (e.g., within inches) as peripheral device 136. In one or more aspects, the artificial reality system will move virtual content item 712 a magnitude distance corresponding to the distance that the peripheral device 136 is moved (e.g., 50%, 150%, 200% or any percentage of the distance the peripheral device 136 is moved).

Returning to FIG. 11, after determining that a move element was not selected (NO branch of 1114), the artificial reality system determines whether a rotation element was selected (1118). In response to determining that the rotation element was selected (YES branch of 1118), the artificial reality system will rotate the selected virtual content item based on any movement of the peripheral device 136 (1120). If the rotation element was not selected (NO branch of 1118), the artificial reality system can determine whether another virtual content transformation element was selected that is not the rotation element (1122).

Figure 12G:
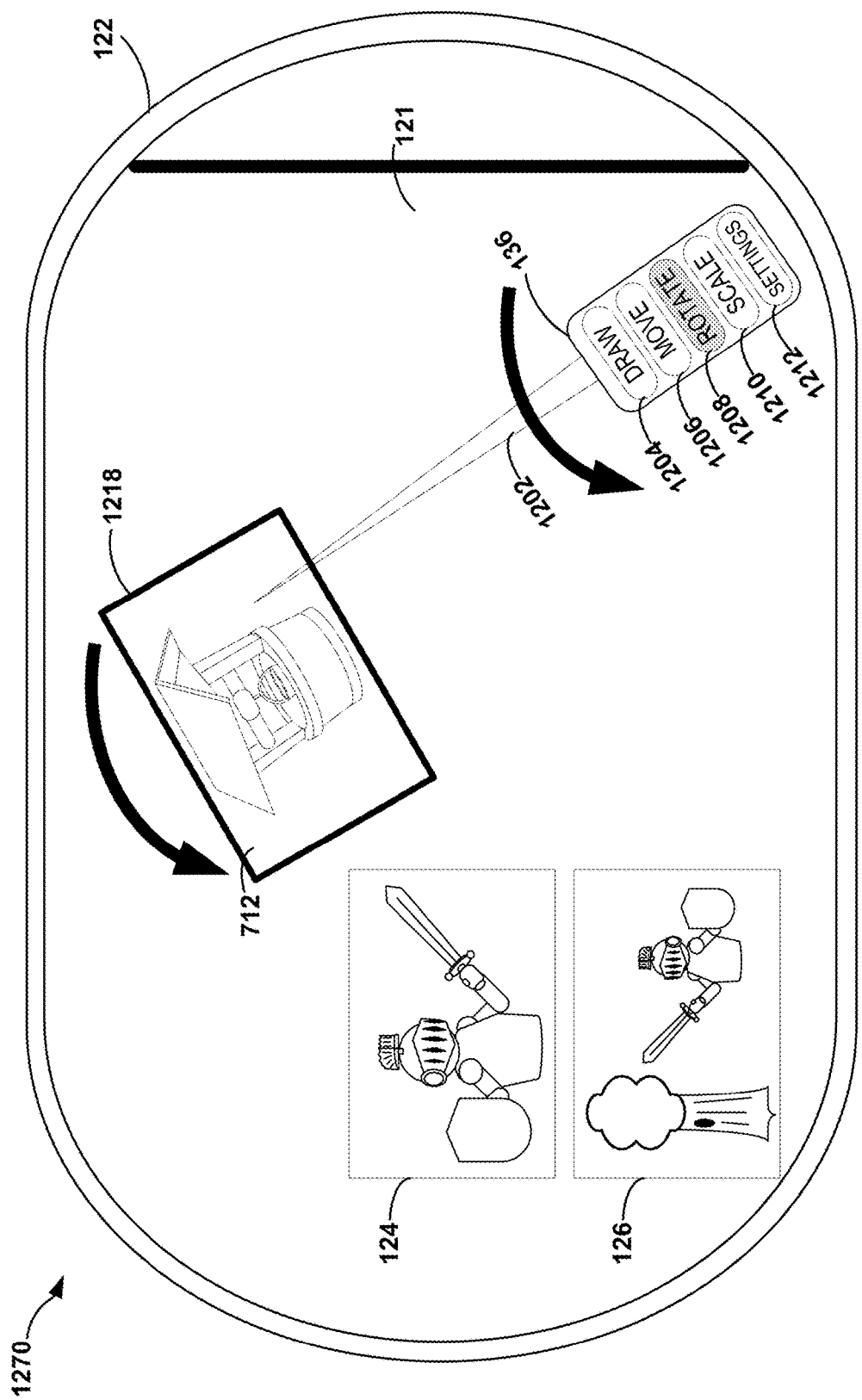

FIG. 12G is an example HMD display 1270 illustrating a virtual content item transformation gesture in accordance with aspects of the disclosure. In the example illustrated in FIG. 12G, the user rotates peripheral device 136 counter-clockwise while virtual content item 712 is active and while the user is selecting and holding rotate element 1208. In response to detecting the rotation gesture while selecting rotate element 1208, the artificial reality system rotates virtual content item 712 in accordance with the translation gesture performed with respect to peripheral device 136 (e.g., rotates virtual content item 712 as shown in FIG. 12G). In one or more aspects, the user can rotate peripheral device 136 in other directions (e.g., in a clockwise direction), which would cause the artificial reality system to rotate virtual content item 712 in accordance with that direction. In one or more aspects, virtual content item 712 is rotated commensurate with the rotation movement of peripheral device 136 in physical space (e.g., rotated in the same direction and for the same degrees as peripheral device 136). For example, if peripheral device 136 is moved to the counterclockwise fifteen degrees, artificial reality system will rotate virtual content item 712 counterclockwise fifteen degrees. In one or more aspects, virtual content item 712 is rotated for substantially the same degrees (e.g., within ten degrees) as peripheral device 136. In one or more aspects, the artificial reality system will rotate virtual content item 712 a magnitude corresponding to the degrees that the peripheral device 136 is rotated (e.g., 50%, 150%, 200% or any percentage of the degrees the peripheral device 136 is rotated).

Returning to FIG. 11, after determining that a rotation element was not selected (NO branch of 1118), the artificial reality system determines whether a scale element was selected (1122). In response to determining that the scale element was selected (YES branch of 1122), the artificial reality system will scale the selected virtual content item based on any movement of the peripheral device 136 (1124). If the scale element was not selected (NO branch of 1122), the artificial reality system can determine whether another virtual content transformation element was selected that is not the scale element (1126).

Figure 12H:
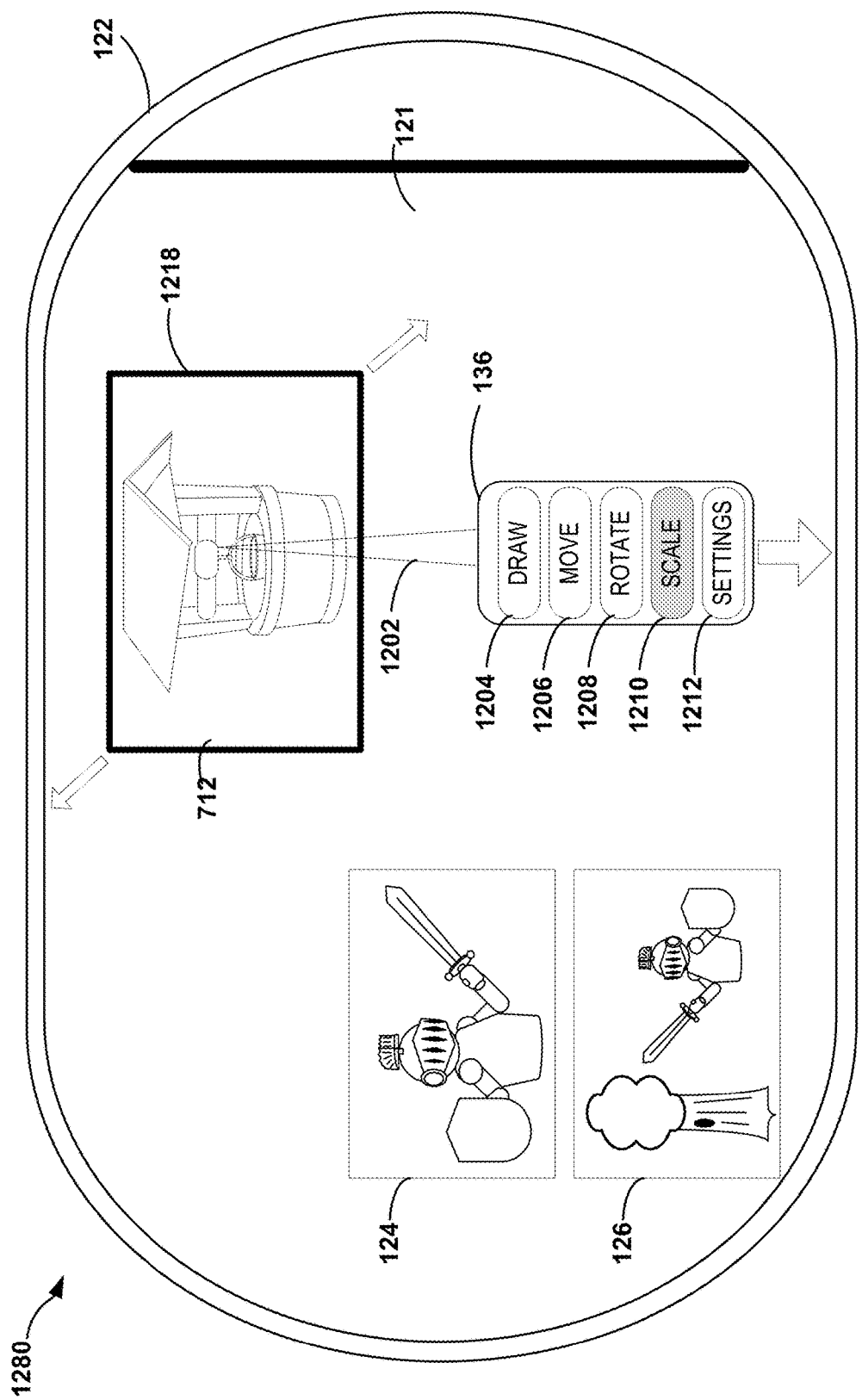

FIG. 12H is an example HMD display 1280 illustrating a virtual content item transformation gesture in accordance with aspects of the disclosure. In the example illustrated in FIG. 12H, the user moves peripheral device 136 away from the virtual surface corresponding to wall 121 while virtual drawing 1006 is active and while the user is selecting and holding scale element 1210. In response to detecting a translation gesture toward or away a plane in physical space (e.g., wall 121) while selecting scale element 1210, the artificial reality system scales virtual content item 712 in accordance with the translation gesture performed with respect to peripheral device 136. In the example illustrated in FIG. 12H, the artificial reality system increases the size of virtual content item 712 in response to the peripheral device 136 being moved away from the virtual surface corresponding to wall 121. In other examples, the artificial reality system reduces the size of virtual content item 712 in response to the user moving peripheral device 136 toward the virtual surface corresponding to wall 121. In one or more aspects, the size of virtual content item 712 is scaled in accordance with the distance peripheral device 136 to the virtual surface corresponding to wall 121, with an effect similar to projection.

Returning to FIG. 11, after determining that a scale element was not selected (NO branch of 1122), the artificial reality system determines whether an annotation element was selected (1126). In response to determining that an annotation element was selected (YES branch of 1126), the artificial reality system will annotate the selected virtual content item based on any annotation input (1128). If the annotation element was not selected (NO branch of 1126), the artificial reality system can determine whether another virtual content transformation element was selected that is not the annotation element (1130).

Figure 12I:
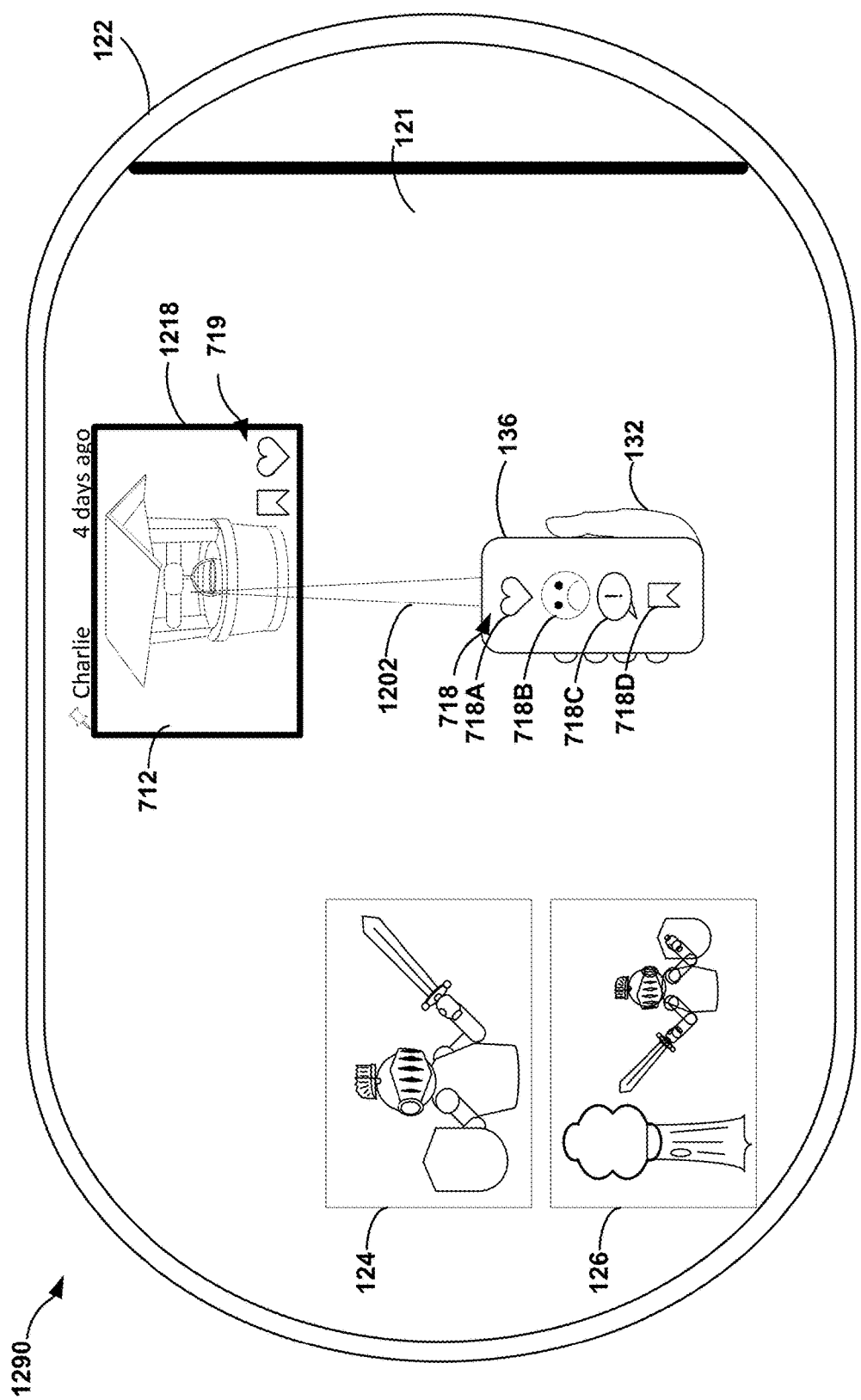

FIG. 12I is an example HMD display 1290 illustrating a user interacting with virtual content item 712 with virtual pointer 1202 in accordance with aspects of the disclosure. In the example illustrated in FIG. 12I, the artificial reality system generates and renders user interface 718 while virtual content item 712 is active. In one or more aspects, user interface 718 includes one or more elements (e.g., 718A-718D) to annotate active virtual content item 712. In one or more aspects, an annotation gesture comprises a user selecting (e.g., touching) one of elements 718A-718C. For example, a user can annotate active virtual content item 712 by selecting an "emoji" (e.g., any of elements 718A, 718B) that indicates a user's reaction to virtual content item 712. In response to detecting a gesture selecting or touching element 718A, the artificial reality system will annotate active virtual content item 712 to indicate that the user "loves" or "likes" virtual content item 712. In some examples, the "love" or "like" annotation will be reflected on virtual content item 712 (e.g., element 719 will be generated over virtual content item 712 as shown in FIG. 7H) or in proximity to (e.g., adjacent to) virtual content item 712. In another example, a user can annotate active virtual content item 712 by commenting on the virtual content item. For example, a user can select element 718C and the artificial reality system can, in response to detecting the selection gesture of element 718C, generate and render a virtual keyboard for the user to enter a comment about active virtual content item 712. In one or more aspects, the entered comment will be reflected over virtual content item 712 or in proximity to (e.g., adjacent to) virtual content item 712. In one or more aspects, user interface 718 is rendered for display at the HMD (e.g., user interface 718 is projected on a surface of peripheral device 136 by the HMD as shown in FIG. 7H). In one or more aspects, user interface 718 is rendered for display by peripheral device 136 (e.g., at a display or touchscreen of peripheral device 136).

Returning to FIG. 11, after determining that an annotation element was not selected (NO branch of 1126), the artificial reality system determines whether a store element was selected (1130). In response to determining that an annotation element was selected (YES branch of 1130), the artificial reality system will store the selected virtual content item to storage associated with the user (1132). For example, a user can select or touch bookmark element 718D while virtual content item 712 is active), as illustrated in FIG. 12I, and the artificial reality system will, in response to detecting the selection of bookmark element 718D, store virtual content item 712 to storage associated with the user. If the store element was not selected (NO branch of 1130), the flow returns to determine a current pose of a peripheral device (1102). There may be many other operations performed by the artificial reality system in between determine a current pose of a peripheral device (1102).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
an image capture device configured to capture image data;
a head-mounted display (HMD) configured to output artificial reality content;
a memory; and
processing circuitry in communication with the memory, the processing circuitry being configured to implement:
a virtual surface application configured to detect a physical peripheral device from the image data;
a gesture detector configured to detect a pose of the peripheral device,
wherein the virtual surface application is configured to:
generate, based on the pose of the peripheral device, a virtual pointer along at least a portion of a line between the peripheral device and a virtual surface, the virtual pointer pointing at a location of the virtual surface; and
perform one or more actions based on the location of the virtual surface; and
a rendering engine configured to render the virtual pointer and the virtual surface for display at the HMD.

2. The artificial reality system of claim 1,
wherein the gesture detector is configured to detect a pointer drawing gesture in which the user modifies a pose of the peripheral device to cause the virtual pointer to point at multiple locations of the virtual surface at different times,
wherein to perform the one or more actions, the virtual surface application is configured to generate, in response to the peripheral device drawing gesture, one or more virtual markings at the locations of the virtual surface, and
wherein the rendering engine is configured to render the one or more virtual markings for display at the HMD.

3. The artificial reality system of claim 2,
wherein the virtual surface application is configured to generate a user interface comprising a draw element,
wherein the pointer drawing gesture comprises selection of the draw element, and
wherein the rendering engine is configured to render, at a user interface position locked relative to a position of the peripheral device, the user interface for display at the HMD.

4. The artificial reality system of claim 1,
wherein, to generate the virtual pointer, the virtual surface application is configured to generate a visible element, and
wherein, to render the virtual pointer, the rendering engine is configured to render the visible element at the location of the virtual surface.

5. The artificial reality system of claim 1,
wherein, to generate the virtual pointer, the virtual surface application is configured to generate one or more visible elements along at least a portion of the line between the peripheral device and the location of the virtual surface.

6. The artificial reality system of claim 4, wherein the one or more visible elements are partially transparent.

7. The artificial reality system of claim 1,
wherein the virtual surface application is configured to generate a user interface comprising one or more modify elements that allow a user to change a color or width of the virtual pointer,
wherein the virtual surface application is configured to change the color or width of the virtual pointer when the one or more modify elements are selected by a user, and
wherein the rendering engine is configured to render, at a user interface position locked relative to a position of the peripheral device, the user interface for display at the HMD.

8. The artificial reality system of claim 1,
wherein the gesture detector is configured to detect a peripheral device gesture performed by a user with respect to the peripheral device,
wherein the virtual surface includes one or more virtual content items and the location of the virtual surface corresponds to a selected virtual content item of the one or more virtual content items,
wherein the peripheral device gesture comprises a virtual content item transformation gesture comprising a translation or rotation movement of the peripheral device in physical space, and
wherein to perform the one or more actions, the virtual surface application is configured to, in response to the virtual content item transformation gesture, scale, rotate, or translate the selected virtual content item, relative to the virtual surface, commensurate with the translation or rotation movement of the peripheral device in physical space.

9. The artificial reality system of claim 8,
wherein the virtual surface application is configured to generate a user interface comprising a virtual content transformation element,
wherein virtual content item transformation gesture comprises selecting the virtual content transformation element, and
wherein the rendering engine is configured to render, at a user interface position locked relative to a position of the peripheral device, the user interface for display at the HMD.

10. The artificial reality system of claim 1,
wherein the gesture detector is configured to detect a peripheral device gesture performed by a user with respect to the peripheral device,
wherein the virtual surface includes one or more virtual content items and the location of the virtual surface corresponds to a selected virtual content item of the one or more virtual content items,
wherein the peripheral device gesture comprises an annotation gesture, and
wherein to perform the one or more actions, the virtual surface application is configured to, in response to the annotation gesture, generate the virtual surface to annotate the selected virtual content item.

11. A method comprising:
obtaining, by an artificial reality system including a head mounted display (HMD), image data via an image capture device, the HMD configured to output artificial reality content;
detecting, by the artificial reality system, a physical peripheral device from the image data;
detecting, by the artificial reality system, a pose of the peripheral device;
generating, by the artificial reality system, based on the pose of the peripheral device, a virtual pointer along at least a portion of a line between the peripheral device and a virtual surface, the virtual pointer pointing at a location of the virtual surface;
performing, by the artificial reality system, one or more actions based on the location of the virtual surface; and
rendering, by the artificial reality system, the virtual pointer and the virtual surface for display at the HMD.

12. The method of claim 11, further comprising:
detecting, by the artificial reality system, a pointer drawing gesture in which the user modifies a pose of the peripheral device to cause the virtual pointer to point at multiple locations of the virtual surface at different times,
wherein performing, by the artificial reality system, the one or more actions comprises generating one or more virtual markings at the locations of the virtual surface; and
rendering, by the artificial reality system, the virtual markings for display at the HMD.

13. The method of claim 12, further comprising:
generating, by the artificial reality system, a user interface comprising a drawing element,
wherein the pointer drawing gesture comprises selection of the drawing element; and
rendering, by the artificial reality system at a user interface position locked relative to a position of the peripheral device, the user interface for display at the HMD.

14. The method of claim 11, further comprising:
generating, by the artificial reality system, a user interface comprising one or more modify elements that allow a user to change a color or width of the virtual pointer;
changing, by the artificial reality system, the color or width of the virtual pointer when the one or more modify elements are selected by a user; and
rendering, by the artificial reality system at a user interface position locked relative to a position of the peripheral device, the user interface for display at the HMD.

15. The method of claim 11, further comprising:
detecting, by the artificial reality system, a peripheral device gesture performed by a user with respect to the peripheral device,
wherein the virtual surface includes one or more virtual content items and the location of the virtual surface corresponds to a selected virtual content item of the one or more virtual content items,
wherein the peripheral device gesture comprises a virtual content item transformation gesture comprising a translation or rotation movement of the peripheral device in physical space; and in response to the virtual content item transformation gesture, scaling, rotating, or translating, by the artificial reality system, the selected virtual content item, relative to the virtual surface, commensurate with the translation or rotation movement of the peripheral device in physical space.

16. The method of claim 11, wherein:
detecting, by the artificial reality system, a peripheral device gesture performed by a user with respect to the peripheral device,
wherein the virtual surface includes one or more virtual content items and the location of the virtual surface corresponds to a selected virtual content item of the one or more virtual content items,
wherein the peripheral device gesture comprises an annotation gesture, and
generating, by the artificial reality system in response to the virtual content item annotation gesture, the virtual surface to annotate the selected virtual content item.

17. A non-transitory, computer-readable medium comprising instructions that, when executed, cause processing circuitry of an artificial reality system to:
obtain image data via an image capture device;
detect a physical peripheral device from the image data;
detect a pose of the peripheral device;
generate, based on the pose of the peripheral device, a virtual pointer along at least a portion of a line between the peripheral device and to a virtual surface, the virtual pointer pointing a location of the virtual surface;
perform one or more actions based on the location of the virtual surface; and
render the virtual pointer and the virtual surface for display at the HMD.

18. The non-transitory, computer-readable medium of claim 17, wherein the instructions further cause the processing circuitry to:
detect a pointer drawing gesture in which the user modifies a pose of the peripheral device to cause the virtual pointer to point at multiple locations of the virtual surface at different times,
wherein performing the one or more actions comprises generating, in response to the peripheral device drawing gesture, one or more virtual markings at the locations of the virtual surface, and
render the one or more virtual markings for display at the HMD.

19. The non-transitory, computer-readable medium of claim 18, wherein the instructions further cause the processing circuitry to:
generate a user interface comprising a drawing element, wherein the pointer drawing gesture comprises selection of the drawing element; and
render, at a user interface position locked relative to a position of the peripheral device, the user interface for display at the HMD.

20. The non-transitory, computer-readable medium of claim 17, wherein the instructions further cause the processing circuitry to:
detect a peripheral device gesture performed by a user with respect to the peripheral device,
wherein the virtual surface includes one or more virtual content items and the location of the virtual surface corresponds to a selected virtual content item of the one or more virtual content items,
wherein the peripheral device gesture comprises a virtual content item transformation gesture comprising a translation or rotation movement of the peripheral device in physical space; and
in response to the virtual content item transformation gesture, scale, rotate, or translate the selected virtual content item, relative to the virtual surface, commensurate with the translation or rotation movement of the peripheral device in physical space.

* * * * *